United States Patent
Archetti et al.

(10) Patent No.: US 10,294,426 B2
(45) Date of Patent: *May 21, 2019

(54) LIQUID CRYSTALLINE MEDIA HAVING HOMEOTROPIC ALIGNMENT

(71) Applicant: MERCK PATENT GMBH, Darmstadt (DE)

(72) Inventors: Graziano Archetti, Darmstadt (DE); Izumi Saito, Darmstadt (DE); Rocco Fortte, Frankfurt am Main (DE); Oliver Heppert, Weiterstadt (DE); Andreas Taugerbeck, Darmstadt (DE); Elena Neumann, Lautertal (DE)

(73) Assignee: MERCK PATENT GMBH, Darmstadt (DE)

( * ) Notice: Subject to any disclaimer, the term of this patent is extended or adjusted under 35 U.S.C. 154(b) by 15 days.

This patent is subject to a terminal disclaimer.

(21) Appl. No.: 15/321,596

(22) PCT Filed: Jun. 25, 2015

(86) PCT No.: PCT/EP2015/001281
§ 371 (c)(1),
(2) Date: Dec. 22, 2016

(87) PCT Pub. No.: WO2016/015803
PCT Pub. Date: Feb. 4, 2016

(65) Prior Publication Data
US 2018/0208848 A1    Jul. 26, 2018

(30) Foreign Application Priority Data
Jul. 28, 2014 (DE) .................. 10 2014 011 129

(51) Int. Cl.
| | | |
|---|---|---|
| G02F 1/1333 | (2006.01) |
| C09K 19/54 | (2006.01) |
| C09K 19/06 | (2006.01) |
| C09K 19/14 | (2006.01) |
| C09K 19/32 | (2006.01) |
| G02F 1/1343 | (2006.01) |
| C09K 19/04 | (2006.01) |
| C09K 19/12 | (2006.01) |
| C09K 19/30 | (2006.01) |
| G02F 1/1337 | (2006.01) |
| G02F 1/137 | (2006.01) |

(52) U.S. Cl.
CPC .......... *C09K 19/542* (2013.01); *C09K 19/066* (2013.01); *C09K 19/14* (2013.01); *C09K 19/32* (2013.01); *C09K 19/321* (2013.01); *G02F 1/134309* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/304* (2013.01); *C09K 2019/3009* (2013.01); *C09K 2019/3016* (2013.01); *C09K 2019/3036* (2013.01); *C09K 2019/548* (2013.01); *G02F 2001/13706* (2013.01); *G02F 2001/13712* (2013.01); *G02F 2001/133742* (2013.01)

(58) Field of Classification Search
CPC .... C09K 19/542; C09K 19/066; C09K 19/14; C09K 19/32; C09K 19/321; C09K 2019/0448; C09K 2019/122; C09K 2019/123; C09K 2019/301; C09K 2019/3016; C09K 2019/304; C09K 2019/548; C09K 2019/3004; C09K 2019/3009; C09K 2019/3036; G02F 1/1333; G02F 1/134309; G02F 2001/133742; G02F 2001/13706; G02F 2001/13712
USPC ...................................... 252/299.5
See application file for complete search history.

(56) References Cited

U.S. PATENT DOCUMENTS

| | | |
|---|---|---|
| 7,910,020 B2 | 3/2011 | He et al. |
| 8,455,563 B2 | 6/2013 | Parri et al. |
| 8,608,977 B2 | 12/2013 | Enger et al. |
| 9,234,136 B2 | 1/2016 | Archetti et al. |

(Continued)

FOREIGN PATENT DOCUMENTS

| | | |
|---|---|---|
| CN | 104423098 A | 3/2015 |
| DE | 102011108708 A1 | 3/2012 |

(Continued)

OTHER PUBLICATIONS

International Search Report for PCT/EP2015/001281 dated Oct. 5, 2015.

(Continued)

*Primary Examiner* — Geraldina Visconti
(74) *Attorney, Agent, or Firm* — Millen White Zelano & Branigan

(57) ABSTRACT

The present invention relates to liquid-crystalline media (LC media) having negative or positive dielectric anisotropy, comprising a low-molecular-weight component and a polymerizable component. The polymerizable component comprises self-aligning, polymerizable mesogens (polymerizable self-alignment additives) which effect homeotropic (vertical) alignment of the LC media at a surface or the cell walls of a liquid-crystal display (LC display). The invention therefore also encompasses LC displays having homeotropic alignment of the LC medium without alignment layers. The invention discloses novel structures for polymerizable self-alignment additives which have a certain position of the functional groups.

29 Claims, No Drawings

(56) References Cited

U.S. PATENT DOCUMENTS

| | | |
|---|---|---|
| 9,436,039 B2 | 9/2016 | Lee |
| 9,464,228 B2 | 10/2016 | Katoh et al. |
| 9,809,748 B2 * | 11/2017 | Archetti ............. C09K 19/3402 |
| 2002/0102366 A1 | 8/2002 | Sato et al. |
| 2007/0286968 A1 | 12/2007 | Takeuchi et al. |
| 2011/0092718 A1 | 4/2011 | Enger et al. |
| 2011/0178200 A1 | 7/2011 | Parri et al. |
| 2013/0182202 A1 | 7/2013 | Graziano et al. |
| 2014/0138581 A1 | 5/2014 | Archetti et al. |
| 2015/0191652 A1 | 7/2015 | Katoh et al. |

FOREIGN PATENT DOCUMENTS

| | | |
|---|---|---|
| WO | 2009086911 A1 | 7/2009 |
| WO | 2009153168 A1 | 12/2009 |
| WO | 2013004372 A1 | 1/2013 |
| WO | 2014050426 A1 | 4/2014 |

OTHER PUBLICATIONS

Search Report in corresponding CN application No. 20158003925.4 dated Nov. 15, 2018 (pp. 1-10).

* cited by examiner

LIQUID CRYSTALLINE MEDIA HAVING HOMEOTROPIC ALIGNMENT

The present invention relates to liquid-crystalline media (LC media) having negative or positive dielectric anisotropy, comprising a low-molecular-weight component and a polymerisable component. The polymerisable component comprises self-aligning, polymerisable mesogens (polymerisable self-alignment additives) which effect homeotropic (vertical) alignment of the LC media at a surface or the cell walls of a liquid-crystal display (LC display). The invention therefore also encompasses LC displays having homeotropic alignment of the liquid-crystalline medium (LC medium) without alignment layers for homeotropic alignment. The invention discloses novel structures for polymerisable self-alignment additives which have a certain position of the functional groups.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have homeotropic edge alignment (VA technology=vertically aligned).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCD TV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Considerable effort is associated with the production of VA displays having two or more domains of different preferential direction. It is an aim of this invention to simplify the production processes and the display devices themselves without giving up the advantages of VA technology, such as relatively short response times and good viewing-angle dependence.

VA displays which comprise LC media having positive dielectric anisotropy are described in S. H. Lee et al. *Appl. Phys. Lett.* (1997), 71, 2851-2853. These displays use interdigital electrodes arranged on a substrate surface (in-plane addressing electrode configuration having a comb-shaped structure), as employed, inter alia, in the commercially available IPS (in-plane switching) displays (as disclosed, for example, in DE 40 00 451 and EP 0 588 568), and have a homeotropic arrangement of the liquid-crystal medium, which changes to a planar arrangement on application of an electric field.

Further developments of the above-mentioned display can be found, for example, in K. S. Hun et al. *J. Appl. Phys.* (2008), 104, 084515 (DSIPS: 'double-side in-plane switching' for improvements of driver voltage and transmission), M. Jiao et al. *App. Phys. Lett* (2008), 92, 111101 (DFFS: 'dual fringe field switching' for improved response times) and Y. T. Kim et al. *Jap. J. App. Phys.* (2009), 48, 110205 (VAS: 'viewing angle switchable' LCD). In addition, VA-IPS displays are also known under the name positive-VA and HT-VA.

In all such displays (referred to below in general as VA-IPS displays), an alignment layer is applied to both substrate surfaces for homeotropic alignment of the LC medium; the production of this layer has hitherto been associated with considerable effort.

It is an aim of this invention to simplify the production processes themselves without giving up the advantages of VA-IPS technology, such as relatively short response times, good viewing-angle dependence and high contrast.

Industrial application of these effects in electro-optical display elements requires LC phases, which have to satisfy a multiplicity of requirements. Particularly important here are chemical resistance to moisture, air, the materials in the substrate surfaces and physical influences, such as heat, infrared, visible and ultraviolet radiation and direct and alternating electric fields.

Furthermore, industrially usable LC phases are required to have a liquid-crystalline mesophase in a suitable temperature range and low viscosity.

VA and VA-IPS displays are generally intended to have very high specific resistance at the same time as a large working-temperature range, short response times and a low threshold voltage, with the aid of which various grey shades can be produced.

In conventional VA and VA-IPS displays, a polyimide layer on the substrate surfaces ensures homeotropic alignment of the liquid crystal. The production of a suitable alignment layer in the display requires considerable effort. In addition, interactions of the alignment layer with the LC medium may impair the electrical resistance of the display. Owing to possible interactions of this type, the number of suitable liquid-crystal components is considerably reduced. It would therefore be desirable to achieve homeotropic alignment of the LC medium without polyimide.

The disadvantage of the active-matrix TN displays frequently used is due to their comparatively low contrast, the relatively high viewing-angle dependence and the difficulty of producing grey shades in these displays.

VA displays have significantly better viewing-angle dependences and are therefore used principally for televisions and monitors.

A further development are the so-called PS (polymer sustained) or PSA (polymer sustained alignment) displays, for which the term "polymer stabilised" is also occasionally used. The PSA displays are distinguished by the shortening of the response times without significant adverse effects on other parameters, such as, in particular, the favourable viewing-angle dependence of the contrast.

In these displays, a small amount (for example 0.3% by weight, typically <1% by weight) of one or more polymerisable compound(s) is added to the LC medium and, after introduction into the LC cell, is polymerised or crosslinked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable. PSA technology has hitherto been employed principally for LC media having negative dielectric anisotropy.

Unless indicated otherwise, the term "PSA" is used below as representative of PS displays and PSA displays.

In the meantime, the PSA principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a 'pretilt' in the cell. In the case of PSA-OCB displays, for example, it is possible for the bend structure to be stabilised so that an offset voltage is unnecessary or can be reduced. In the case of PSA-VA displays, the pretilt has a positive effect on the response times. A standard MVA or PVA pixel and electrode layout can be used for PSA-VA displays. In addition, however, it is also possible, for example, to manage with only one structured electrode side and no protrusions, which significantly simplifies production and at the same time results in very good contrast at the same time as very good light transmission.

PSA-VA displays are described, for example, in JP 10-036847 A, EP 1 170 626 A2, U.S. Pat. Nos. 6,861,107, 7,169,449, US 2004/0191428 A1, US 2006/0066793 A1 and US 2006/0103804 A1. PSA-OCB displays are described, for example, in T.-J- Chen et al., Jpn. J. Appl. Phys. (2006), 45, 2702-2704 and S. H. Kim, L.-C- Chien, Jpn. J. Appl. Phys. (2004), 43, 7643-7647. PSA-IPS displays are described, for example, in U.S. Pat. No. 6,177,972 and Appl. Phys. Lett. (1999), 75(21), 3264. PSA-TN displays are described, for example, in Optics Express (2004), 12(7), 1221. PSA-VA-IPS displays are disclosed, for example, in WO 2010/089092 A1.

Like the conventional LC displays described above, PSA displays can be operated as active-matrix or passive-matrix (PM) displays. In the case of active-matrix displays, individual pixels are usually addressed by integrated, non-linear active elements, such as, for example, transistors (for example thin-film transistors or "TFTs"), while in the case of passive-matrix displays, individual pixels are usually addressed by the multiplex method, both methods being known from the prior art.

In particular for monitor and especially TV applications, optimisation of the response times, but also of the contrast and luminance (i.e. also transmission), of the LC display is still sought after. The PSA method can provide crucial advantages here. In particular in the case of PSA-VA displays, a shortening of the response times, which correlate with a pretilt which can be measured in test cells, can be achieved without significant adverse effects on other parameters.

In the prior art, polymerisable compounds of the following formula, for example, are used for PSA-VA:

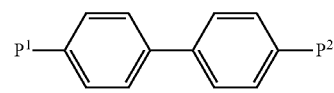

in which P denotes a polymerisable group, usually an acrylate or methacrylate group, as described, for example, in U.S. Pat. No. 7,169,449.

The effort for the production of a polyimide layer, treatment of the layer and improvement with bumps or polymer layers is relatively great. A simplifying technology which on the one hand reduces production costs and on the other hand helps to optimise the image quality (viewing-angle dependence, contrast, response times) would therefore be desirable.

The specification WO 2012/038026 A1 describes self-aligning mesogens (non-polymerisable, conventional self-alignment additives) containing a hydroxyl group which is located on a mesogenic basic structure comprising two or more rings. The structures disclosed therein do not contain a polymerisable group arranged in accordance with the invention.

However, the existing approaches for obtaining VA display applications without polyimide layer are not yet entirely satisfactory.

The present invention relates to an LC medium comprising a low-molecular-weight, non-polymerisable, liquid-crystalline component and a polymerisable or polymerised component comprising one or more compounds of the formula I, where the polymerised component is obtainable by polymerisation of the polymerisable component, $$P\text{-Sp-}[A^3\text{-}Z^3]_m\text{-}[A^2]_k\text{-}[Z^2]_n\text{-}A^1\text{-}R^a \qquad (I)$$

in which $A^1, A^2, A^3$ each, independently of one another, denote an aromatic, heteroaromatic, alicyclic or heterocyclic group, which may also contain fused rings, and which may also be mono- or polysubstituted by a group L, L in each case, independently of one another, denotes H, F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, P denotes a polymerisable group, Sp denotes a spacer group (also called spacer) or a single bond, $Z^2$ in each case, independently of one another, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, $Z^3$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, n1 denotes 1, 2, 3 or 4,
n denotes 0 or 1,
m denotes 0, 1, 2, 3, 4, 5 or 6, preferably 0, 1, 2 or 3,
k denotes 0 or 1,
$R^0$ in each case, independently of one another, denotes alkyl having 1 to 12 C atoms,
$R^{00}$ in each case, independently of one another, denotes H or alkyl having 1 to 12 C atoms,
$R^a$ denotes an anchor group of the formula

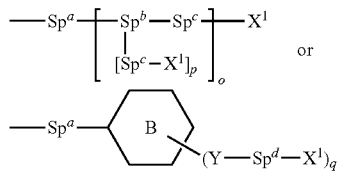

p denotes 1 or 2,
q denotes 2 or 3,
B denotes a substituted or unsubstituted ring system or condensed ring system, preferably a 5- to 6-membered ring system, in particular selected from benzene, pyridine, cyclohexane, dioxane, tetrahydrofuran or tetrahydropyran,
Y, independently of one another, denotes —O—, —S—, —C(O)—, —C(O)O—, —OC(O)—, —NR$^{11}$— or a single bond,
o denotes 0 or 1,
$X^1$, independently of one another, denotes H, alkyl, fluoroalkyl, OH, NH$_2$, NHR$^{11}$, NR$^{11}$$_2$, OR$^{11}$, C(O)OH, —CHO, where at least one group $X^1$ denotes a radical selected from —OH, —NH$_2$, NHR$^{11}$, C(O)OH and —CHO,
R11 denotes alkyl having 1 to 12 C atoms,
Sp$^a$, Sp$^c$, Sp$^d$ each, independently of one another, denote a spacer group or a single bond,
Sp$^b$ denotes a tri- or tetravalent group, preferably CH, N or C.

The polymerisable or polymerised component of the LC medium optionally comprises further polymerisable compounds. Use is preferably made of those which are suitable for the PSA principle.

The invention furthermore relates to an LC display comprising an LC cell having two substrates and at least two electrodes, where at least one substrate is transparent to light and at least one substrate has one or two electrodes, and a layer of an LC medium according to the invention located between the substrates. The LC display is preferably one of the PSA type.

The invention furthermore relates to novel compounds of the formula I, as disclosed above and below, which are characterised in that they have two or more rings, i.e. compounds of the formula I in which k=1.

The invention furthermore relates to the use of compounds of the formula I as additive for LC media for effecting homeotropic alignment with respect to a surface delimiting the LC medium.

A further aspect of the present invention is a process for the preparation of an LC medium according to the invention, which is characterised in that one or more polymerisable self-alignment additives (compounds of the formula I) are mixed with a low-molecular-weight, liquid-crystalline component, and optionally one or more polymerisable compounds and optionally a further, non-polymerisable self-alignment additive (for example of the formula I') and/or any desired additives are added.

The invention furthermore relates to a process for the production of an LC display comprising an LC cell having two substrates and at least two electrodes, where at least one substrate is transparent to light and at least one substrate has one or two electrodes, comprising the process steps:

filling of the cell with an LC medium according to the invention, where homeotropic (vertical) alignment of the LC medium with respect to the substrate surfaces becomes established, and polymerisation of the polymerisable component(s), optionally with application of a voltage to the cell or under the action of an electric field, in one or more process steps.

The use according to the invention of the self-alignment additives as additives of LC media is not tied to particular LC media. The LC medium or the non-polymerisable component present therein can have positive or negative dielectric anisotropy. The LC medium is preferably nematic, since most displays based on the VA principle comprise nematic LC media.

The polymerisable self-alignment additive is introduced into the LC medium as additive. It effects homeotropic alignment of the liquid crystal with respect to the substrate surfaces (such as, for example, a surface made from glass or coated with ITO or with polyimide). In view of the investigations in connection with this invention, it appears that the polar anchor group interacts with the substrate surface. This causes the self-alignment additives on the substrate surface to align and induce homeotropic alignment of the liquid crystal. In this view, the anchor group should be sterically accessible, i.e. not, as in the case of a phenolic (phenyl-substituted) OH group, surrounded by tert-butyl groups in the ortho position, as is the case, for example, in 2,6-di-tert-butylphenol, i.e. compounds containing a head group (corresponding to the radicals $R^a$ or -$A^1$-$R^a$) of the formula

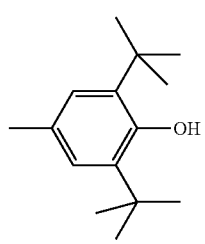 [SMILES: Cc1cc(C(C)(C)C)c(O)c(C(C)(C)C)c1]

are preferably not encompassed in formula I and the sub-formulae. More generally, phenolic head groups -Ph- OH in which Ph denotes phenylene which is substituted by 1 to 4 groups L are preferably not encompassed.

The LC cell of the LC display according to the invention preferably has no alignment layer, in particular no polyimide layer for homeotropic alignment of the LC medium. Alignment layer here means a layer which is already present before the cell is filled. The polymerised component of the LC medium is in this connection not regarded as an alignment layer. In the case where an LC cell nevertheless has an alignment layer or a comparable layer, this layer is, in accordance with the invention, not the cause of the homeotropic alignment. Rubbing of, for example, polyimide layers is, in accordance with the invention, not necessary in order to achieve homeotropic alignment of the LC medium with respect to the substrate surface. The LC display according to the invention is preferably a VA display comprising an LC medium having negative dielectric anisotropy and electrodes arranged on opposite substrates. Alternatively, it is a VA-IPS display comprising an LC medium having positive dielectric anisotropy and interdigital electrodes arranged at least on one substrate.

The polymerisable self-alignment additive of the formula I is preferably employed in a concentration of less than 10% by weight, particularly preferably ≤5% by weight and very particularly ≤3% by weight. It is preferably employed in a concentration of at least 0.05% by weight, preferably at least 0.2% by weight. The use of 0.1 to 2.5% by weight of the self-alignment additive generally already results in completely homeotropic alignment of the LC layer in the case of the usual cell thicknesses (3 to 4 μm) with the conventional substrate materials and under the conventional conditions of the production processes of an LC display. Due to the polymerisable nature, higher concentrations of self-alignment additives are also possible without influencing the LC medium in the long term, since the polymerisable substance is bound again by the polymerisation.

Besides the polymerisable self-alignment additives of the formula I, the LC medium according to the invention may also comprise further self-alignment additives which are not polymerisable or have a different structure. In a preferred embodiment, the LC medium therefore comprises one or more self-alignment additives without a polymerisable group (conventional self-alignment additives). The concentration of the polymerisable self-alignment additives and the conventional self-alignment additives together is preferably the values indicated above, i.e., for example, 0.1 to 2.5% by weight. With a combination of self-alignment additives with and without a polymerisable group, the additional advantage is achieved that the self-alignment of the LC medium becomes more stable to the influence of stress (increased processability).

The further, non-polymerisable self-alignment additives can have a structure of the formula I':

in which m, k, n and the group $R^a$ are as defined for formula I above, and $A^1$, $A^2$, $A^3$ each, independently of one another, denote an aromatic, heteroaromatic, alicyclic or heterocyclic group, which may also contain fused rings, and which may also be mono- or polysubstituted by a group L, $Z^2$ in each case, independently of one another, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, $Z^3$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, n1 denotes 1, 2, 3 or 4, L in each case, independently of one another, denotes H, F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, $R^0$ in each case, independently of one another, denotes alkyl having 1 to 12 C atoms, $R^{00}$ in each case, independently of one another, denotes H or alkyl having 1 to 12 C atoms, and $R^1$, independently of one another, denotes H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another and in which, in addition, one or more H atoms may be replaced by F or Cl.

In contrast to the formula I, the formula I' contains no polymerisable group -Sp-P or P.

Preferred and illustrative structures of the self-alignment additives, in particular the polymerisable self-alignment additives, are disclosed below:

The anchor group $R^a$ contains by definition one, two or three groups $X^1$, which are intended to serve as bonding element to a surface. The spacer groups are intended to form a flexible bond between the mesogenic group with rings and the group(s) $X^1$. The structure of the spacer groups is therefore very variable and in the most general case of the formula I not definitively defined. The person skilled in the art will recognise that a multiplicity of possible variations of chains come into question here.

An anchor group of the formula

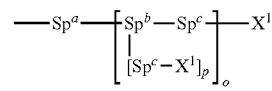

as defined above and below, preferably stands for an anchor group selected from the following formulae:

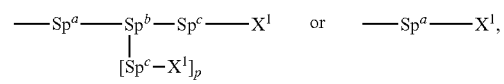

in which in each case independently the groups are as defined above and below, particularly preferably for a group of the formulae

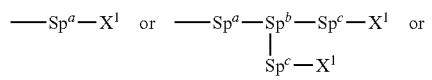

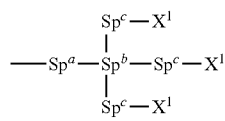

in which in each case independently the groups are as defined above and below.

Particularly preferred anchor groups of the formula $R^a$ are selected from the following part-formulae, where the group $R^a$ is bonded to the group $A^1$ of the formula I or I' via the dashed bond:

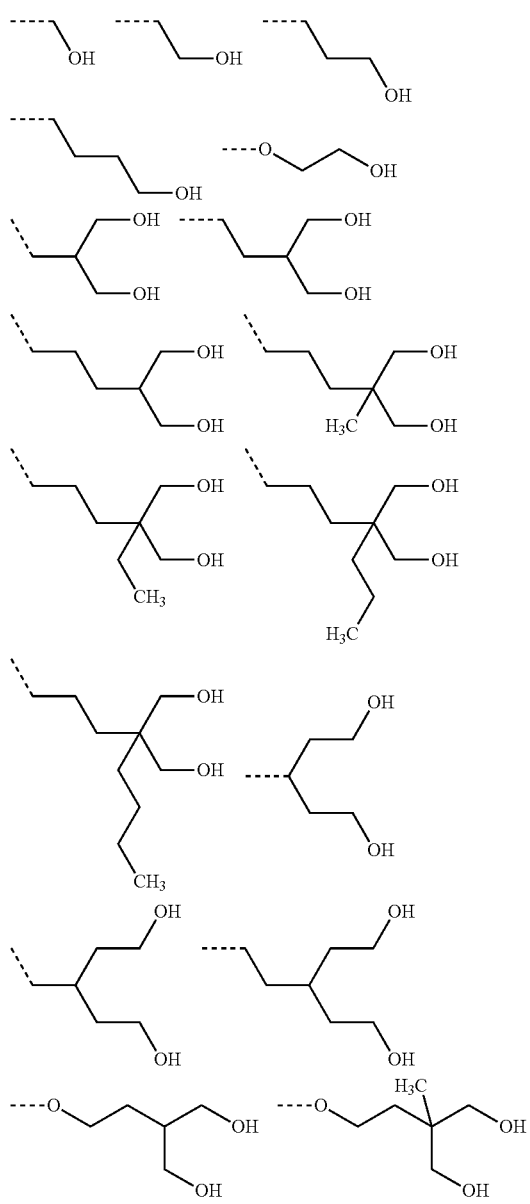

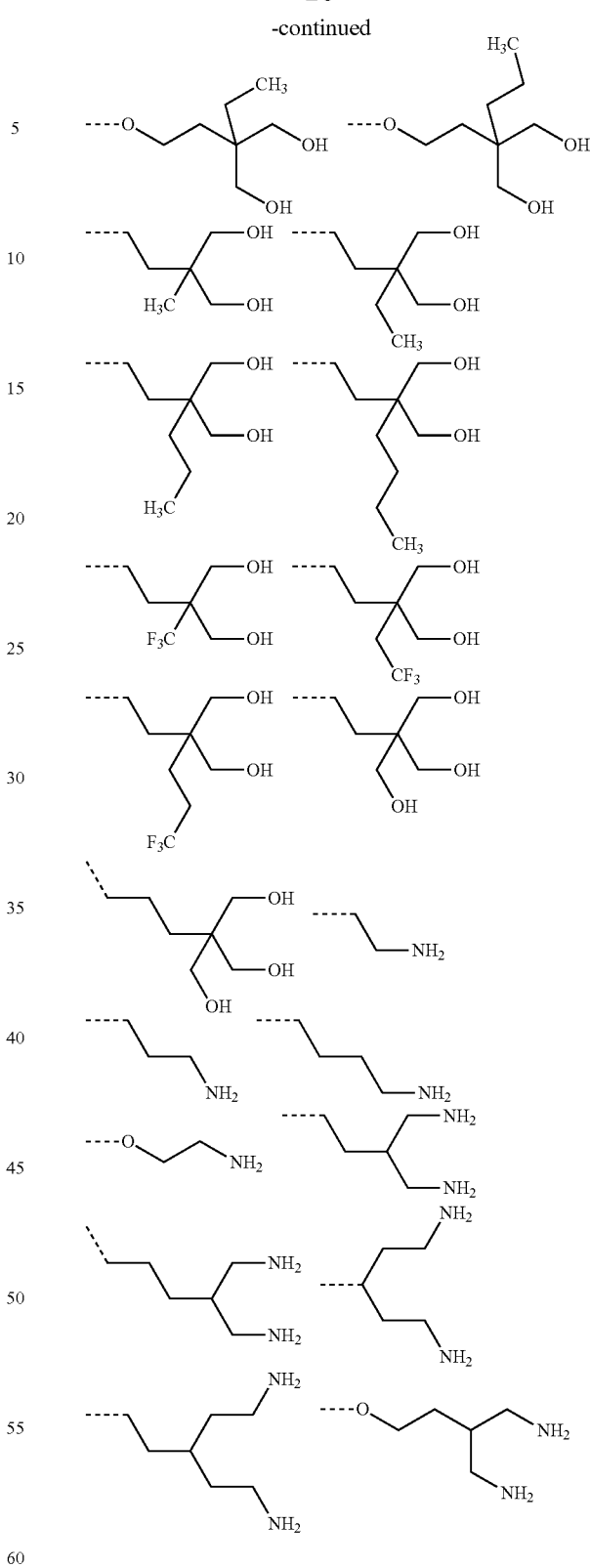

The anchor group $R^a$ in the above formulae I and I' and sub-formulae thereof particularly preferably contains one, two or three OH groups.

The term "spacer group" or "spacer", generally denoted by "Sp" (or $Sp^{a/c/d/1/2/3}$) herein, is known to the person skilled in the art and is described in the literature, for example in Pure Appl. Chem. 73(5), 888 (2001) and C.

Tschierske, G. Pelzl, S. Diele, Angew. Chem. (2004), 116, 6340-6368. In the present disclosure, the term "spacer group" or "spacer" denotes a connecting group, for example an alkylene group, which connects a mesogenic group to a polymerisable group. Whereas the mesogenic group generally contains rings, the spacer group is generally without ring systems, i.e. is in chain form, where the chain may also be branched. The term chain is applied, for example, to an alkylene group. Substitutions on and in the chain, for example by —O— or —COO—, are generally included. In functional terms, the spacer (the spacer group) is a bridge between linked functional structural parts which facilitates a certain spatial flexibility to one another.

The index k in the formula I preferably denotes 1, m preferably denotes 1 or 2, particularly preferably 1, and n preferably denotes 0.

The group L preferably denotes H, F, Cl, CH$_3$, ethyl, propyl, cyclopropyl or isopropyl.

The group Sp$^b$ preferably denotes a trivalent group of the formula selected from CH, C(Me), C(CH$_2$CH$_3$) or N, or the tetravalent group C (tetravalent carbon atom).

The group Sp$^a$ preferably does not denote a single bond, particularly preferably denotes a group selected from the formulae —CH$_2$—, —CH$_2$CH$_2$—, —OCH$_2$CH$_2$—, —CH$_2$CH$_2$CH$_2$—, —OCH$_2$CH$_2$CH$_2$—, —CH$_2$CH$_2$CH$_2$CH$_2$—, —OCH$_2$CH$_2$CH$_2$CH$_2$—, —CH$_2$CH$_2$OCH$_2$CH$_2$—, —OCH$_2$CH$_2$OCH$_2$CH$_2$—.

The group Sp$^c$ or Sp$^d$ preferably denotes a group selected from the formulae —CH$_2$—, —CH$_2$CH$_2$—, —CH$_2$CH$_2$CH$_2$—, —CH$_2$CH$_2$CH$_2$CH$_2$—, —CH$_2$CH$_2$OCH$_2$CH$_2$—.

An above-defined anchor group of the formula

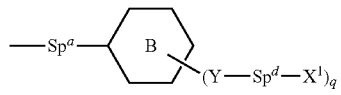

preferably stands for

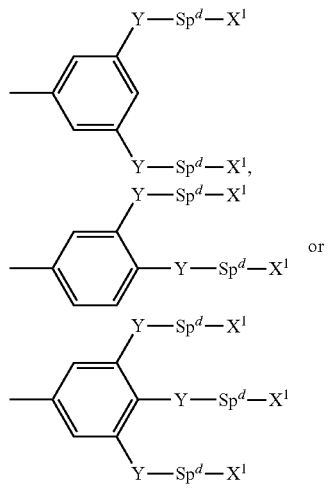

in which Y, Sp$^d$ and X$^1$ are as defined for formula I.

The ring groups A$^1$, A$^2$, A$^3$ in the above formulae I and I' and sub-formulae thereof preferably each independently denote 1,4- or 1,3-phenylene, naphthalene-1,4-diyl or naphthalene-2,6-diyl, where, in addition, one or more CH groups in these groups may be replaced by N, cyclohexane-1,4-diyl, in which, in addition, one or more non-adjacent CH$_2$ groups may be replaced by O and/or S, 3,3'-bicyclobutylidene, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, perhydrocyclopenta[a]phenanthrene-3,17-diyl (in particular gonane-3,17-diyl), where all these groups may be unsubstituted or mono- or polysubstituted by a group L.

Preferably, at least one of the groups A$^1$, A$^2$ and A$^3$, if present, is substituted by at least one group L, where in this case L does not denote H.

Particularly preferably, the groups A$^1$, A$^2$, A$^3$ each independently denote a group selected from
a) the group consisting of 1,4-phenylene and 1,3-phenylene, in which, in addition, one or more H atoms may be replaced by L,
b) the group consisting of trans-1,4-cyclohexylene, 1,4-cyclohexenylene and 4,4'-bicyclohexylene, in which, in addition, one or more non-adjacent CH$_2$ groups may be replaced by —O— and/or —S— and in which, in addition, one or more H atoms may be replaced by F or L. The groups A$^1$ and A$^2$ especially preferably denote a group from the above sub-group a). A$^1$ and A$^2$ independently very particularly preferably denote 1,4-phenylene or cyclohexane-1,4-diyl, each of which may be mono- or polysubstituted by a group L.

The compounds of the formula I preferably encompass one or more compounds of the formula I1,

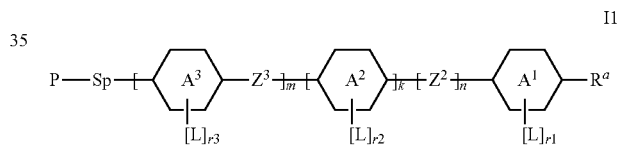

and more preferably of the formulae IA, IB, IC, ID, IE or IF:

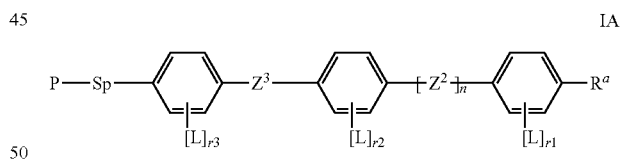

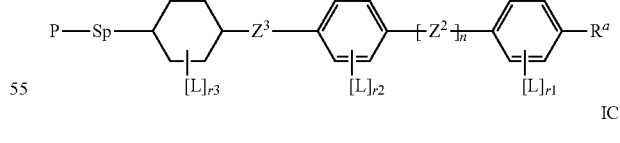

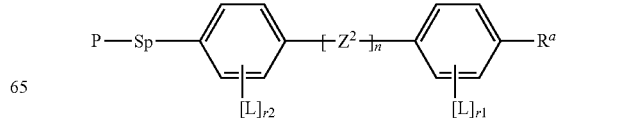

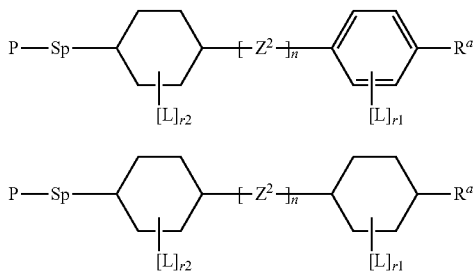

in which in each case independently $R^a$, $A^1$, $A^2$, $A^3$, $Z^2$, $Z^3$, L, Sp, P, m, k and n are as defined for formula I, and r1, r2, r3 independently denote 0, 1, 2 or 3.

Furthermore, it is, in a particular embodiment of the invention, preferred that r1+r2+r3>0 in the formulae I1 and IA, IB and IC, and correspondingly r1+r2>0 and L does not denote H for formulae ID, IE and IF, i.e. at least one lateral substituent L is present within the groups $A^1$, $A^2$, $A^3$ or $A^1$, $A^2$. The compounds according to the invention containing such a group L have, inter alia, improved solubility.

In the formulae I and I' above and below and in the preferred sub-formulae, the index n preferably, in each case independently, denotes 0.

Particularly preferred compounds of the formula I are illustrated by the following formulae:

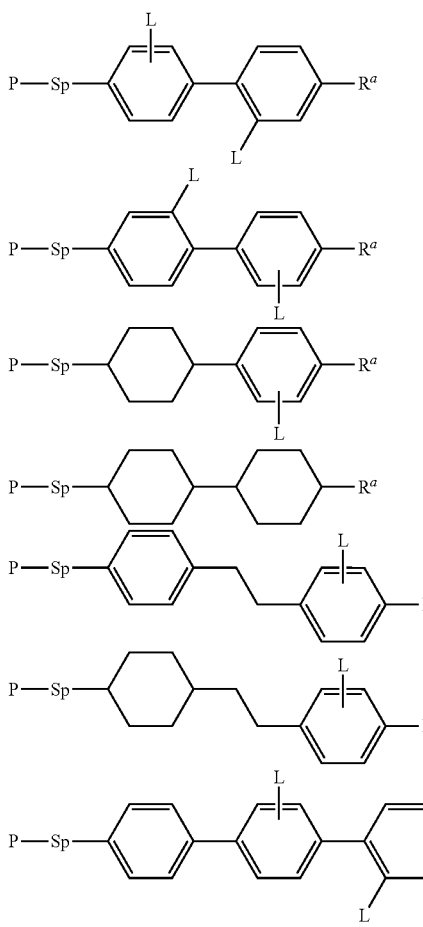

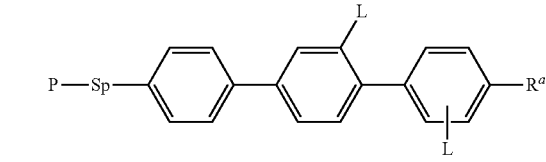
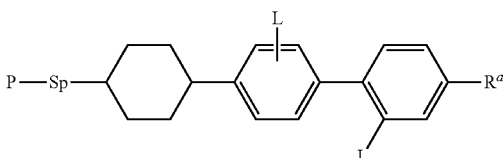
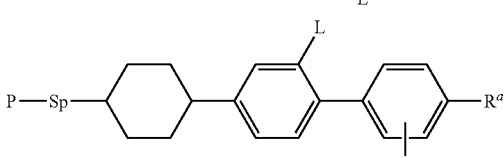
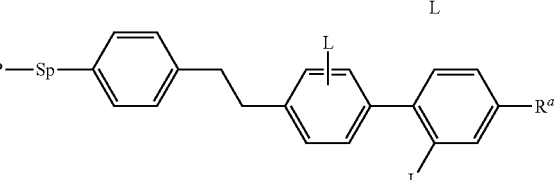
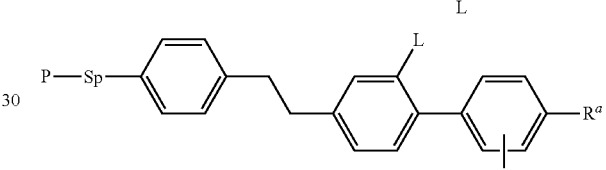
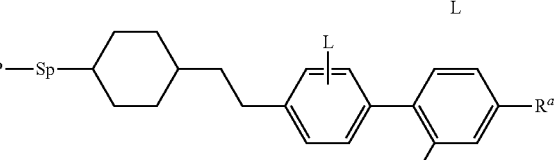
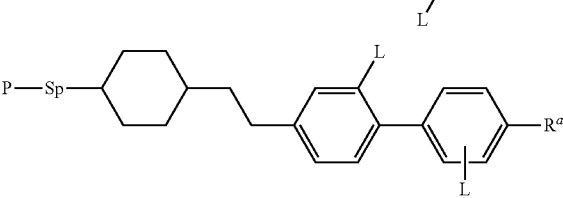

in which $R^1$, Sp, P, L and $R^a$ independently are as defined for formula I.

The compounds of the formula I' (conventional self-alignment additives) preferably encompass compounds of the formulae IA', IB', IC', ID' or IE':

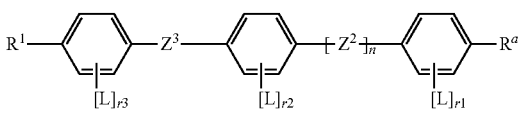
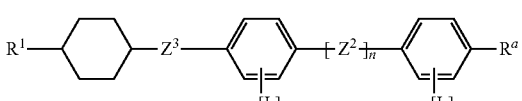

-continued

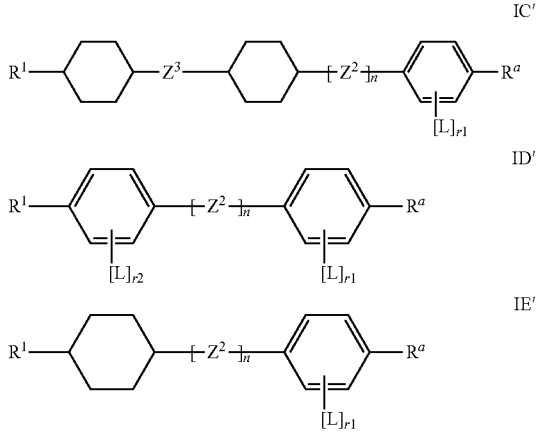

in which $R^1$, $R^a$, $Z^2$, $Z^3$, L and n independently are as defined for the above formula I', and r1, r2, r3 independently denote 0, 1, 2, 3 or 4, preferably 0, 1 or 2.

The preparation of the conventional self-alignment additives is disclosed, for example, in the specification WO 2012/038026.

The term "aryl" denotes an aromatic carbon group or a group derived therefrom. The term "heteroaryl" denotes "aryl" as defined above containing one or more heteroatoms.

Aryl and heteroaryl groups may be monocyclic or polycyclic, i.e. they may contain one ring (such as, for example, phenyl) or two or more fused rings. At least one of the rings here has an aromatic configuration. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, naphthyl, anthracene, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, coumarin or combinations of these groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O N, S and Se.

The (non-aromatic) alicyclic and heterocyclic groups may be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methanoindane-2,5-diyl.

In connection with the present invention, the term "alkyl" denotes a straight-chain or branched, saturated or unsaturated, preferably saturated, aliphatic hydrocarbon radical having 1 to 15 (i.e. 1, 2, 3, 4, 5, 6, 7, 8, 9, 10, 11, 12, 13, 14 or 15) carbon atoms.

The term "cyclic alkyl" encompasses alkyl groups which have at least one carbocyclic part, i.e., for example, also cycloalkylalkyl, alkylcycloalkyl and alkylcycloalkylalkyl. The carbocyclic groups encompass, for example, cyclopropyl, cyclobutyl, cyclopentyl, cyclohexyl, cycloheptyl, cyclooctyl, etc.

"Halogen" in connection with the present invention stands for fluorine, chlorine, bromine or iodine, preferably for fluorine or chlorine.

The above preferred compounds of the formula I can in principle be prepared by the following illustrative synthetic routes (Schemes 1a-3b):

Schema 1a:

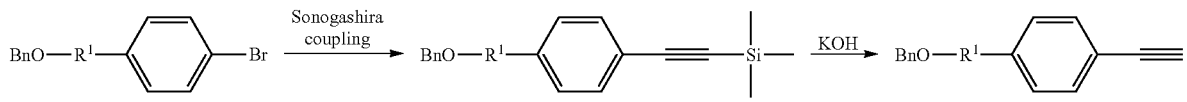

-continued
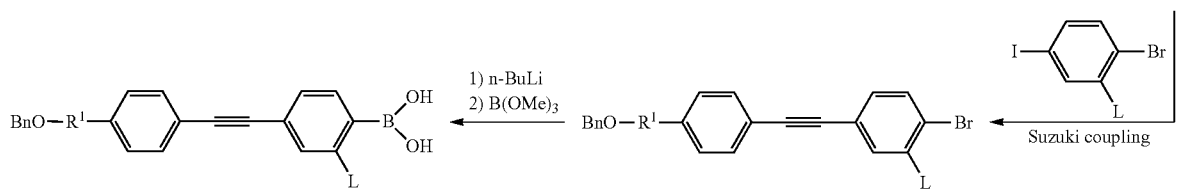
R[1] = spacer,
L = substituent (as described above).
Scheme 1b:
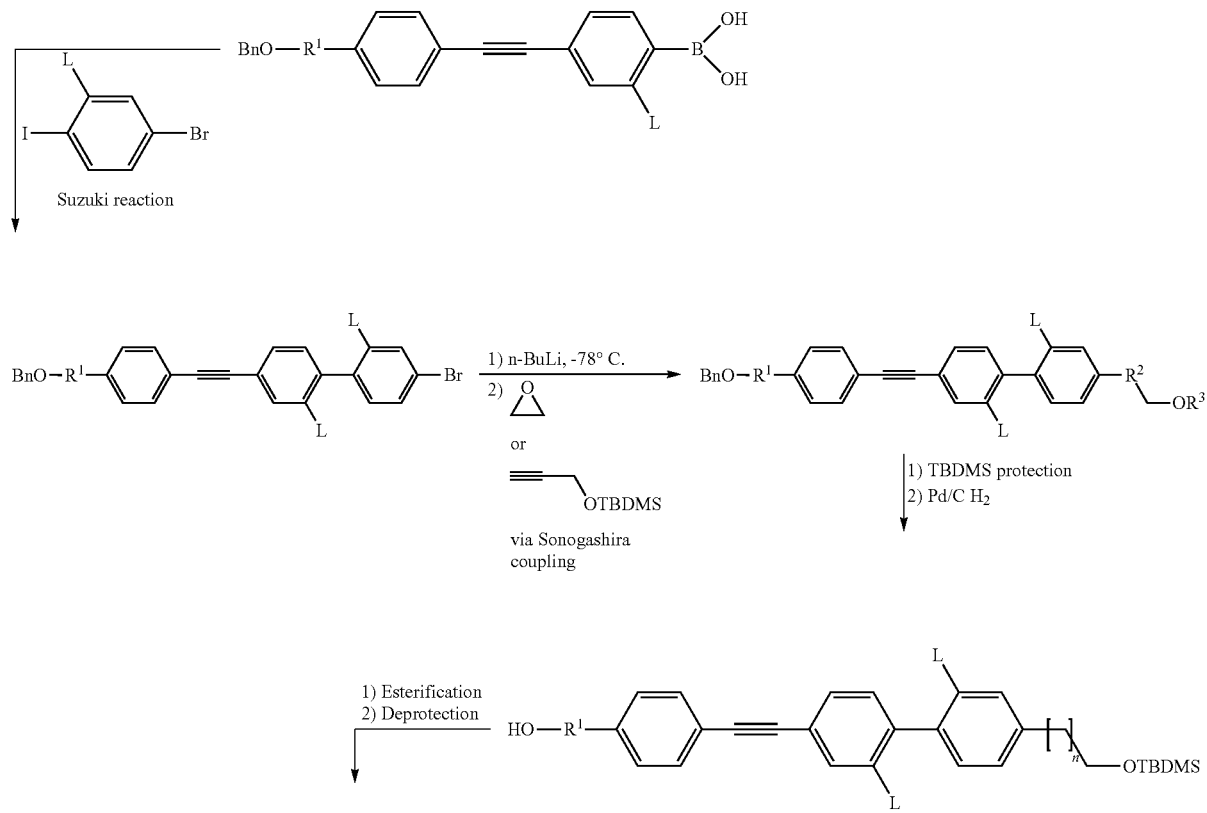
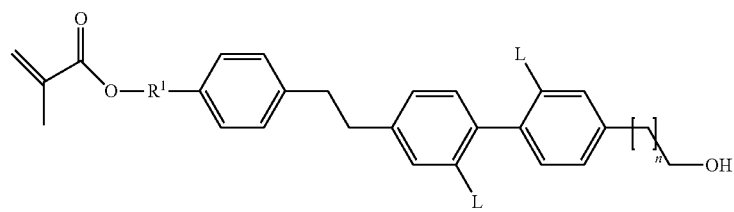
R[1/2] = spacer,
R[3] = H or TBDMS (tert-butyldimethylsilyl),
L = sub-stituent (as described above),
n = e.g. 1-2.

Schema 2a:
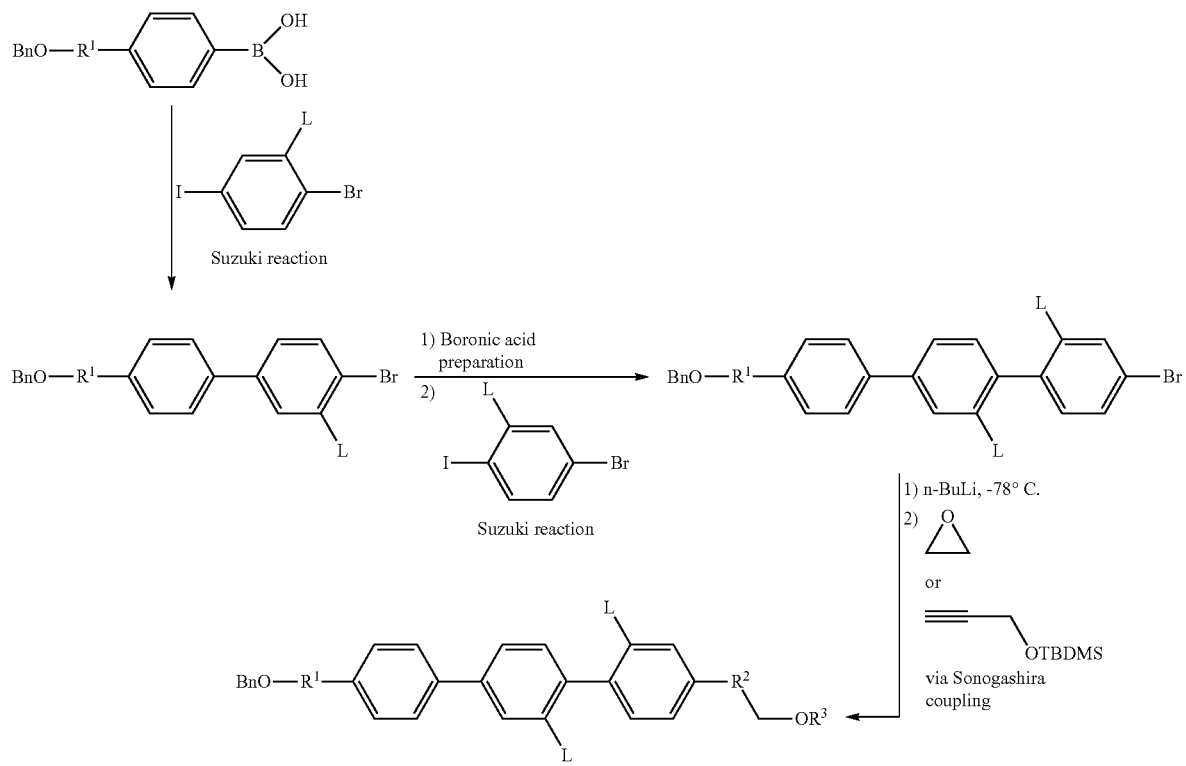
$R^{1/2}$ = spacer,
$R^3$ = H or TBDMS,
L = substituent (as described above),
n = e.g. 1-2.
Schema 2b:
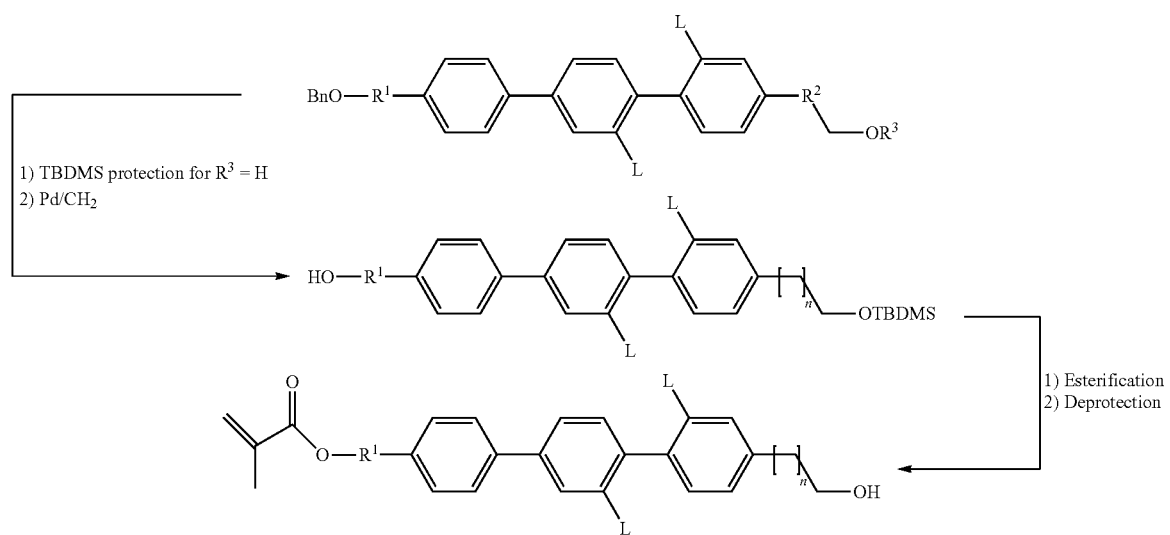
$R^{1/2}$ = spacer,
$R^3$ = H or TBDMS,
L = substituent (as described above),
n = e.g. 1-2.

Schema 3a:
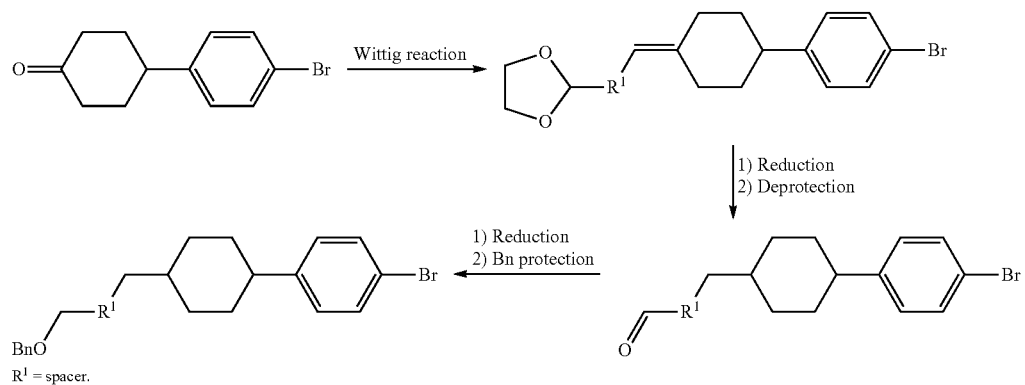
Schema 3b:
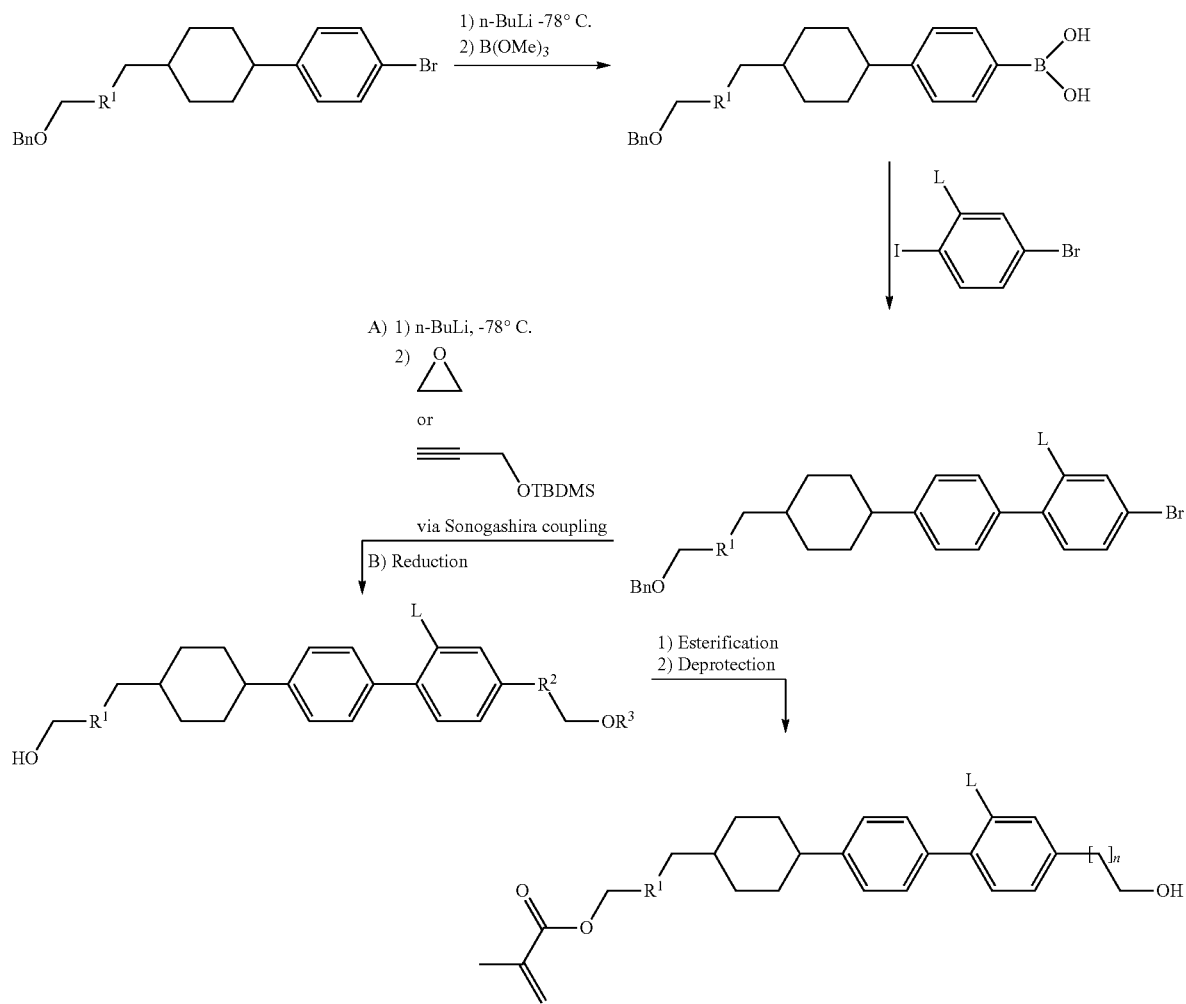
$R^{1/2}$ = spacer,
$R^3$ = H or TBDMS,
L = substituent (as described above),
n = e.g. 1-2.

Besides the compounds of the formula I, the polymerisable component of the LC medium according to the invention preferably comprises further polymerisable or (partially) polymerised compounds. These are preferably conventional polymerisable compounds without an anchor group, preferably mesogenic compounds, in particular those which are suitable for the PSA technique. Polymerisable compounds which are preferred for this purpose are the structures indicated below for formula M and the subformulae thereof. The polymer formed therefrom is able to stabilise the alignment of the LC medium, optionally form a passivation layer and optionally generate a pre-tilt.

The LC media according to the invention therefore preferably comprise >0 to <5% by weight, particularly preferably 0.05 to 1% by weight and very particularly preferably 0.2 to 1% by weight of polymerisable compounds without an anchor group $R^a$, in particular compounds of the formula M as defined below and the preferred formulae falling thereunder.

The polymerisation of the polymerisable component(s) is carried out together or in part-steps under different polymerisation conditions. The polymerisation is preferably carried out under the action of UV light. In general, the polymerisation is initiated with the aid of a polymerisation initiator and UV light. In the case of the preferred acrylates, virtually complete polymerisation is achieved in this way. During the polymerisation, a voltage can optionally be applied to the electrodes of the cell or another electric field can be applied in order additionally to influence the alignment of the LC medium.

Particular preference is given to LC media according to the invention which, besides the compounds of the formula I, comprise further polymerisable or (partially) polymerised compounds (without an anchor group) and further self-alignment additives which are not polymerisable. These further non-polymerisable self-alignment additives are preferably those as described above, cf. formulae I', IA', IB', IC', ID', IE'.

The optionally present further monomers of the polymerisable component of the LC medium are preferably described by the following formula M:

$$P^1\text{-}Sp^1\text{-}A^2\text{-}(Z^1\text{-}A^1)_n\text{-}Sp^2\text{-}P^2 \quad\quad M$$

in which the individual radicals have the following meanings:

$P^1$, $P^2$ each, independently of one another, denote a polymerisable group, $Sp^1$, $Sp^2$ on each occurrence, identically or differently, denote a spacer group or a single bond, $A^1$, $A^2$ each, independently of one another, denote a radical selected from the following groups:
a) the group consisting of trans-1,4-cyclohexylene, 1,4-cyclohexenylene and 4,4'-bicyclohexylene, in which, in addition, one or more non-adjacent $CH_2$ groups may be replaced by —O— and/or —S— and in which, in addition, one or more H atoms may be replaced by a group L, or a radical of the formula

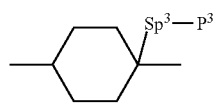

b) the group consisting of 1,4-phenylene and 1,3-phenylene, in which, in addition, one or two CH groups may be replaced by N and in which, in addition, one or more H atoms may be replaced by a group L or -Sp$^3$-P, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

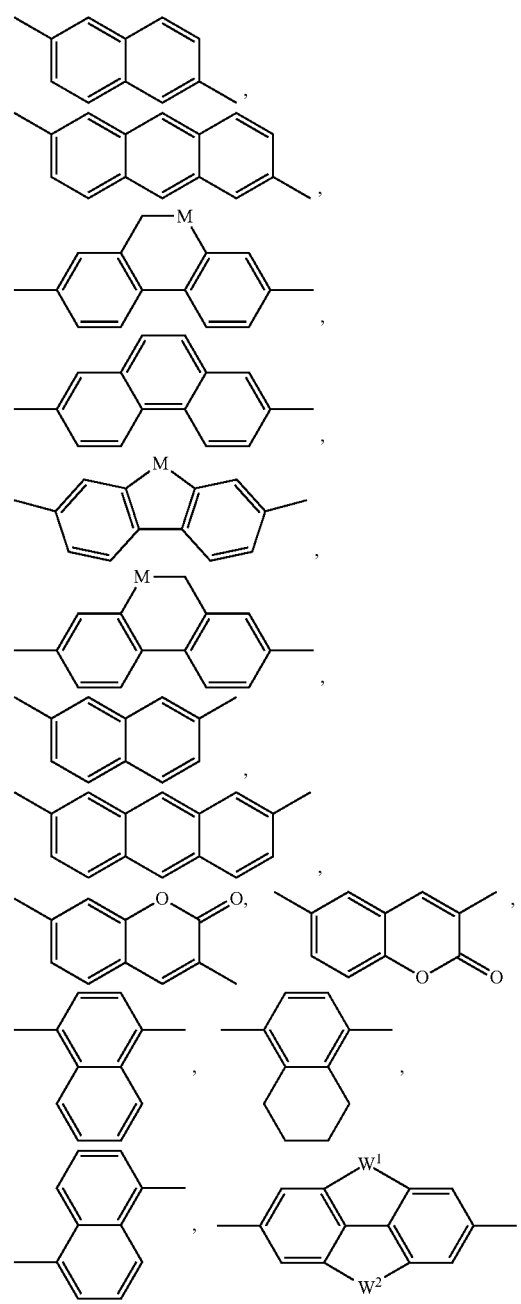

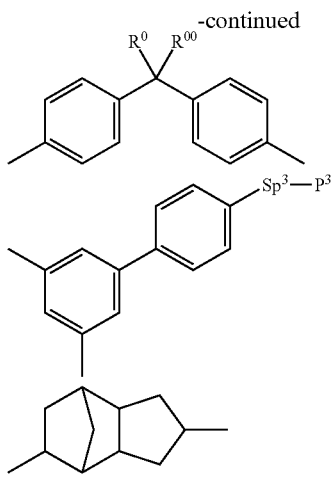

where, in addition, one or more H atoms in these radicals may be replaced by a group L or -Sp³-P, and/or one or more double bonds may be replaced by single bonds, and/or one or more CH groups may be replaced by N, P³ denotes a polymerisable group, Sp³ denotes a spacer group, n denotes 0, 1, 2 or 3, preferably 1 or 2, $Z^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^c$R$^d$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, $R^0$, $R^{00}$ each, independently of one another, denote H, F or straight-chain or branched alkyl having 1 to 12 C atoms, in which, in addition, one or more H atoms may be replaced by F, M denotes —O—, —S—, —CH$_2$—, —CHY$^1$— or —CY$^1$Y$^2$—, and $Y^1$ and $Y^2$ each, independently of one another, have one of the meanings indicated above for $R^0$ or denote Cl or CN, and preferably H, F, Cl, CN, OCF$_3$ or CF$_3$, $W^1$, $W^2$ each, independently of one another, denote —CH$_2$CH$_2$—, —CH=CH—, —CH$_2$—O—, —O—CH$_2$—, —C(R$^c$R$^d$)— or —O—, $R^c$ and $R^d$ each, independently of one another, denote H or alkyl having 1 to 6 C atoms, preferably H, methyl or ethyl.

where one or more of the groups P¹-Sp¹-, -Sp²-P² and -Sp³-P³ may denote a radical R$^{aa}$, with the proviso that at least one of the groups P¹-Sp¹-, -Sp²-P² and -Sp³-P³ present does not denote R$^{aa}$, R$^{aa}$ denotes H, F, Cl, CN or straight-chain or branched alkyl having 1 to 25 C atoms, in which, in addition, one or more non-adjacent CH$_2$ groups may each be replaced, independently of one another, by C(R$^0$)=C(R$^{00}$)—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P¹-Sp¹-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals contain at least two C atoms and the branched radicals contain at least three C atoms), where the groups —OH, —NH$_2$, —SH, —NHR, —C(O)OH and —CHO are not present in R$^{aa}$.

The polymerisable group P, P¹, P² or P³ in the formulae above and below is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P/P¹/P²/P³ are selected from the group consisting of CH$_2$=CW$^1$—CO—O—, CH$_2$=CW$^1$—CO—,

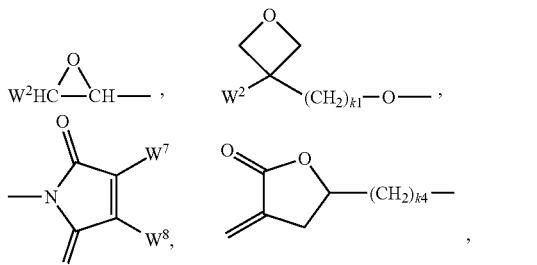

CH$_2$=CW$^2$—(O)$_{k3}$—, CW$^1$=CH—CO—(O)$_{k3}$—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonyl-alkyl having 1 to 5 C atoms, W$^7$ and W$^8$ each, independently of one another, denote H, Cl or alkyl having 1 to 5 C atoms, Phe denotes 1,4-phenylene, which is optionally substituted by one or more radicals L as defined above which are other than P-Sp-, k$_1$, k$_2$ and k$_3$ each, independently of one another, denote 0 or 1, k$_3$ preferably denotes 1, and k$_4$ denotes an integer from 1 to 10.

Particularly preferred groups P/P¹/P²/P³ are selected from the group consisting of CH$_2$=CW$^1$—CO—O—, CH$_2$=CW$^1$—CO—,

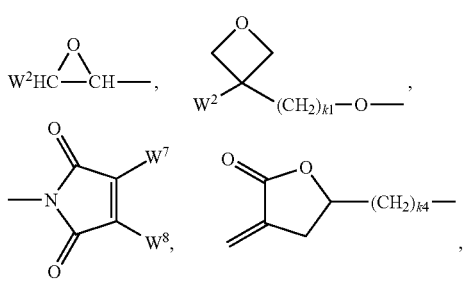

CH$_2$=CW$^2$—O—, CW$^1$=CH—CO—(O)$_{k3}$—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, W$^4$, W$^5$ and W$^6$ each, independently of one another, denote Cl, oxaalkyl or oxacarbonylalkyl having 1 to 5 C atoms, W$^7$ and W$^8$ each, independently of one another, denote H, Cl or alkyl having 1 to 5 C atoms, Phe denotes 1,4-phenylene, k$_1$, k$_2$ and k$_3$ each, independently of one another, denote 0 or 1, k$_3$ preferably denotes 1, and k$_4$ denotes an integer from 1 to 10.

Very particularly preferred groups P/P$^1$/P$^2$/P$^3$ are selected from the group consisting of CH$_2$=CW$^1$—CO—O—, in particular CH$_2$=CH—CO—O—, CH$_2$=C(CH$_3$)—CO—O— and CH$_2$=CF—CO—O—, furthermore CH$_2$=CH—O—, (CH$_2$=CH)$_2$CH—O—CO—, (CH$_2$=CH)$_2$CH—O—,

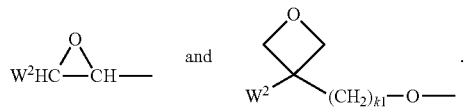

Very particularly preferred groups P/P$^1$/P$^2$/P$^3$ are therefore selected from the group consisting of acrylate, methacrylate, fluoroacrylate, furthermore vinyloxy, chloroacrylate, oxetane and epoxide groups, and of these in turn preferably an acrylate or methacrylate group.

Preferred spacer groups Sp, Sp$^1$, Sp$^2$ or Sp$^3$ are a single bond or selected from the formula Sp"-X", so that the radical P$^{1/2}$-Sp$^{1/2}$- conforms to the formula P$^{1/2}$-SP"-X"-, where Sp" denotes alkylene having 1 to 20, preferably 1 to 12, C atoms, which is optionally mono- or polysubstituted by F, Cl, Br, I or CN and in which, in addition, one or more non-adjacent CH$_2$ groups may each be replaced, independently of one another, by —O—, —S—, —Si(R$^{00}$R$^{000}$)—, —CO—, —CO—, —O—CO—, —O—CO—O—, —S—CO—, —CO—S—, —N(R$^{00}$)—CO—, —O—CO—N(R$^{00}$)—, —N(R$^{00}$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^{00}$)—, —N(R$^{00}$)—CO—, —N(R$^{00}$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, R$^{00}$ in each case independently denotes alkyl having 1 to 12 C atoms, R$^{000}$ in each case independently denotes H or alkyl having 1 to 12 C atoms, and Y$^2$ and Y$^3$ each, independently of one another, denote H, F, Cl or CN.

X" is preferably —O—, —S—, —CO—, —COO—, —OCO—, —O—COO— or a single bond.

Typical spacer groups Sp" are, for example, a single bond, —(CH$_2$)$_{p1}$-, —(CH$_2$CH$_2$O)$_{q1}$—CH$_2$CH$_2$—, —CH$_2$CH$_2$—S—CH$_2$CH$_2$—, or —(SiR$^{00}$R$^{000}$—O)$_{p1}$-, in which p1 is an integer from 1 to 12, q1 is an integer from 1 to 3, and R$^{00}$ and R$^{000}$ have the meanings indicated above.

Particularly preferred groups -Sp"-X"— are —(CH$_2$)$_{p1}$-, —(CH$_2$)$_{p1}$—O—, —(CH$_2$)$_{p1}$—O—CO—, —(CH$_2$)$_{p1}$—O—CO—O—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

The substances of the formula M do not contain an anchor group, i.e. do not contain a group —OH, —NH$_2$, —SH, —NHR$^{11}$, —C(O)OH or —CHO.

Suitable and preferred (co)monomers for use in displays according to the invention are selected, for example, from the following formulae:

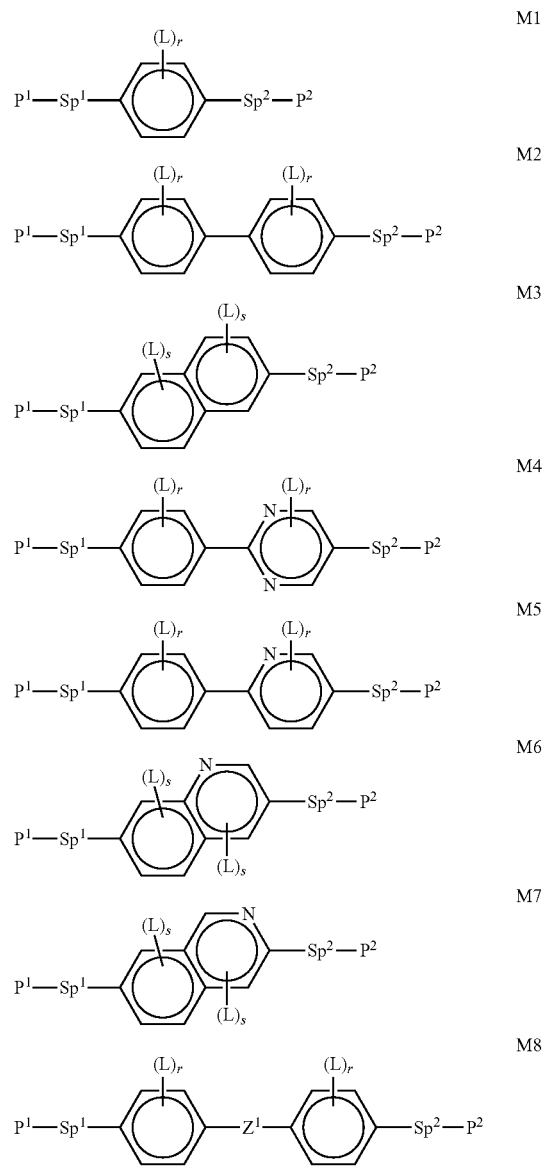

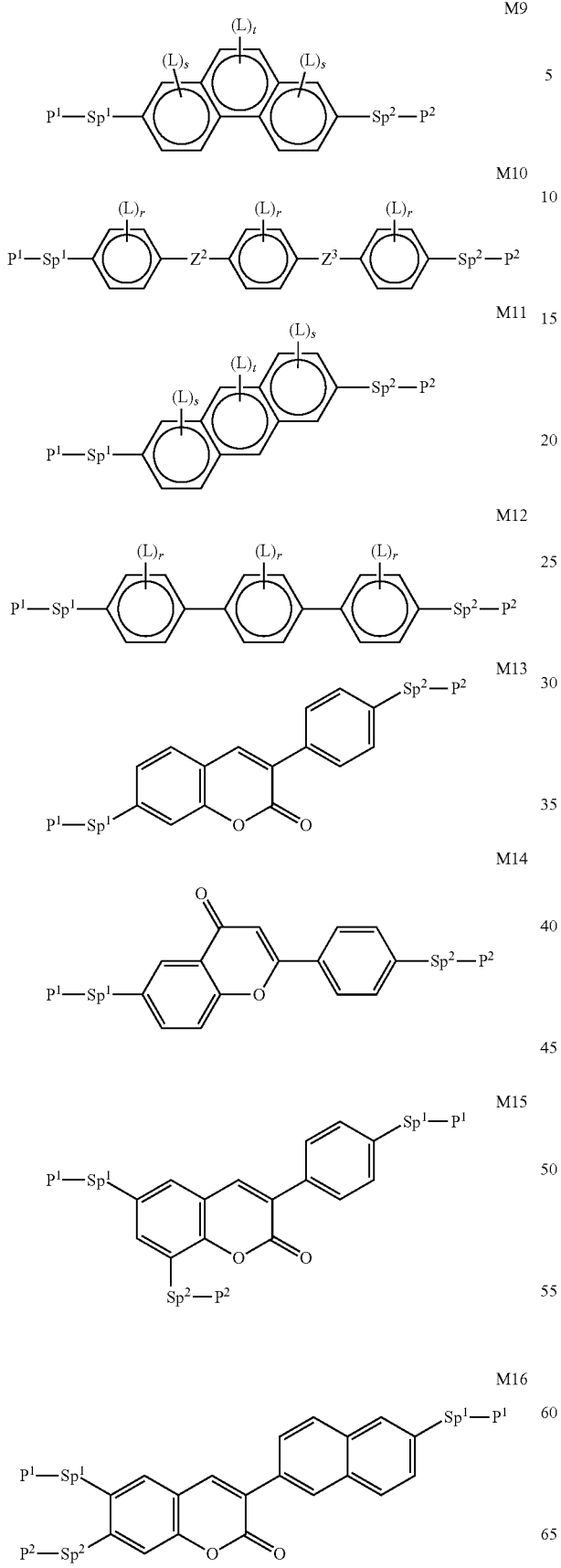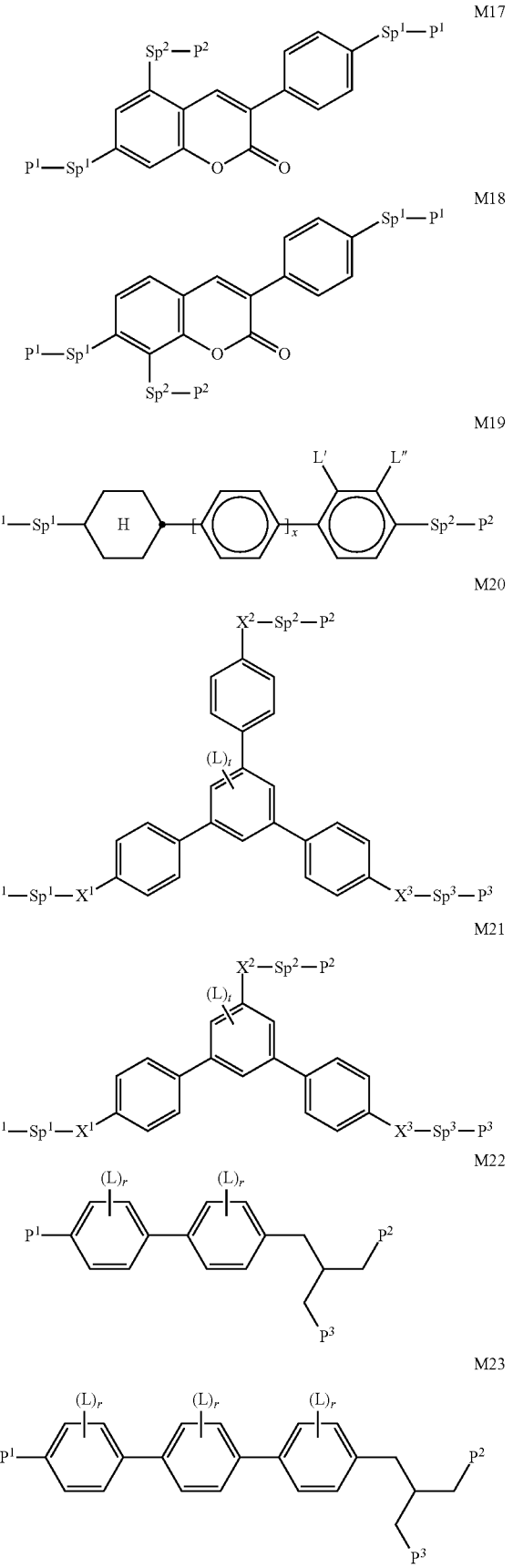

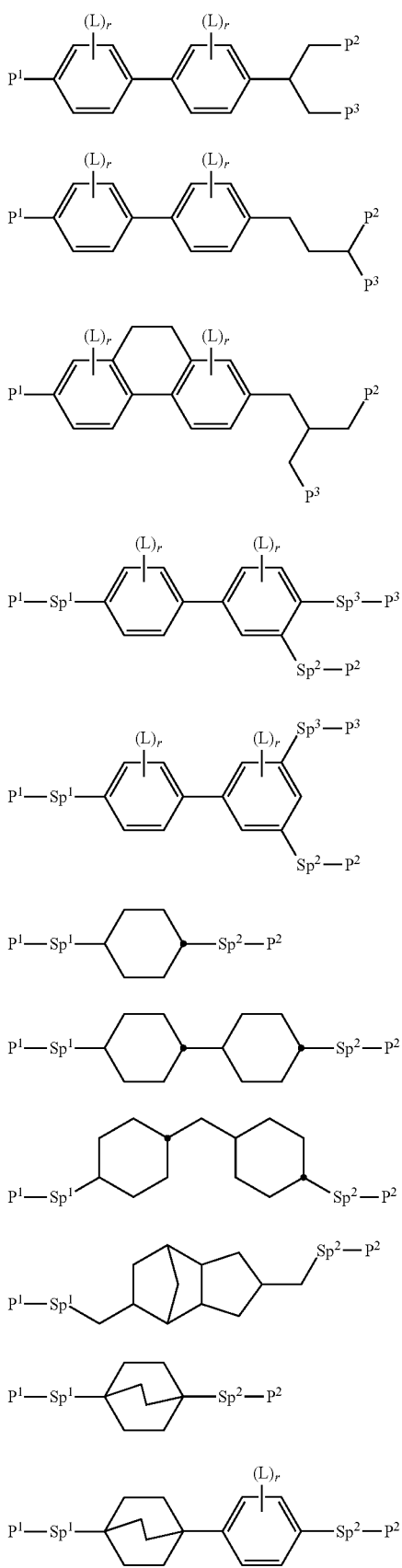

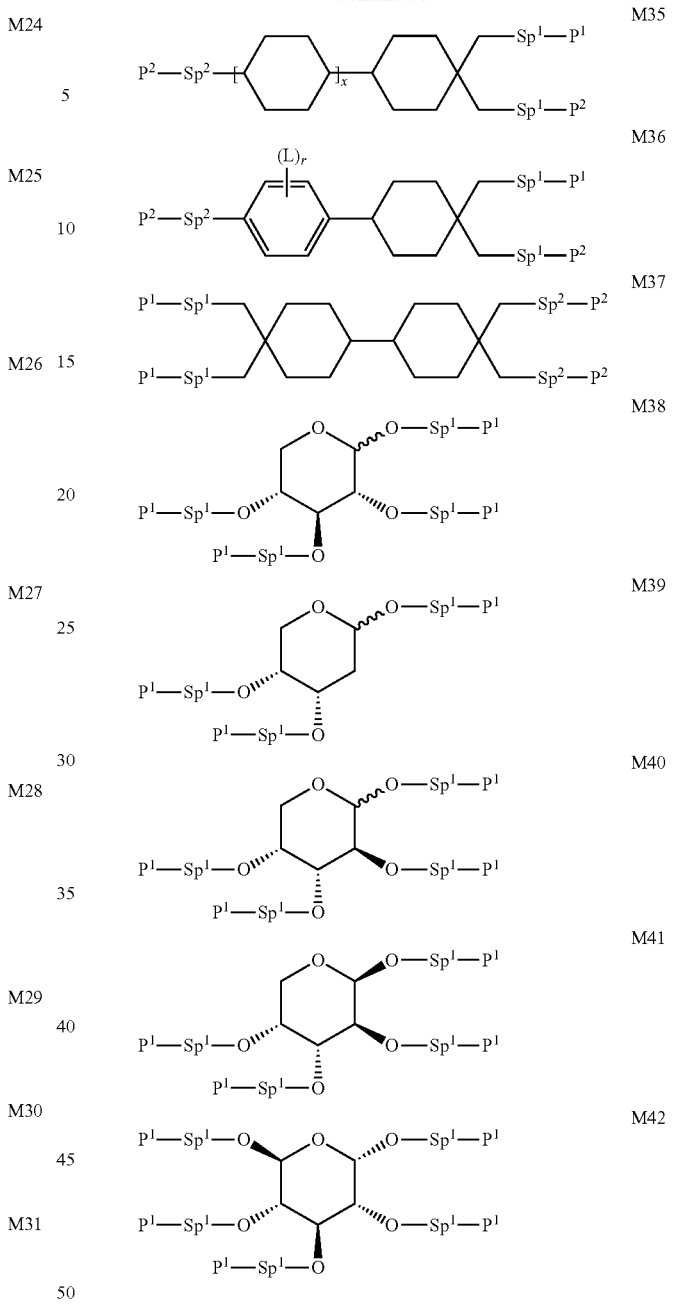

in which the individual radicals have the following meanings:

P¹, P² and P³ each, independently of one another, denote a polymerisable group, preferably having one of the meanings indicated above and below for P, preferably an acrylate, methacrylate, fluoroacrylate, oxetane, vinyloxy or epoxide group, Sp¹, Sp² and Sp³ each, independently of one another, denote a single bond or a spacer group, preferably having one of the meanings indicated above and below for M, and particularly preferably $-(CH_2)_{p1}-$, $-(CH_2)_{p1}-O-$, $-(CH_2)_{p1}-CO-O-$ or $-(CH_2)_{p1}-O-CO-O-$, in which p1 is an integer from 1 to 12, and where the bonding to the adjacent ring in the last-mentioned groups takes place via the O atom, where, in addition, one or more of the radicals P¹-Sp¹-, P²-Sp²- and P³-Sp³- may denote a radical $R^{aa}$, with the proviso that at least one of the radicals $P^1$-$Sp^1$-, $P^2$-$Sp^2$- and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent CH$_2$ groups may each be replaced, independently of one another, by $C(R^0)$=$C(R^{00})$—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), where —OH, —NH$_2$, —SH, —NHR, —C(O)OH and —CHO are not present in the group $R^{aa}$, $R^0$, $R^{00}$ each, independently of one another and on each occurrence identically or differently, denote H or alkyl having 1 to 12 C atoms, $R^y$ and $R^z$ each, independently of one another, denote H, F, CH$_3$ or CF$_3$, $X^1$, $X^2$ and $X^3$ each, independently of one another, denote —CO—O—, O—CO— or a single bond, $Z^1$ denotes —O—, —CO—, —C($R^y R^z$)— or —CF$_2$CF$_2$—, $Z^2$ and $Z^3$ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4, L on each occurrence, identically or differently, denotes F, Cl, CN, SCN, SF$_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

In the compounds of the formulae M1 to M42, the ring group

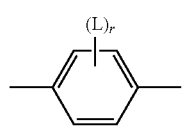

preferably denotes

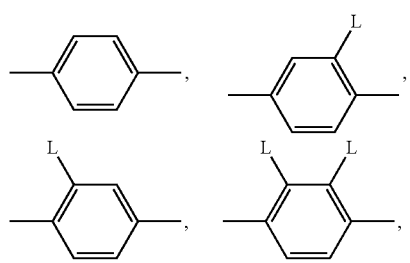

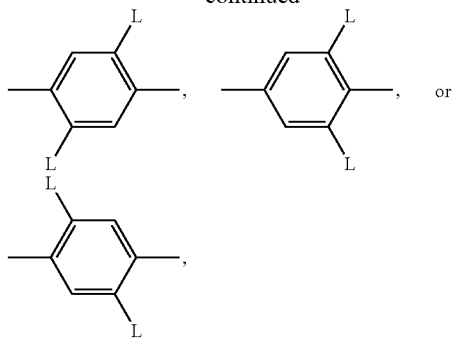

in which L, on each occurrence identically or differently, has one of the above meanings and preferably denotes F, Cl, CN, NO$_2$, CH$_3$, C$_2$H$_5$, C(CH$_3$)$_3$, CH(CH$_3$)$_2$, CH$_2$CH(CH$_3$) C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, particularly preferably F, Cl, CN, CH$_3$, C$_2$H$_5$, OCH$_3$, COCH$_3$, OCF$_3$ or P-Sp-, very particularly preferably F, Cl, CH$_3$, OCH$_3$, COCH$_3$ or OCF$_3$, in particular F or CH$_3$.

The LC medium or the polymerisable component preferably comprises one or more compounds selected from the group of the formulae M1-M28, particularly preferably from the group of the formulae M2-M15, very particularly preferably from the group of the formulae M2, M3, M9, M14 and M15. The LC medium or the polymerisable component preferably comprises no compounds of the formula M10 in which $Z^2$ and $Z^3$ denote —(CO)O— or —O(CO)—.

For the production of PSA displays, the polymerisable compounds are polymerised or crosslinked (if a polymerisable compound contains two or more polymerisable groups) by in-situ polymerisation in the LC medium between the substrates of the LC display, optionally with application of a voltage. The polymerisation can be carried out in one step. It is also possible firstly to carry out the polymerisation with application of a voltage in a first step in order to produce a pretilt angle, and subsequently, in a second polymerisation step, to polymerise or crosslink the compounds which have not fully reacted in the first step without an applied voltage ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of the RMs or the polymerisable component, is preferably 10-10,000 ppm, particularly preferably 50-500 ppm.

Besides the self-alignment additives described above and the optional polymerisable compounds (M) described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive with respect to a polymerisation reaction under the conditions used for the polymerisation of the polymerisable compounds. In principle, any dielectrically negative or positive LC mixture which is suitable for use in conventional VA and VA-IPS displays is suitable as host mixture. The proportion of the host mixture for liquid-crystal displays is generally 95% by weight or more, preferably 97% by weight or more Suitable LC mixtures are known to the person skilled in the art and are described in the literature. LC media for VA displays having negative dielectric anisotropy are described, for example, in EP 1 378 557 A1 or WO 2013/004372.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521.

Preferred embodiments of the liquid-crystalline medium having negative dielectric anisotropy according to the invention are indicated below:

LC medium which additionally comprises one or more compounds selected from the group of the compounds of the formulae A, B and C,

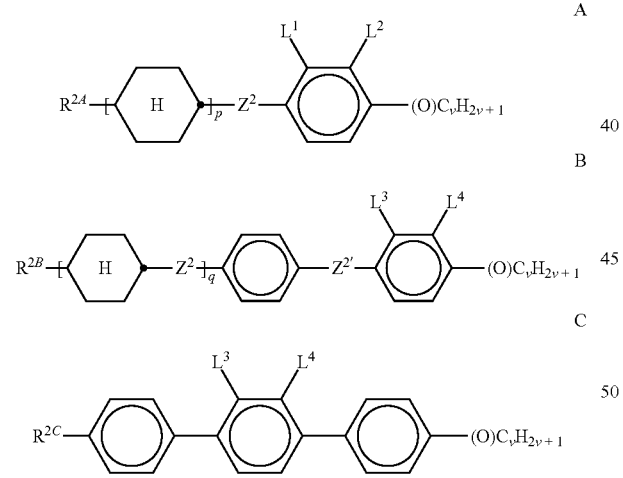

in which
$R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

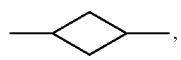

—C≡C—, —$CF_2O$—, —$OCF_2$—, —OC—O— or —O—CO— in such a way that O atoms are not linked directly to one another, $L^1$-4 each, independently of one another, denote F, Cl, $CF_3$ or $CHF_2$, $Z^2$ and $Z^{2'}$ each, independently of one another, denote a single bond, —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —CH=$CHCH_2O$—, p denotes 1 or 2, preferably 1,
q denotes 0 or 1, and
v denotes 1 to 6.

In the compounds of the formulae A and B, $Z^2$ can have identical or different meanings. In the compounds of the formula B, $Z^2$ and $Z^{2'}$ can have identical or different meanings. In the compounds of the formulae A, B and C, $R^{2A}$, $R^{2B}$ and $R^{2C}$ each preferably denote alkyl having 1-6 C atoms, in particular $CH_3$, $C_2H_5$, n-$C_3H_7$, n-$C_4H_9$, n-$C_5H_{11}$.

In the compounds of the formulae A and B, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae A and B preferably each, independently of one another, denote a single bond, furthermore a —$C_2H_4$— bridge.

If $Z^2$=—$C_2H_4$— in the formula B, $Z^{2'}$ is preferably a single bond, or if $Z^{2'}$=—$C_2H_4$—, $Z^2$ is preferably a single bond. In the compounds of the formulae A and B, (O)$C_vH_{2v+1}$ preferably denotes $OC_vH_{2v+1}$, furthermore $C_vH_{2v+1}$. In the compounds of the formula C, (O)$C_vH_{2v+1}$ preferably denotes $C_vH_{2v+1}$. In the compounds of the formula C, $L^3$ and $L^4$ preferably each denote F.

Preferred compounds of the formulae A, B and C are, for example:

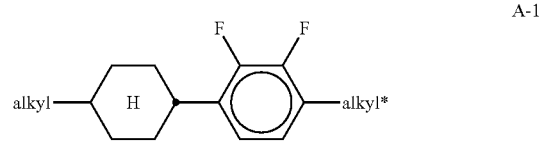

A-1

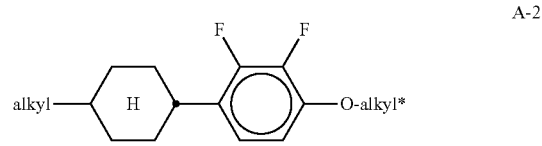

A-2

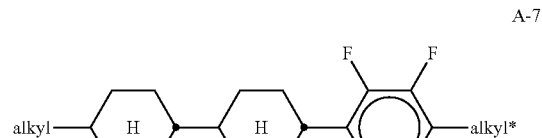

A-7

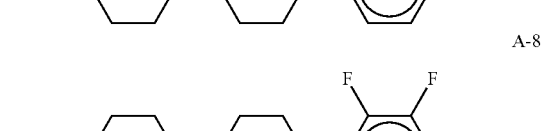

A-8

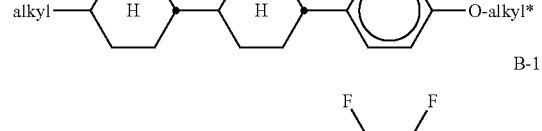

B-1

-continued

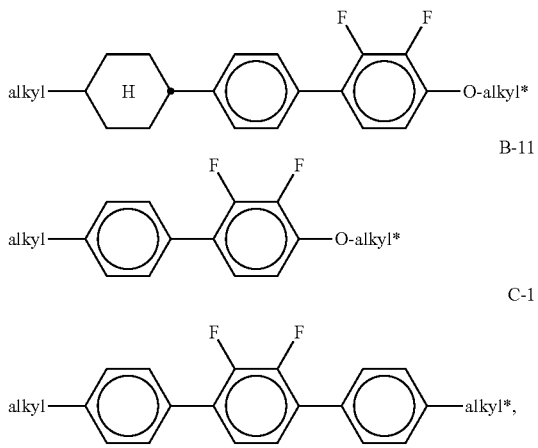

in which alkyl and alkyl* each, independently of one another, denote a straight-chain alkyl radical having 1-6 C atoms.

The LC medium preferably has a Δε of −1.5 to −8.0, in particular −2.5 to −6.0.

The values of the birefringence Δn in the liquid-crystal mixture are generally between 0.07 and 0.16, preferably between 0.08 and 0.12. The rotational viscosity $\gamma_1$ at 20° C. before the polymerisation is preferably ≤165 mPa·s, in particular ≤140 mPa·s.

Preferred embodiments of the liquid-crystalline medium according to the invention having negative or positive dielectric anisotropy are indicated below:

LC medium which additionally comprises one or more compounds of the formulae II and/or III:

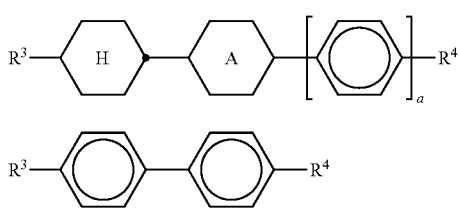

in which ring A denotes 1,4-phenylene or trans-1,4-cyclohexylene, a is 0 or 1, $R^3$ in each case, independently of one another, denotes alkyl having 1 to 9 C atoms or alkenyl having 2 to 9 C atoms, preferably alkenyl having 2 to 9 C atoms, and $R^4$ in each case, independently of one another, denotes an unsubstituted or halogenated alkyl radical having 1 to 12 C atoms, where, in addition, one or two non-adjacent $CH_2$ groups may be replaced by —O—, —CH=CH—, —CH=CF—, —(CO)—, —O(CO)— or —(CO)O— in such a way that O atoms are not linked directly to one another, and preferably denotes alkyl having 1 to 12 C atoms or alkenyl having 2 to 9 C atoms.

The compounds of the formula II are preferably selected from the group consisting of the following formulae:

in which $R^{3a}$ and $R^{4a}$ each, independently of one another, denote H, $CH_3$, $C_2H_5$ or $C_3H_7$, and "alkyl" denotes a straight-chain alkyl group having 1 to 8, preferably 1, 2, 3, 4 or 5, C atoms. Particular preference is given to compounds of the formulae IIa and IIf, in particular those in which $R^{3a}$ denotes H or $CH_3$, preferably H, and compounds of the formula IIc, in particular those in which $R^{3a}$ and $R^{4a}$ denote H, $CH_3$ or $C_2H_5$.

Preferred embodiments of the liquid-crystalline medium according to the invention having positive dielectric anisotropy are given below:

The LC medium preferably comprises one or more compounds of the formulae IV and V:

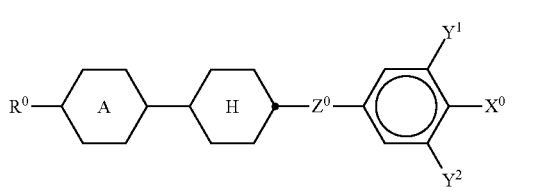

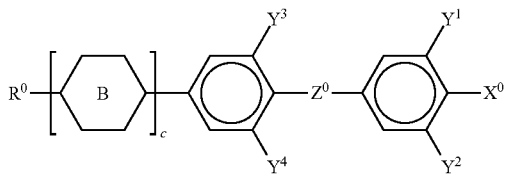

V in which

R⁰ denotes an alkyl or alkoxy radical having 1 to 15 C atoms, in which, in addition, one or more CH₂ groups in these radicals are optionally substituted, independently of one another, by —C≡C—, —CF₂O—, —CH=CH—,

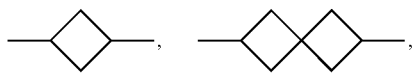

—O—, —(CO)O— or —O(CO)— in such a way that O atoms are not linked directly to one another, and in which, in addition, one or more H atoms may optionally be replaced by halogen, ring A denotes

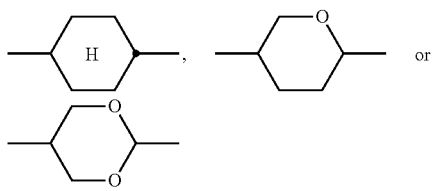

ring B, independently of one another, denotes 1,4-phenylene, optionally substituted by one or two F or Cl,

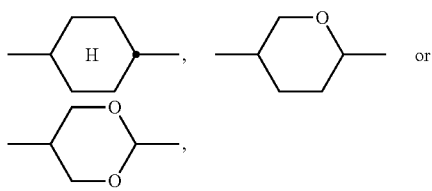

X⁰ denotes F, Cl, CN, SF₅, SCN, NCS, a halogenated alkyl group, a halogenated alkenyl group, a halogenated alkoxy group or a halogenated alkenyloxy group, each having up to 6 C atoms, Y¹⁻⁴ each, independently of one another, denote H or F, Z⁰ denotes —CF₂O—, —(CO)O— or a single bond, and c denotes 0, 1 or 2, preferably 1 or 2,

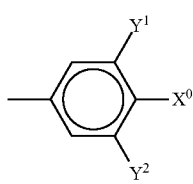

preferably denotes

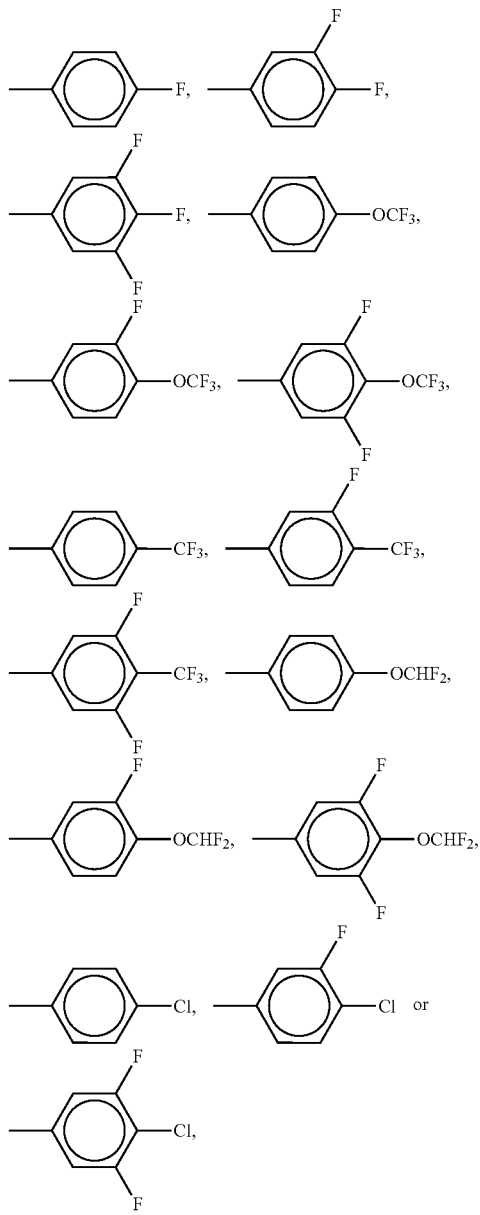

R⁰ preferably denotes straight-chain alkyl or alkenyl having 2 to 7 C atoms,

X⁰ preferably denotes F, OCF₃, Cl or CF₃, in particular F.

The nematic phase of the dielectrically negative or positive LC medium in accordance with the invention preferably has a nematic phase in a temperature range from 10° C. or less to 60° C. or more, particularly preferably from 0 or less to 70° C. or more.

For the purposes of the present application, the two formulae for substituted benzene rings

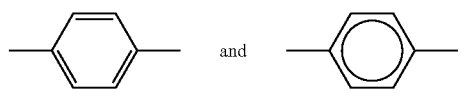

are equivalent. 1,4-substituted cyclohexane is represented by

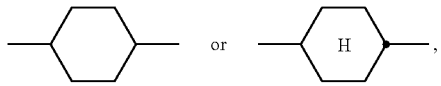

which is preferably in the 1,4-trans-configuration. A phenylene ring of the formula

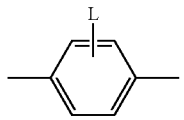

which is substituted by the group L is substituted by a group L at precisely one position as desired.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m, z and k are integers and preferably denote 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | F | H |
| nN•F•F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF•F | $C_nH_{2n+1}$ | F | F | H |
| nF•F•F | $C_nH_{2n+1}$ | F | F | F |
| nOCF$_3$ | $C_nH_{2n+1}$ | OCF$_3$ | H | H |
| nOCF$_3$•F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are found in Tables A and B.

TABLE A

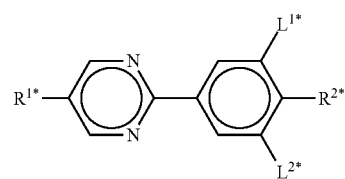

PYP

TABLE A-continued

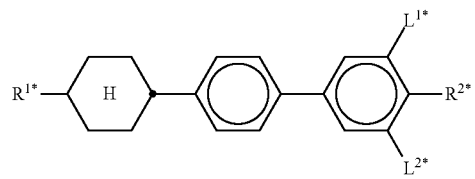

BCH

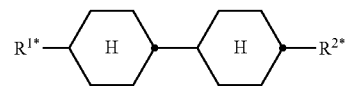

CCH

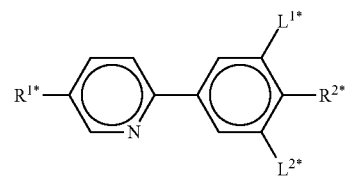

PYRP

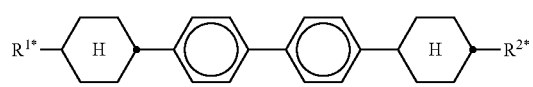

CBC

TABLE A-continued

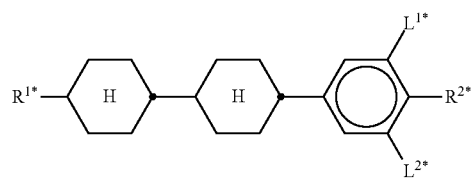

CCP

TABLE A-continued
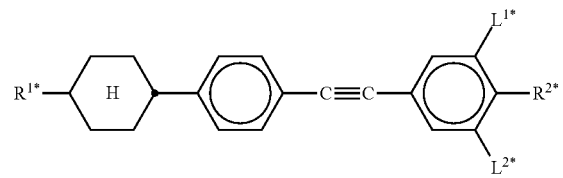
CPTP
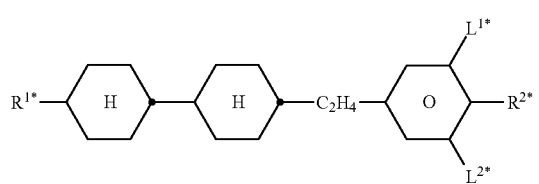
ECCP
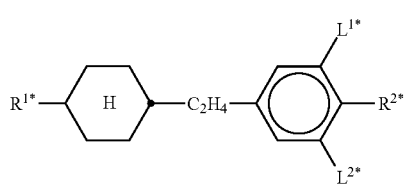
EPCH
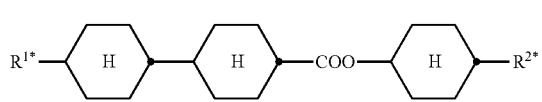
CH
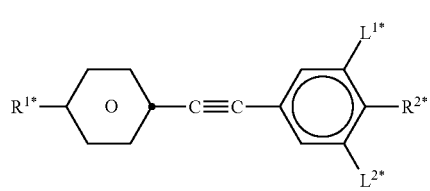
PTP
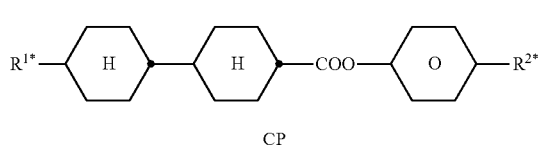
CP
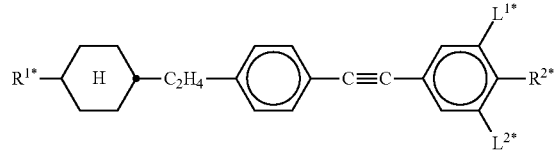
CEPTP
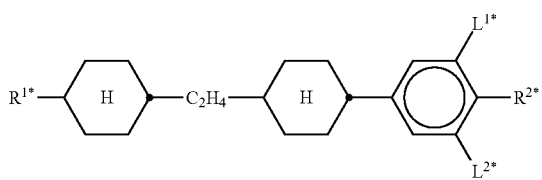
CECP
TABLE A-continued
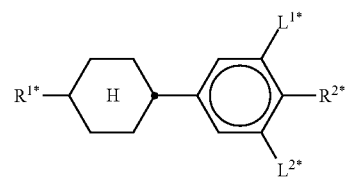
PCH
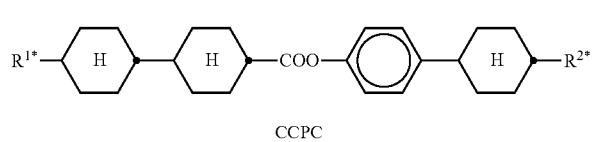
CCPC
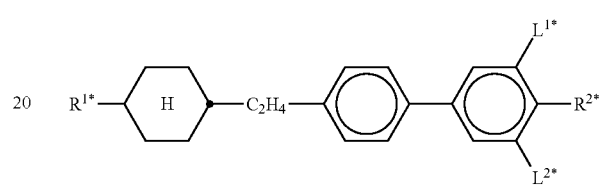
BECH
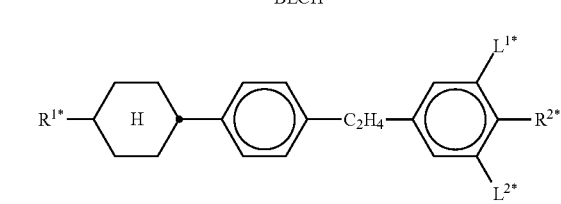
EBCH
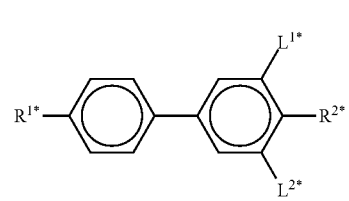
B
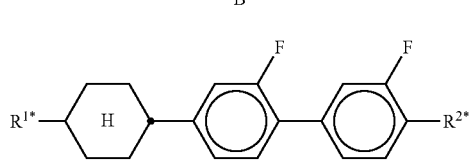
CGG
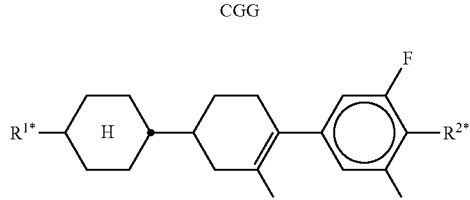
CFU
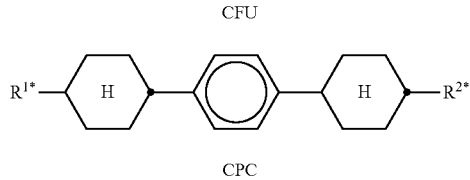
CPC TABLE A-continued
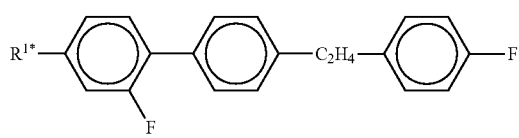
FET-nF
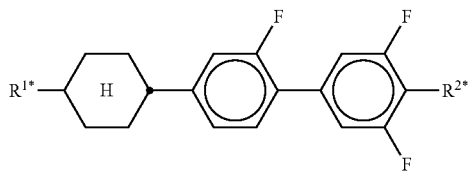
CGU
TABLE B
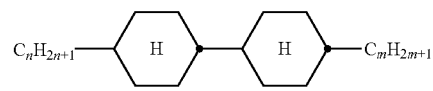
CCH-nm
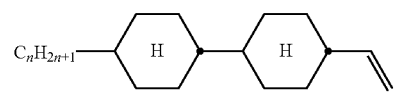
CC-n-V
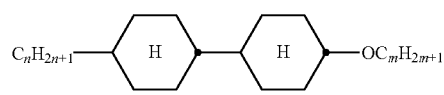
CCH-nOm
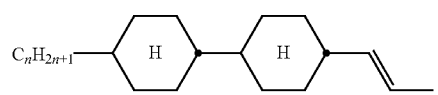
CC-n-V1
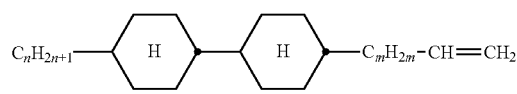
CC-n-mV
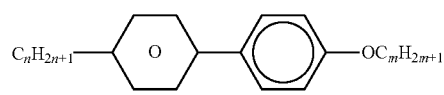
PP-n-Om
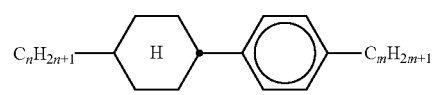
PCH-nm
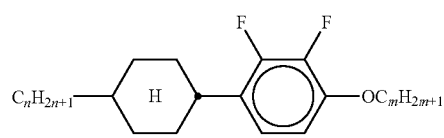
CY-n-Om TABLE B-continued
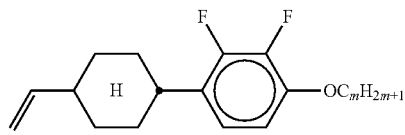
CY-V-Om
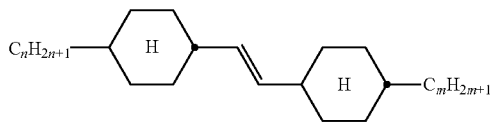
CVC-n-m
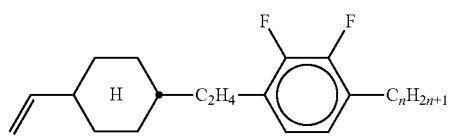
CEY-V-m
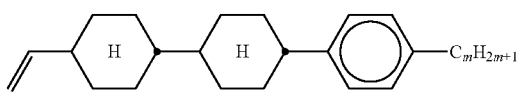
CCP-V-m
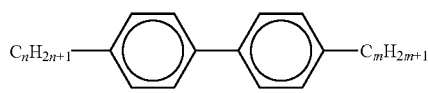
PP-n-m
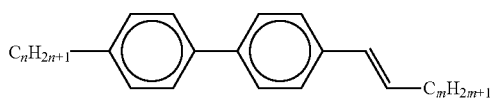
PP-n-Vm
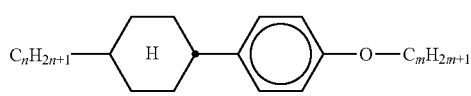
PCH-nOm
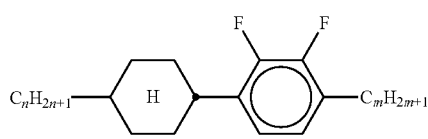
CY-n-m
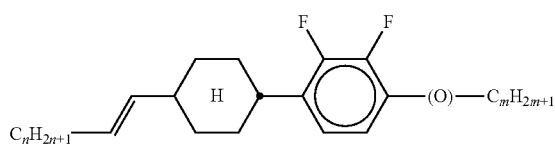
CY-nV-(O)m
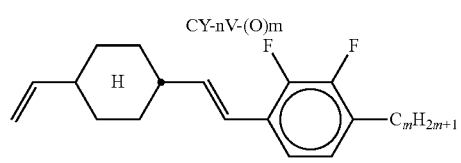
CVY-V-m TABLE B-continued
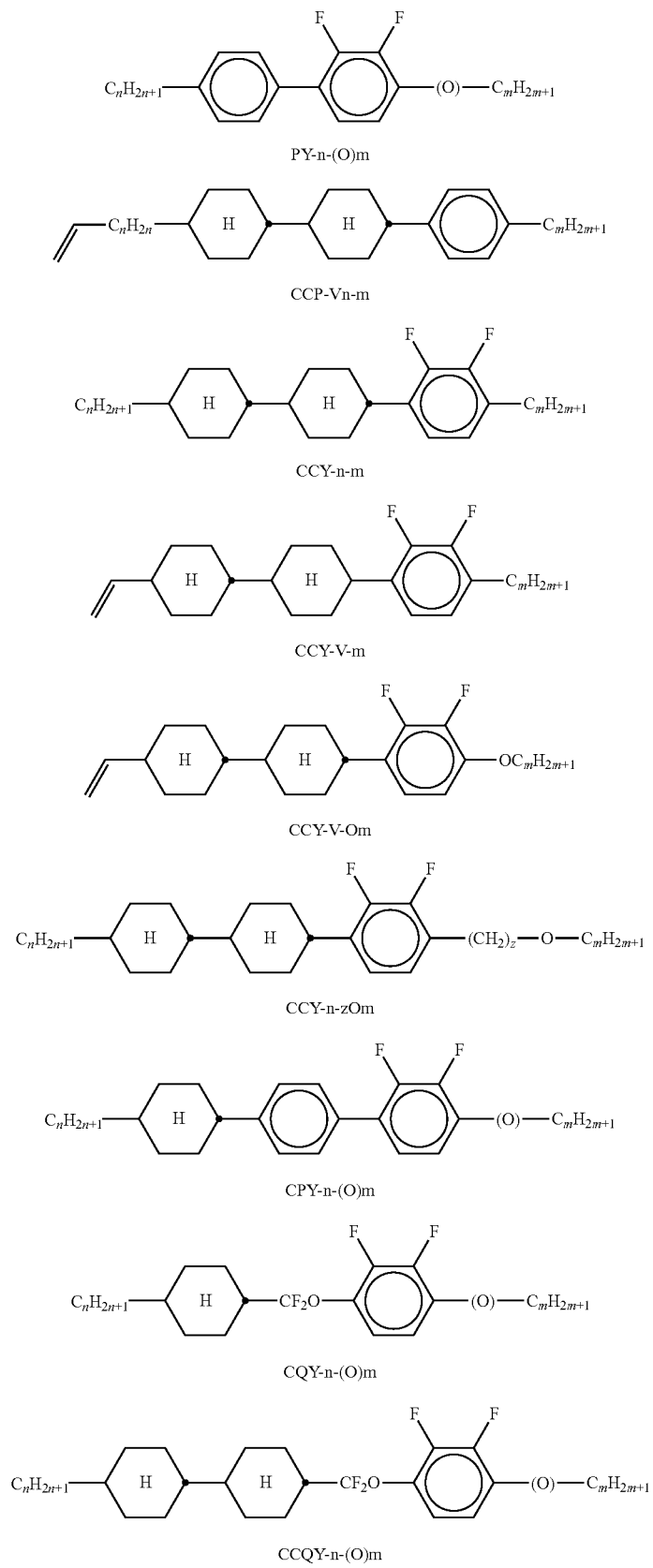

TABLE B-continued
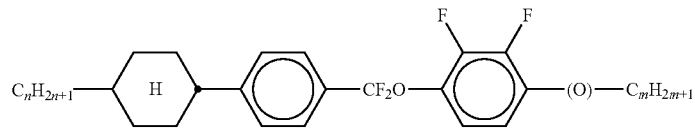
CPQY-n-(O)m
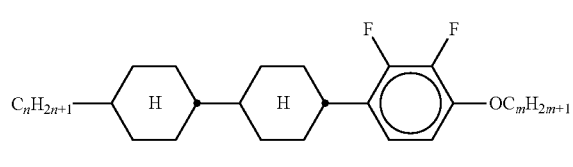
CCY-n-Om
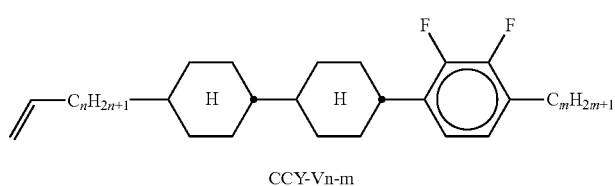
CCY-Vn-m
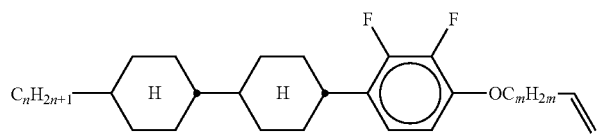
CCY-n-OmV
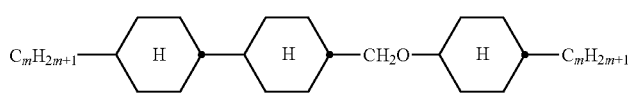
CCOC-n-m
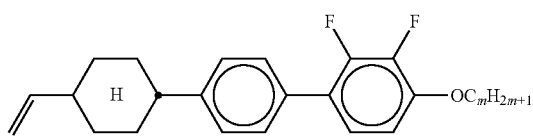
CPY-V-Om
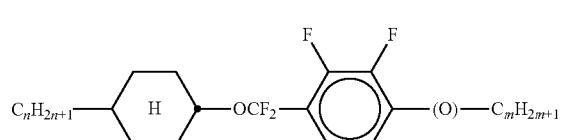
CQIY-n-(O)m
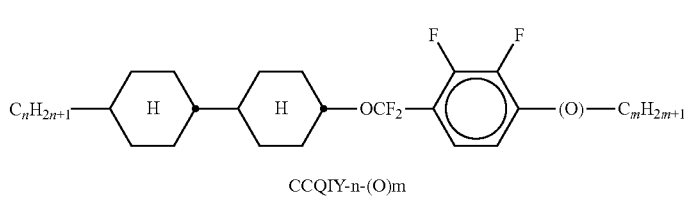
CCQIY-n-(O)m
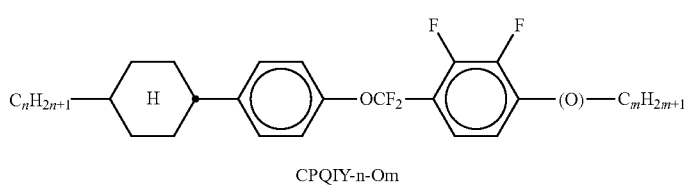
CPQIY-n-Om TABLE B-continued
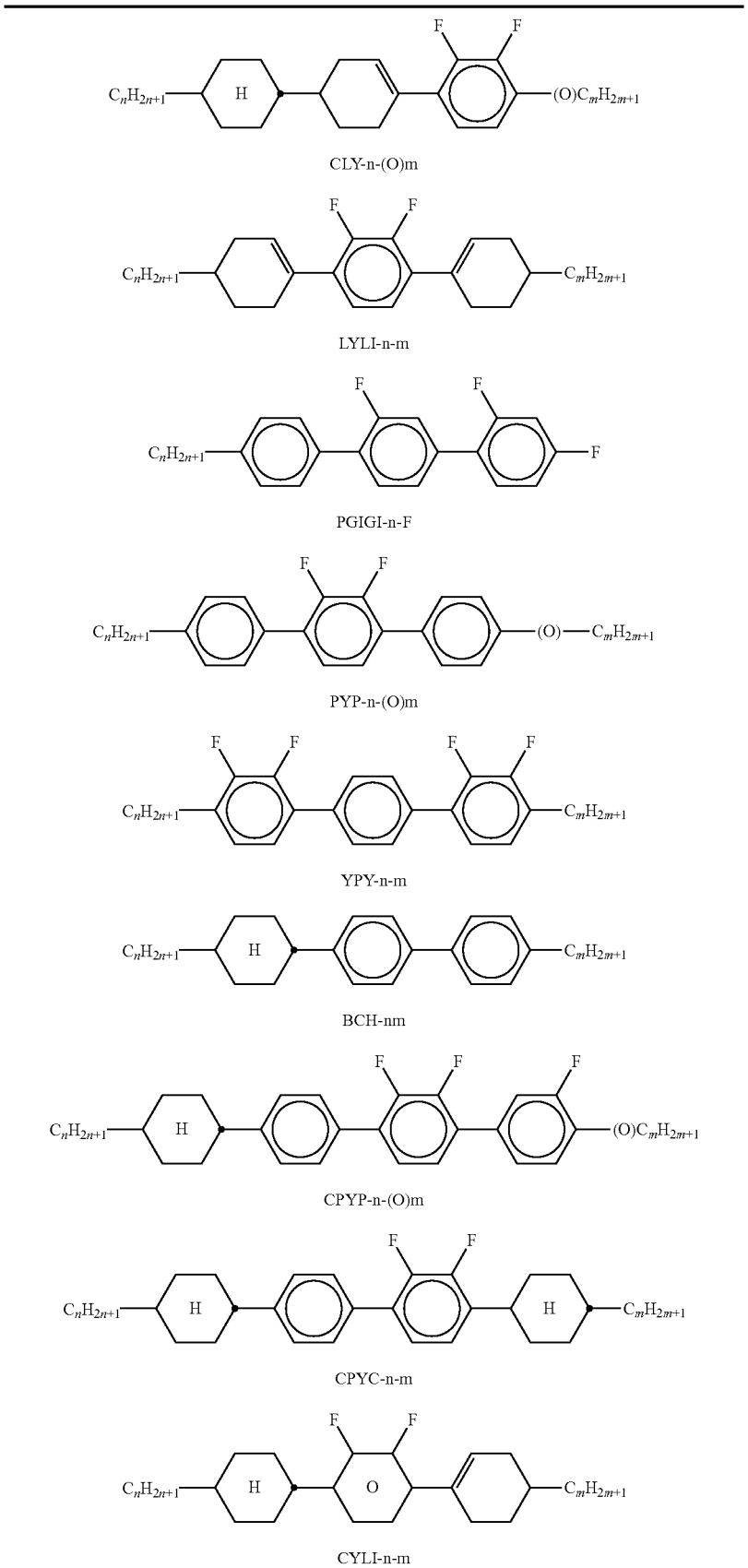

TABLE B-continued
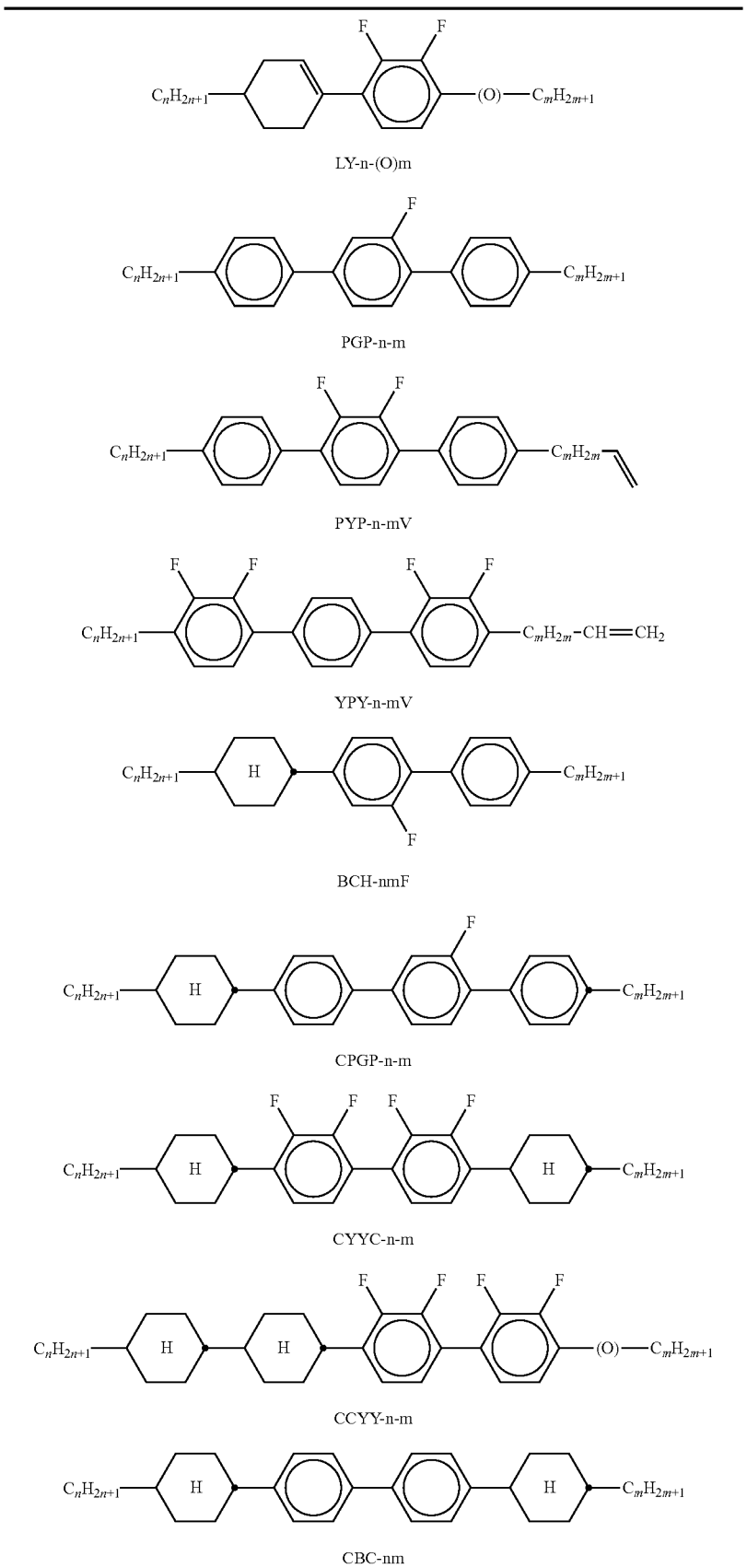

TABLE B-continued
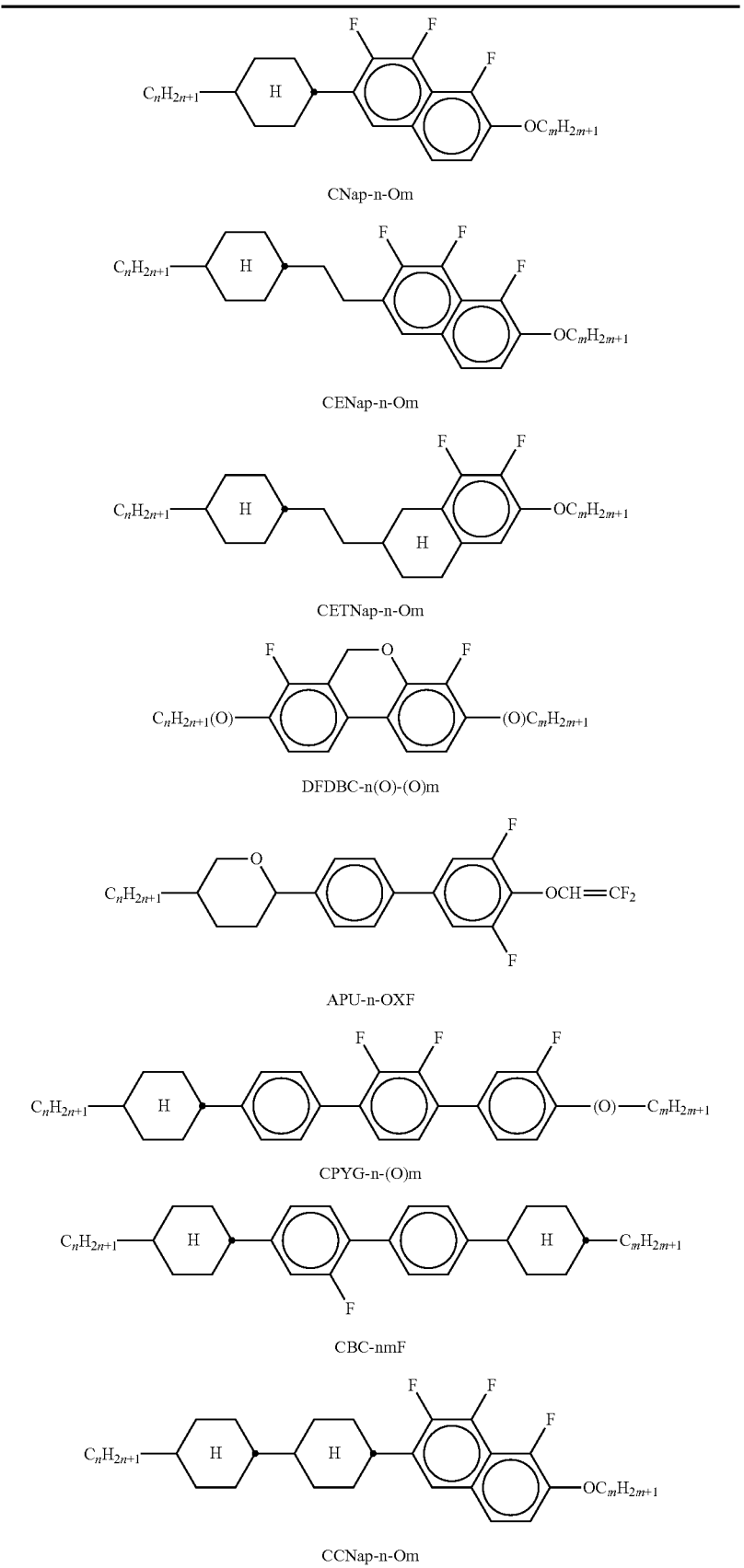
CNap-n-Om
CENap-n-Om
CETNap-n-Om
DFDBC-n(O)-(O)m
APU-n-OXF
CPYG-n-(O)m
CBC-nmF
CCNap-n-Om TABLE B-continued
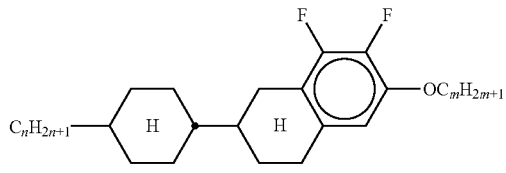
CTNap-n-Om
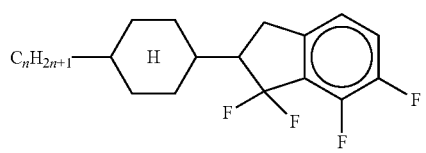
CK-n-F
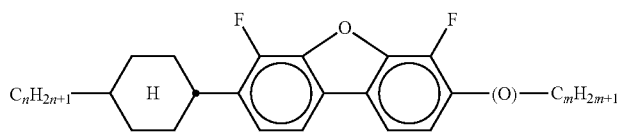
C-DFDBF-n-(O)m
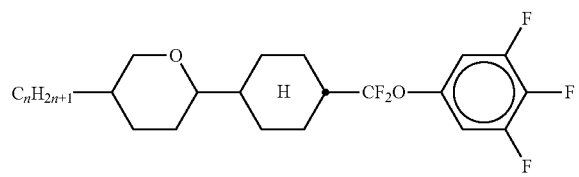
ACQU-n-F
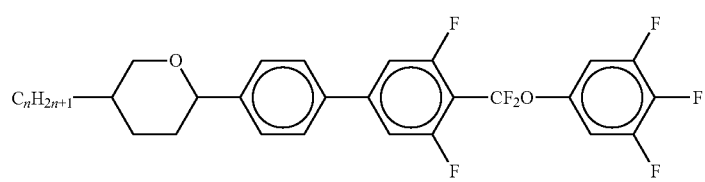
APUQU-n-F
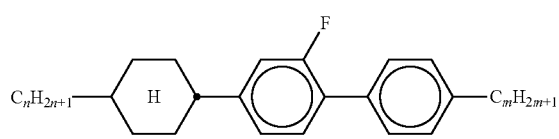
BCH-n.Fm
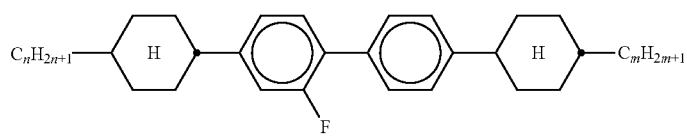
CBC-nmF
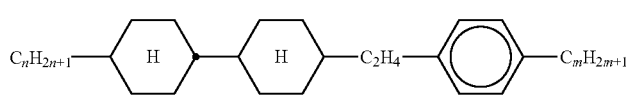
ECCP-nm TABLE B-continued
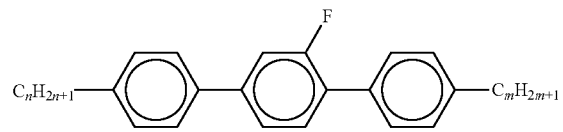
PGP-n-m
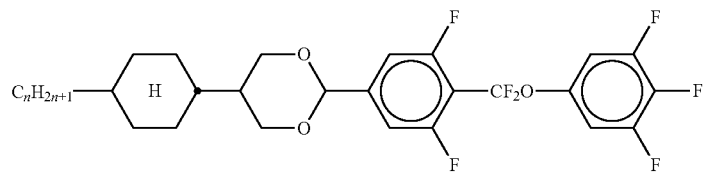
CDUQU-n-F
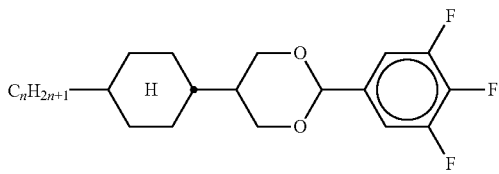
CDU-n-F
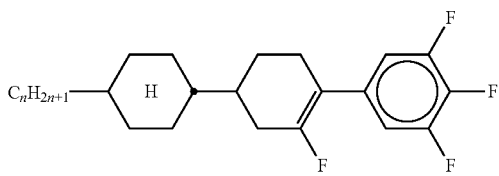
CFU-n-F
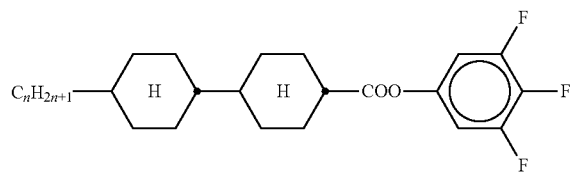
CCZU-n-F
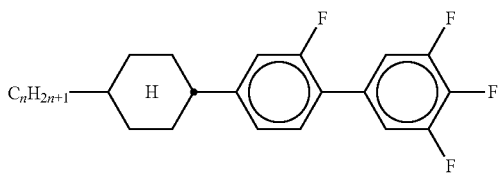
CGU-n-F
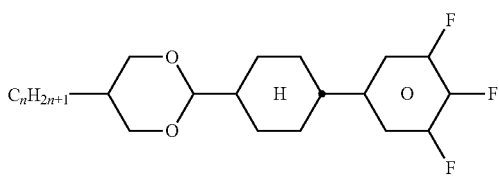
DCU-n-F TABLE B-continued
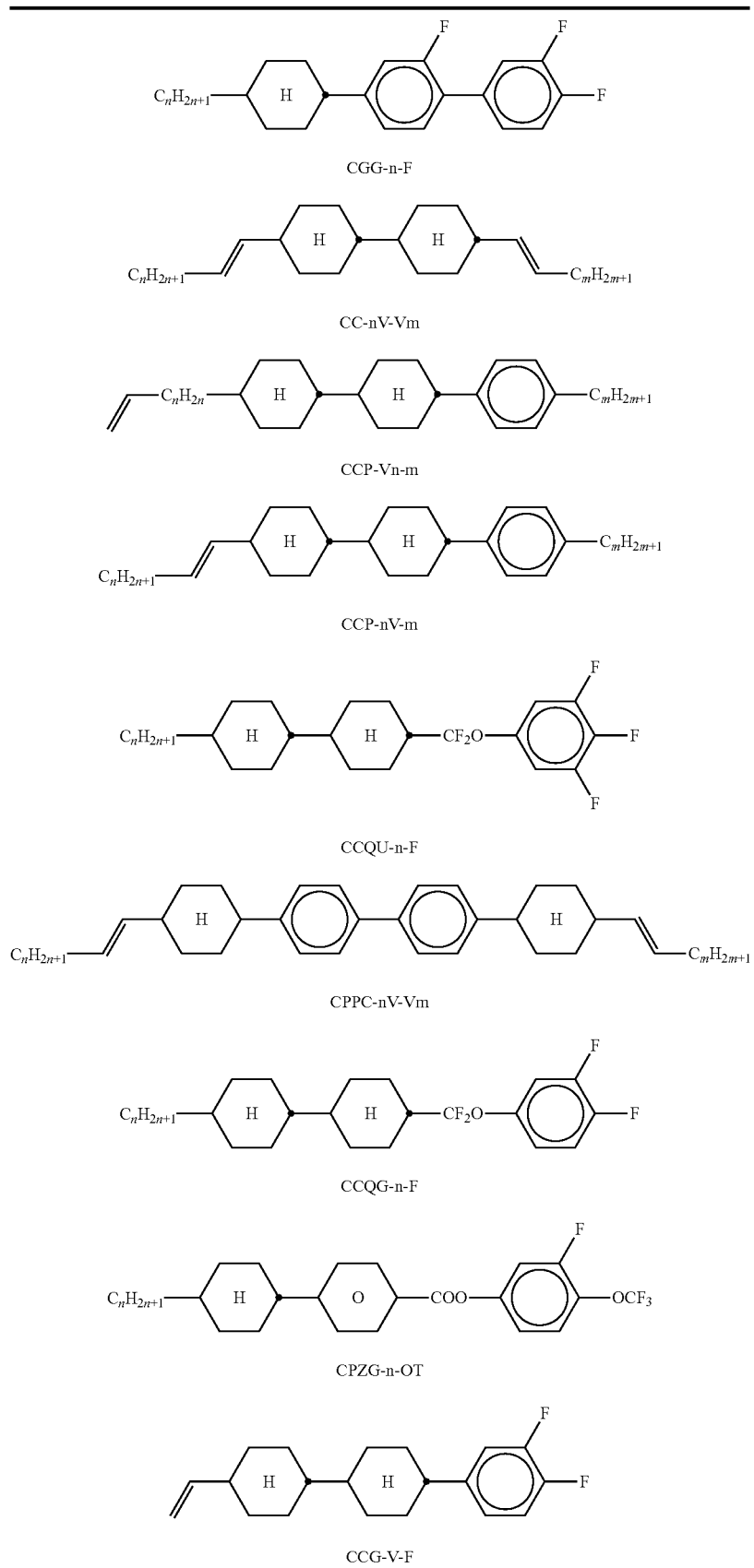

TABLE B-continued
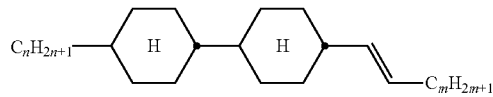
CC-n-Vm
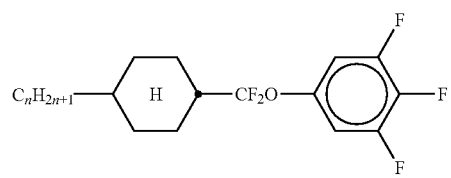
CQU-n-F
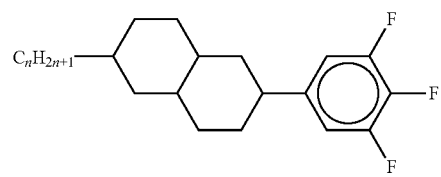
Dec-U-n-F
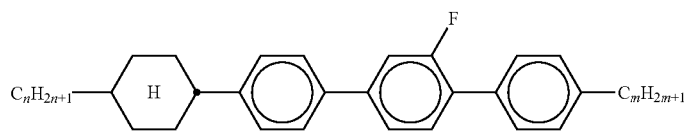
CPGP-n-m
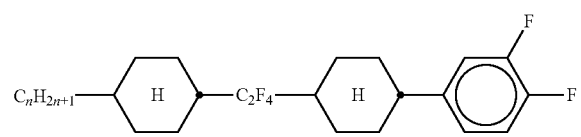
CWCG-n-F
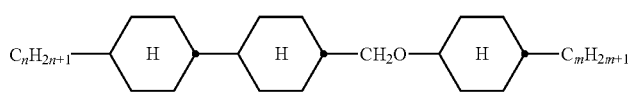
CCOC-n-m
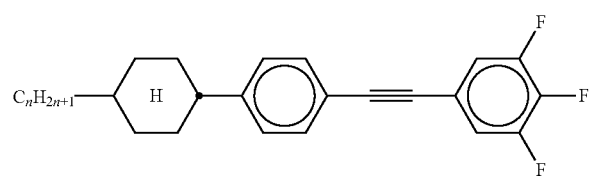
CPTU-n-F
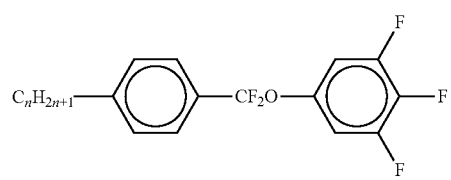
PQU-n-F TABLE B-continued
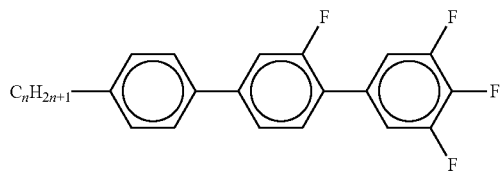
PGU-n-F
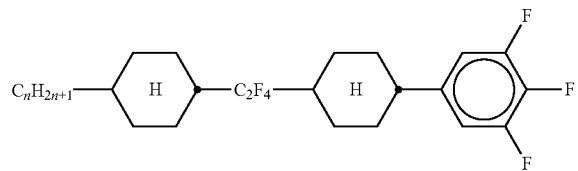
CWCU-n-F
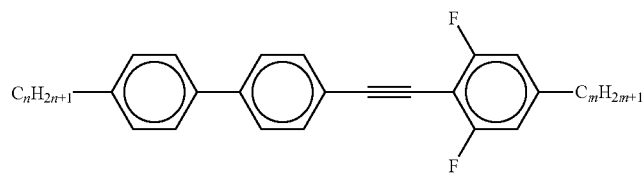
PPTUI-n-m
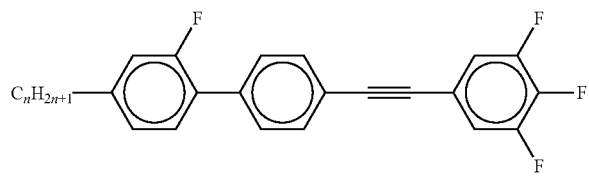
GPTU-n-F
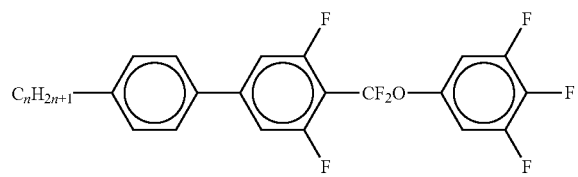
PUQU-n-F
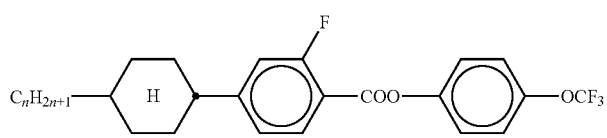
CGZP-n-OT
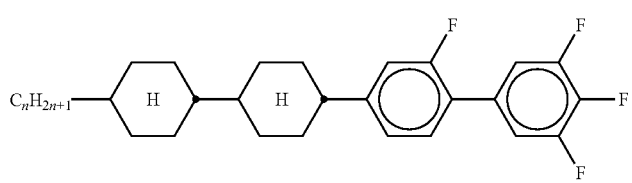
CCGU-n-F TABLE B-continued
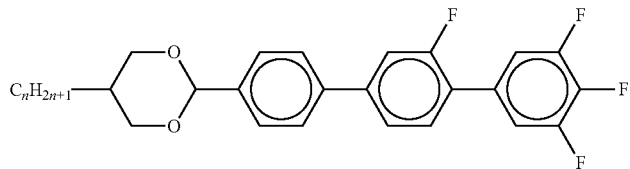
DPGU-n-F
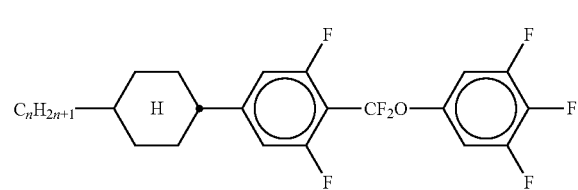
CUQU-n-F
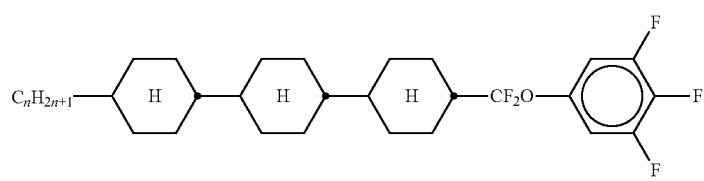
CCCQU-n-F
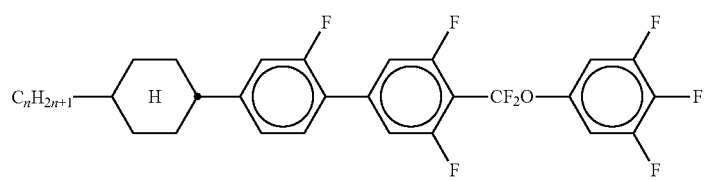
CGUQU-n-F
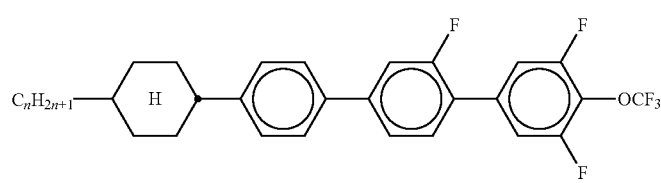
CPGU-n-OT
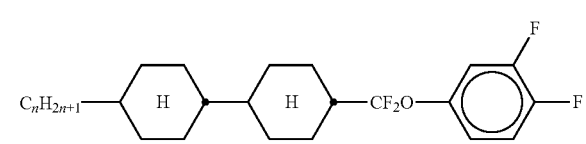
CCQG-n-F
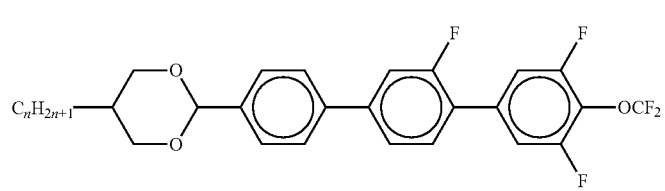
DPGU-n-OT TABLE B-continued
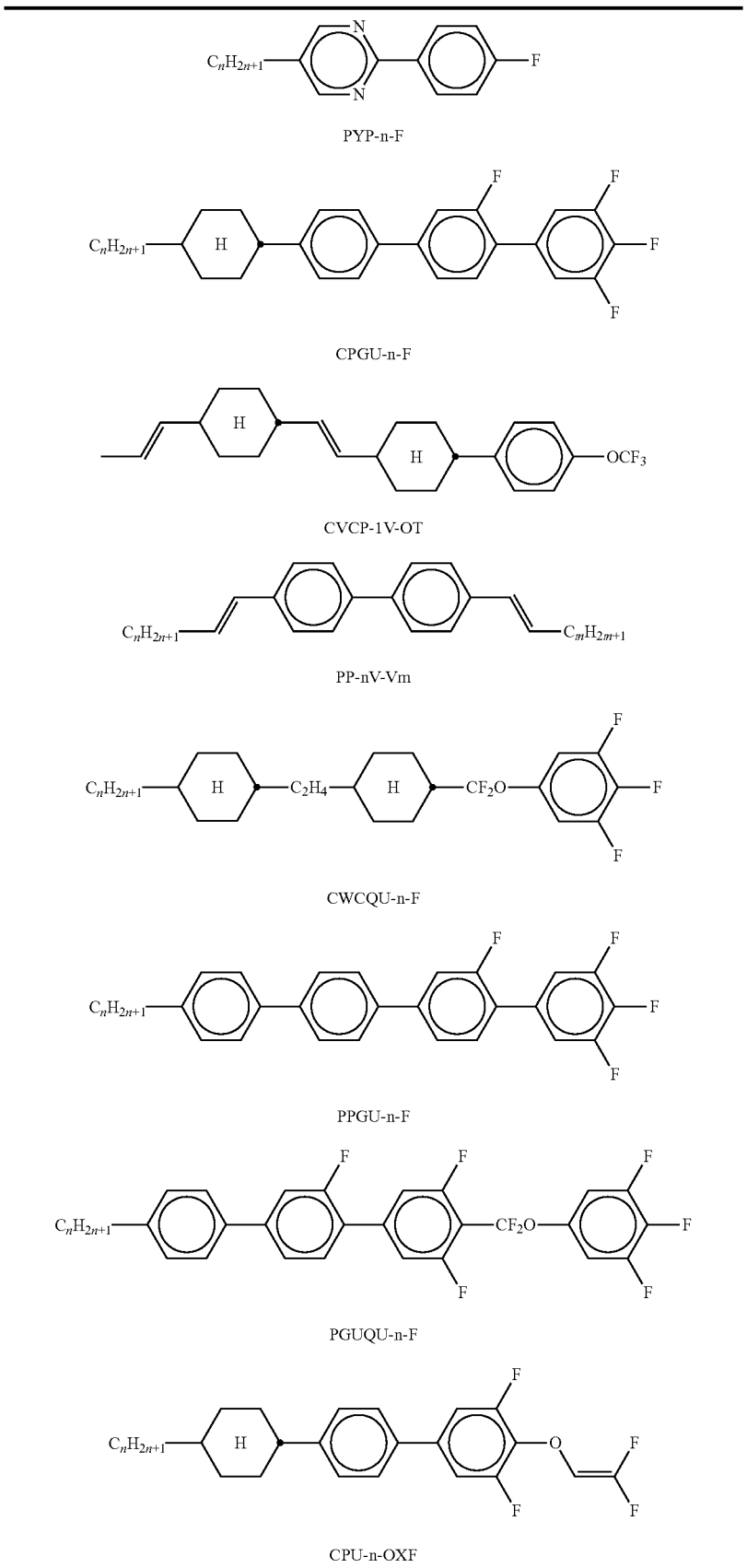

TABLE B-continued
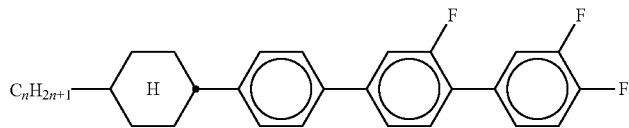
CPGG-n-F
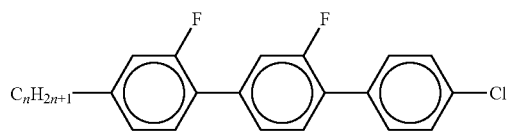
GGP-n-Cl
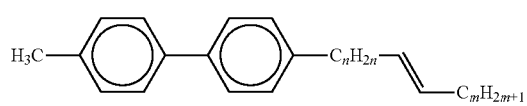
PP-1-nVm
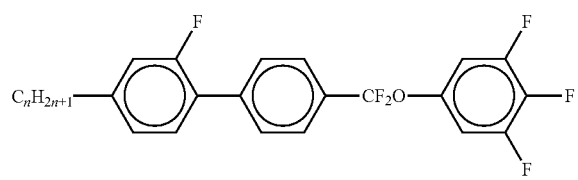
GPQU-n-F
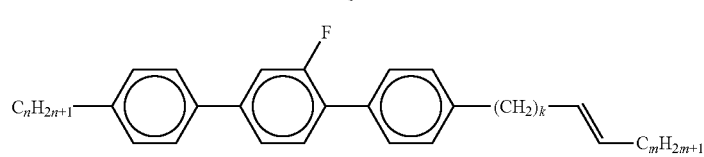
PGP-n-kVm
PP-n-kVm
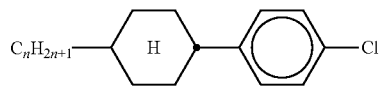
PCH-nCl
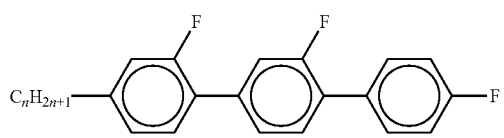
GGP-n-F
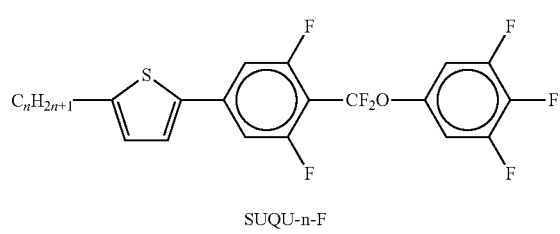
SUQU-n-F TABLE B-continued
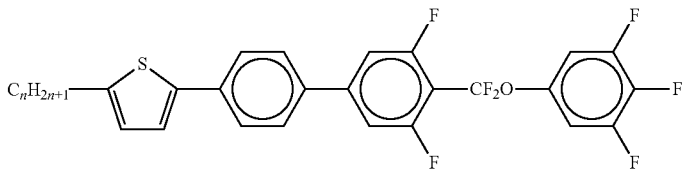
SPUQU-n-F
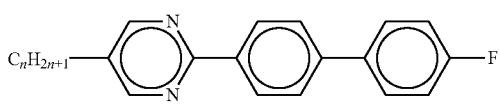
MPP-n-F
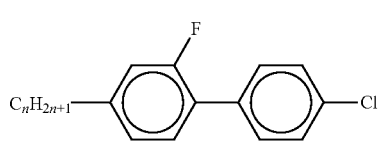
GP-n-Cl
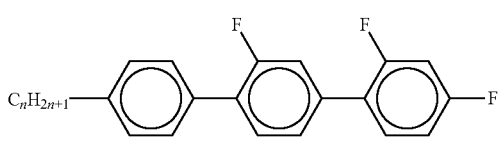
PGIGI-n-F
n, m, z, independently of one another, prefferably denote 1,2, 3, 4, 5 or 6.
In a preferred embodiment of the present invention, the LC media according to the invention comprise one or more compounds selected from the group consisting of compounds from Tables A and B.
TABLE C
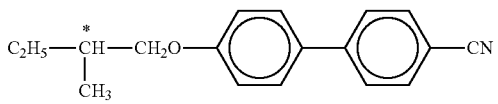
C 15
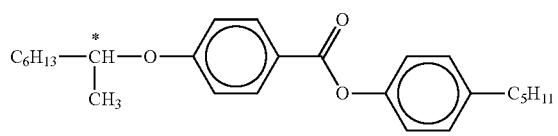
CM 21
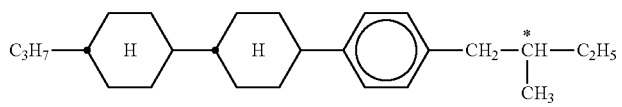
CM 44
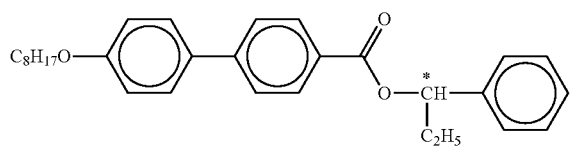
CM 47

TABLE C-continued
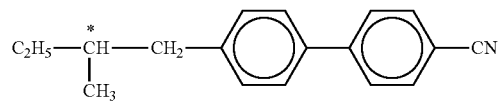
CB 15
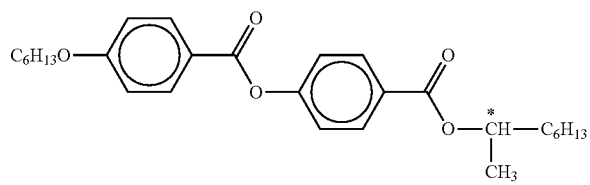
R/S-811
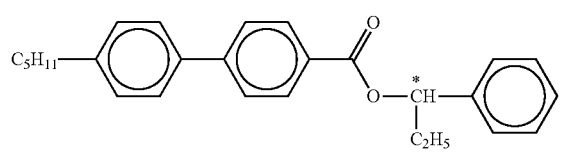
CM 45
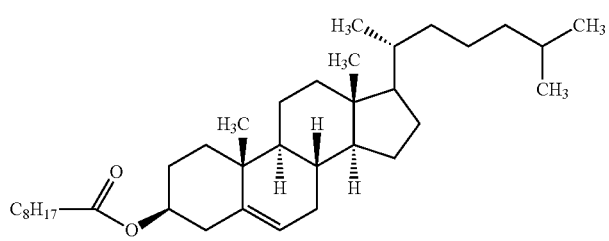
CN
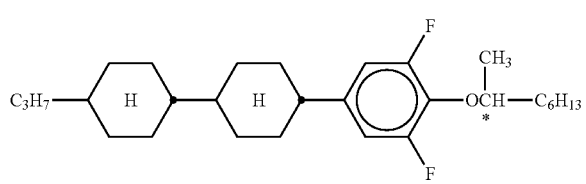
R/S-2011
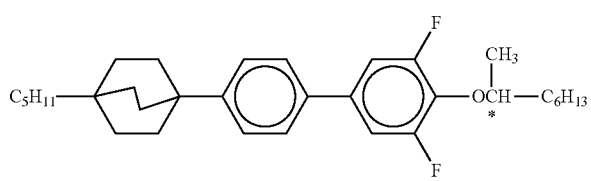
R/S-4011
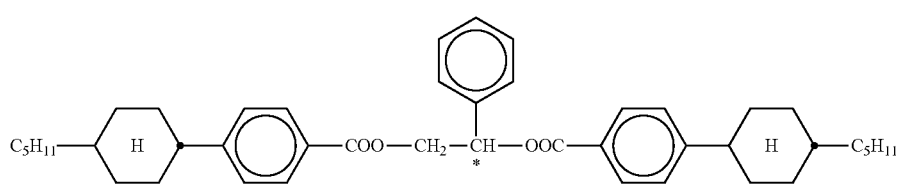
R/S-1011

TABLE C-continued
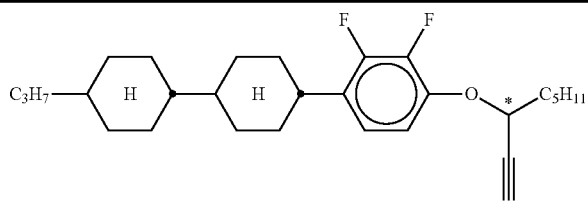
R/S-3011
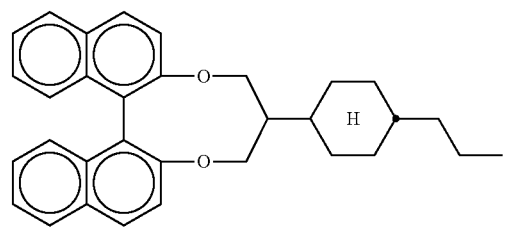
R/S-5011
Table C indicates possible chiral dopants which can be added to the LC media according to the invention.
The LC media optionally comprise 0 to 10% by weight, in particular 0.01 to 5% by weight, particularly preferably 0.1 to 3% by weight, of dopants, preferably selected from the group consisting of compounds from Table C.
TABLE D
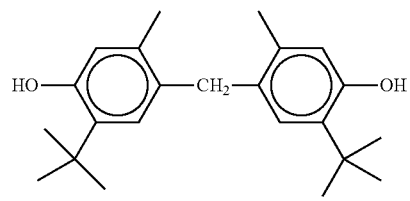
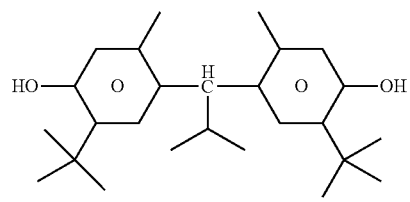
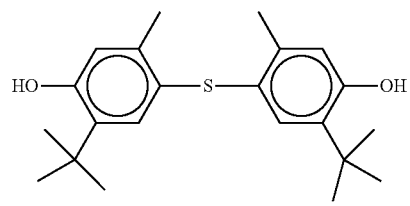
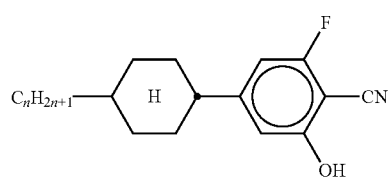

TABLE D-continued
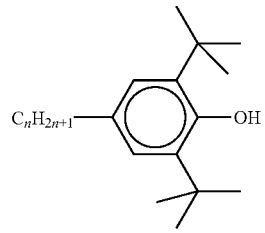
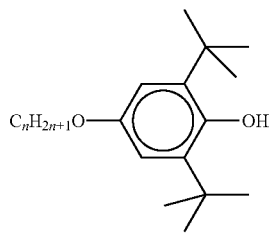
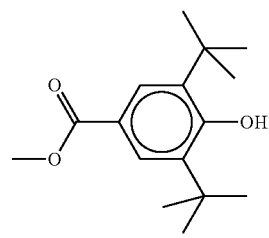
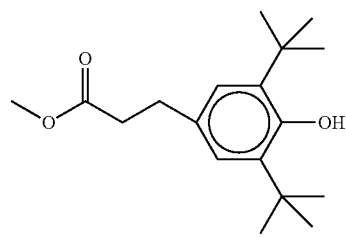
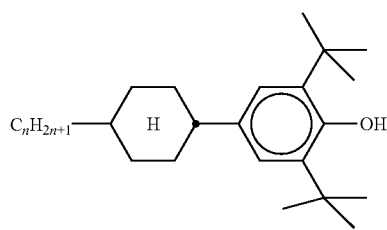
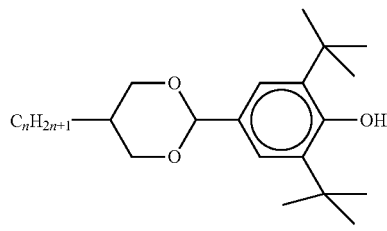

TABLE D-continued
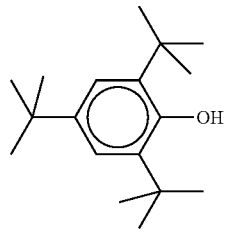
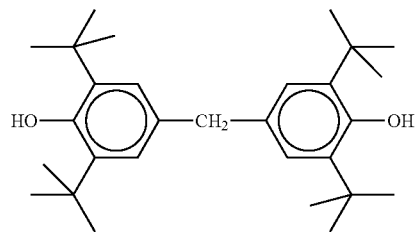
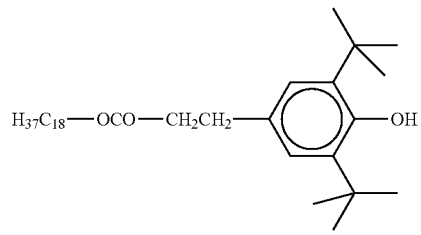
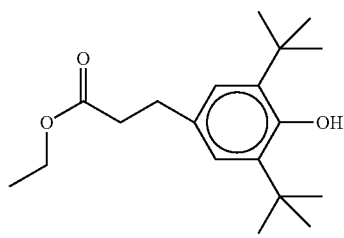
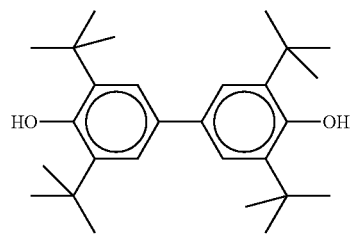
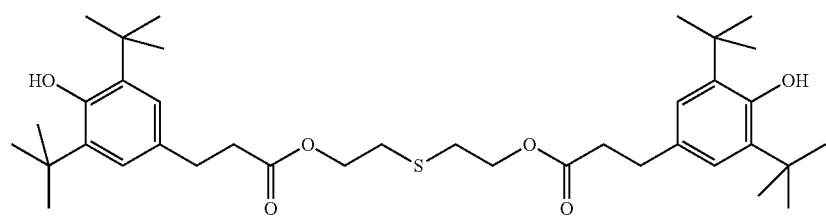 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE D-continued
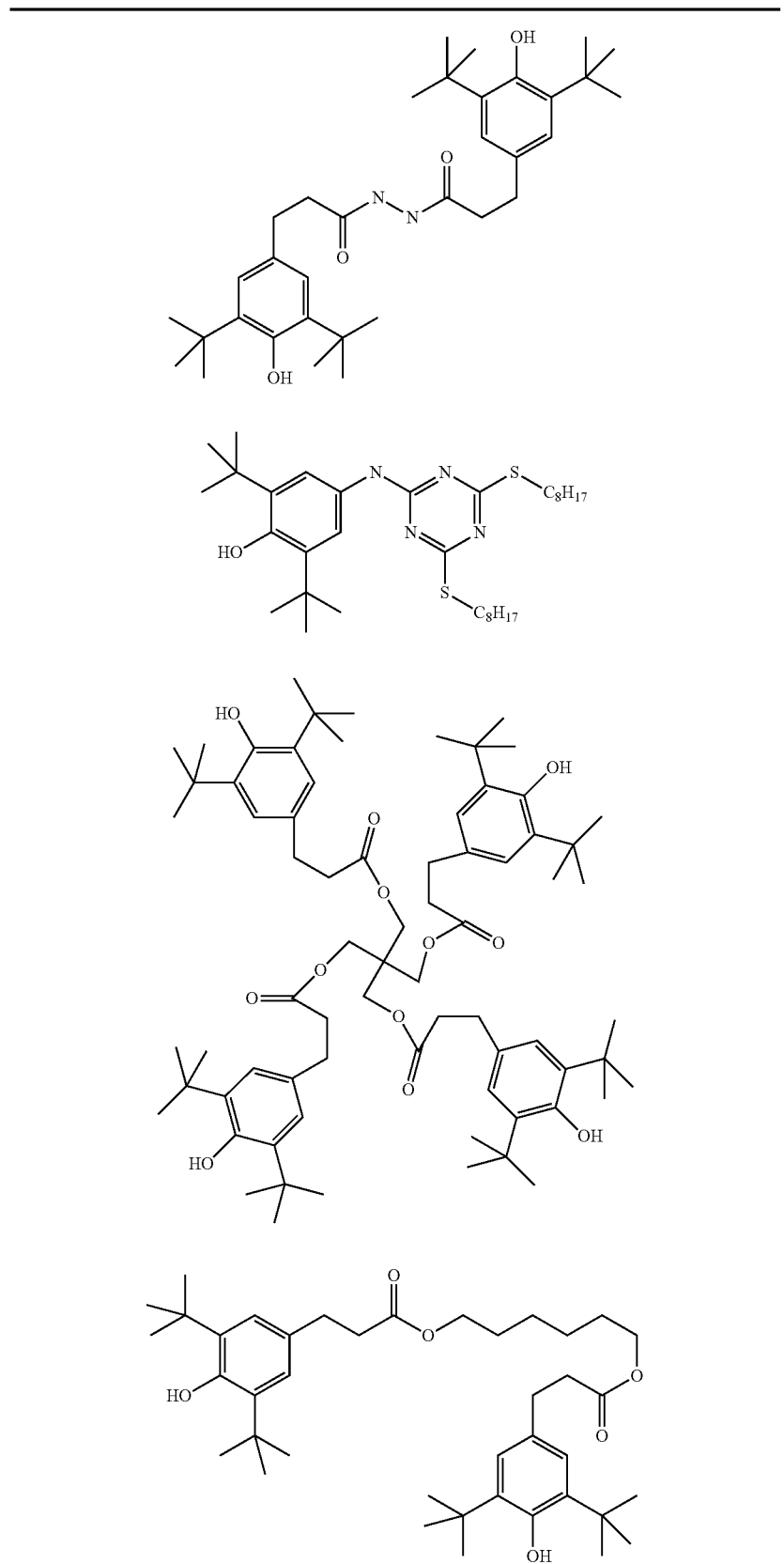

TABLE D-continued
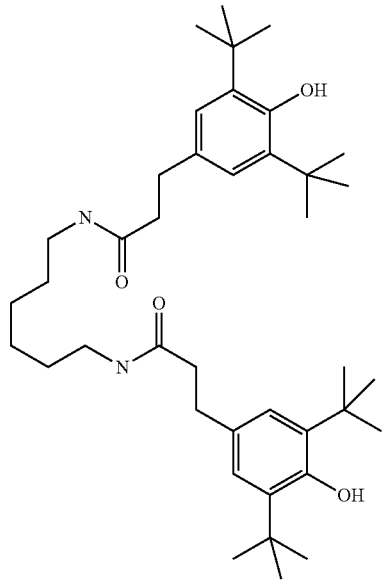 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
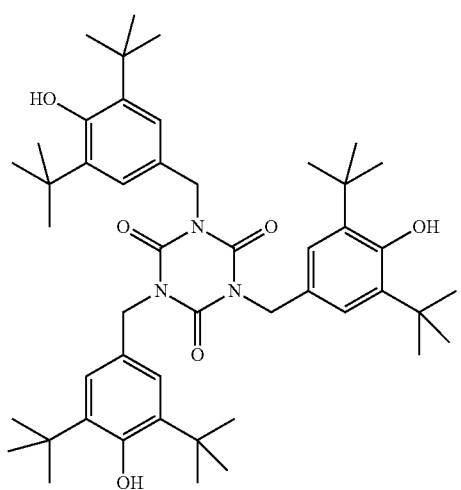 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
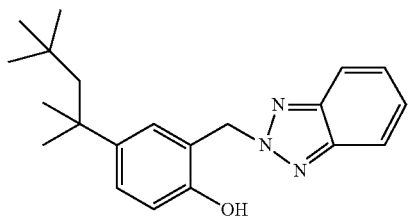 [SMILES: CC(C)(C)CC(C)(C)c1ccc(O)c(Cn2nc3ccccc3n2)c1]
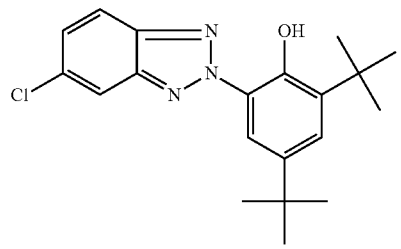 [SMILES: CC(C)(C)c1cc(-n2nc3ccc(Cl)cc3n2)c(O)c(C(C)(C)C)c1]

TABLE D-continued
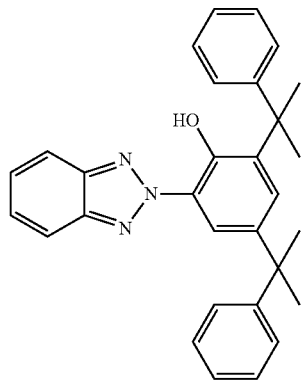 [SMILES: CC(C)(c1ccccc1)c1cc(-n2nc3ccccc3n2)c(O)c(C(C)(C)c2ccccc2)c1]
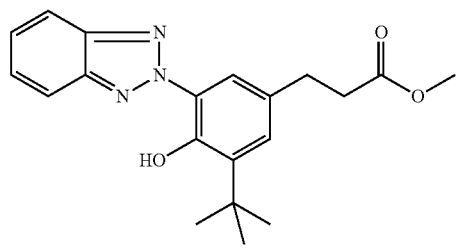 [SMILES: COC(=O)CCc1cc(-n2nc3ccccc3n2)c(O)c(C(C)(C)C)c1]
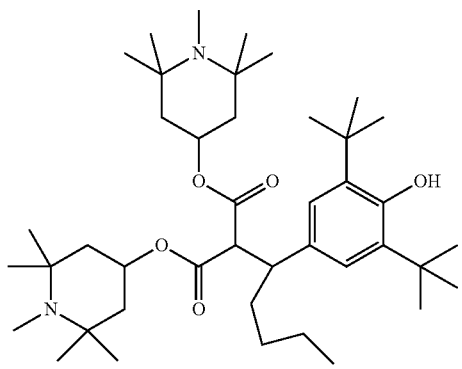 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
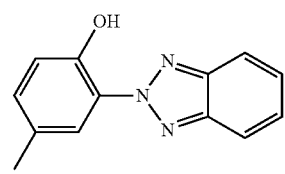 [SMILES: Cc1ccc(O)c(-n2nc3ccccc3n2)c1]
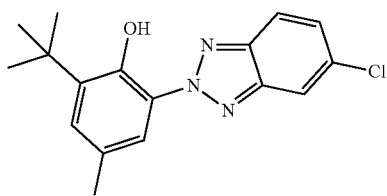 [SMILES: Cc1cc(-n2nc3ccc(Cl)cc3n2)c(O)c(C(C)(C)C)c1]
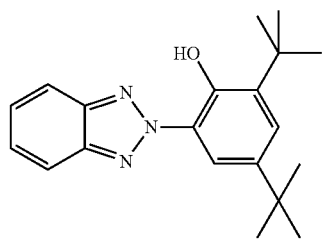 [SMILES: CC(C)(C)c1cc(-n2nc3ccccc3n2)c(O)c(C(C)(C)C)c1]

TABLE D-continued
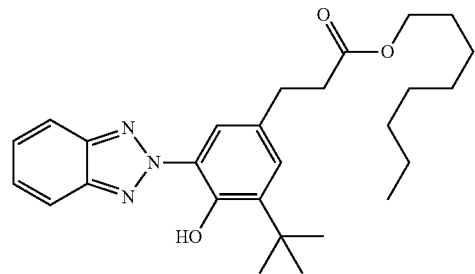 [SMILES: CCCCCCCCOC(=O)CCc1cc(-n2nc3ccccc3n2)c(O)c(C(C)(C)C)c1]
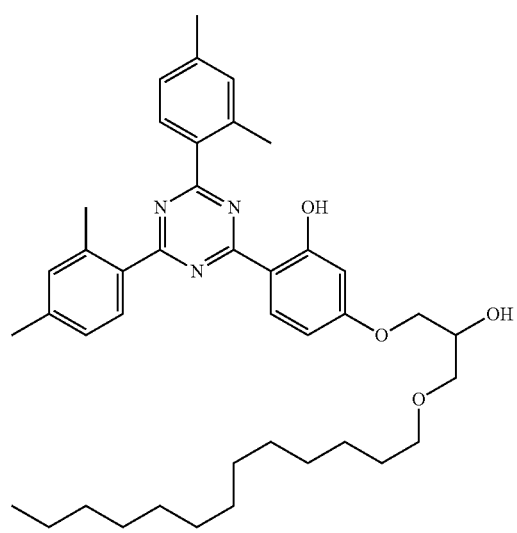 [SMILES: CCCCCCCCCCCCCOCC(O)COc1ccc(-c2nc(-c3ccc(C)cc3C)nc(-c3ccc(C)cc3C)n2)c(O)c1]
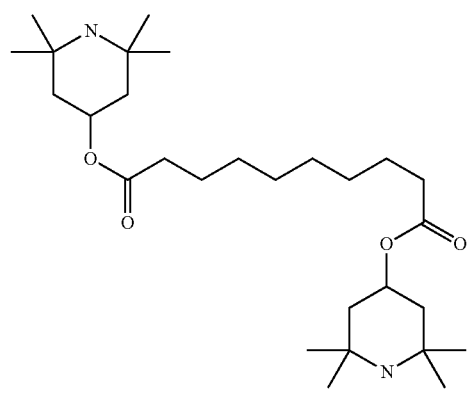

TABLE D-continued

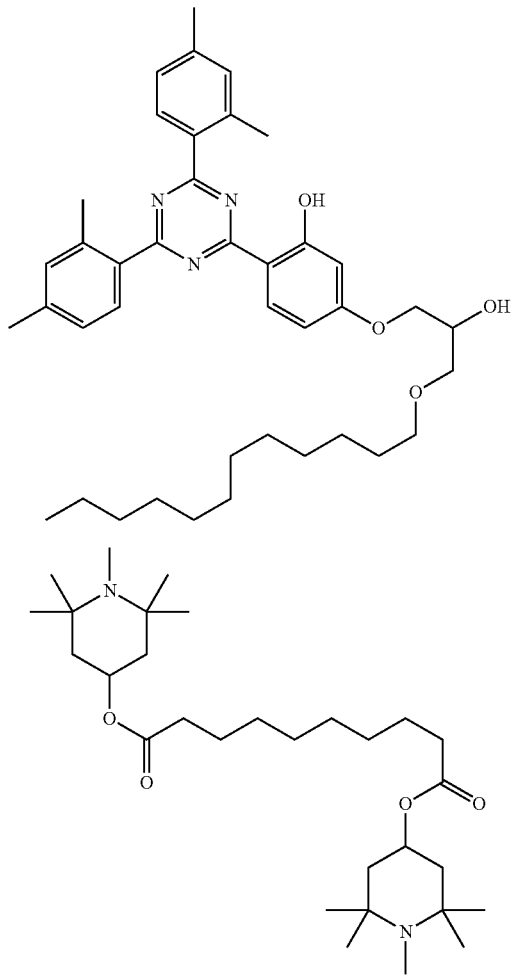

Table D indicates possible stabilisers which can be added to the LC media according to the invention.
(n here denotes an integer from 1 to 12, preferable 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table D.

TABLE E

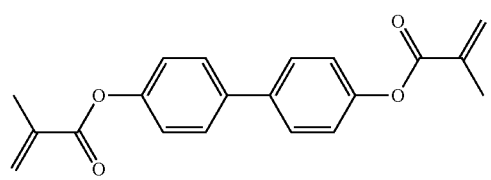 [SMILES: C=C(C)C(=O)Oc1ccc(-c2ccc(OC(=O)C(=C)C)cc2)cc1]

RM-1

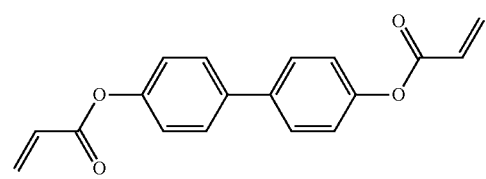

RM-2

TABLE E-continued
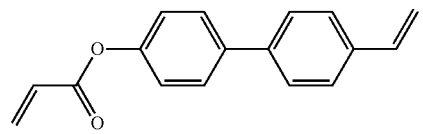 [SMILES: C=CC(=O)Oc1ccc(-c2ccc(C=C)cc2)cc1] RM-3
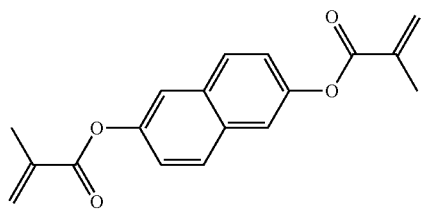 [SMILES: C=C(C)C(=O)Oc1ccc2cc(OC(=O)C(=C)C)ccc2c1] RM-4
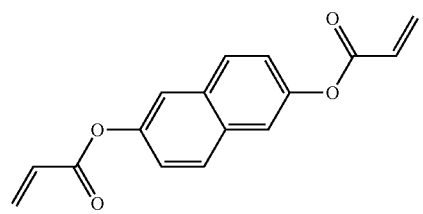 [SMILES: C=CC(=O)Oc1ccc2cc(OC(=O)C=C)ccc2c1] RM-5
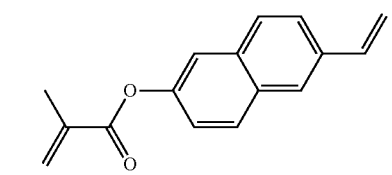 [SMILES: C=Cc1ccc2cc(OC(=O)C(=C)C)ccc2c1] RM-6
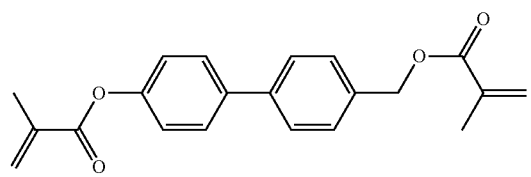 RM-7
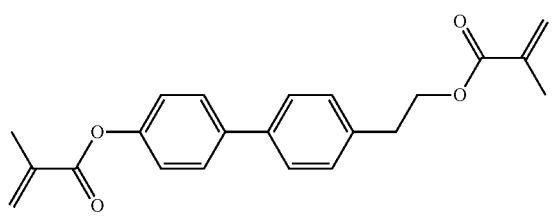 [SMILES: C=C(C)C(=O)OCCc1ccc(-c2ccc(OC(=O)C(=C)C)cc2)cc1] RM-8
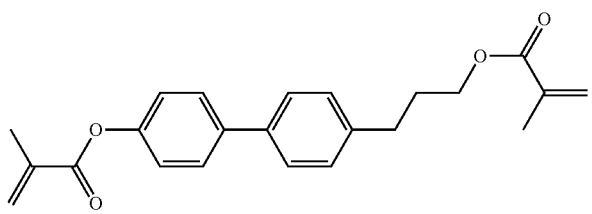 [SMILES: C=C(C)C(=O)OCCCc1ccc(-c2ccc(OC(=O)C(=C)C)cc2)cc1] RM-9
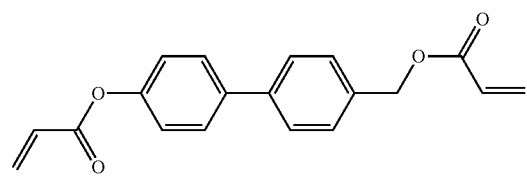 [SMILES: C=CC(=O)OCc1ccc(-c2ccc(OC(=O)C=C)cc2)cc1] RM-10

TABLE E-continued
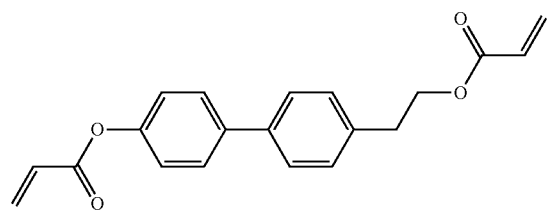 [SMILES: C=CC(=O)OCCc1ccc(-c2ccc(OC(=O)C=C)cc2)cc1] RM-11
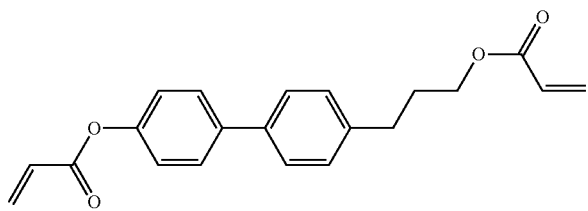 [SMILES: C=CC(=O)OCCCc1ccc(-c2ccc(OC(=O)C=C)cc2)cc1] RM-12
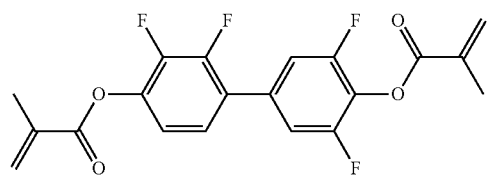 [SMILES: C=C(C)C(=O)Oc1ccc(-c2cc(F)c(OC(=O)C(=C)C)c(F)c2)c(F)c1F] RM-13
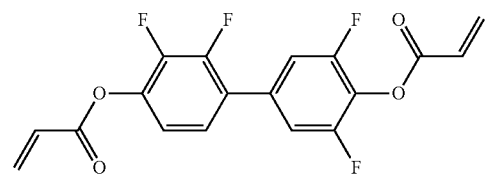 [SMILES: C=CC(=O)Oc1ccc(-c2cc(F)c(OC(=O)C=C)c(F)c2)c(F)c1F] RM-14
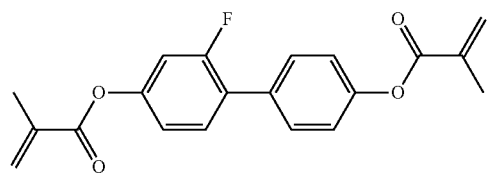 RM-15
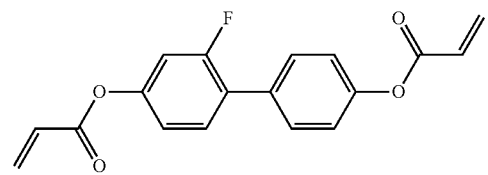 [SMILES: C=CC(=O)Oc1ccc(-c2ccc(OC(=O)C=C)cc2F)cc1] RM-16
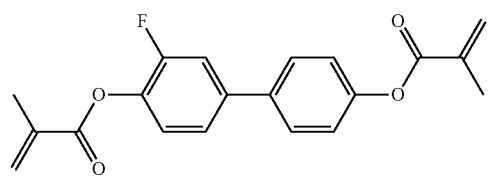 RM-17
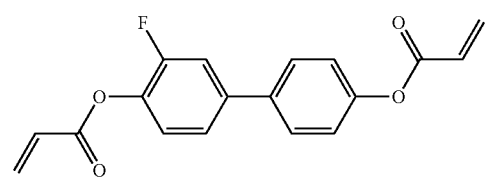 [SMILES: C=CC(=O)Oc1ccc(-c2ccc(OC(=O)C=C)c(F)c2)cc1] RM-18

TABLE E-continued
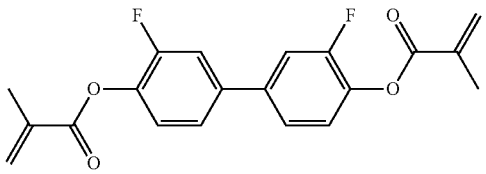 RM-19
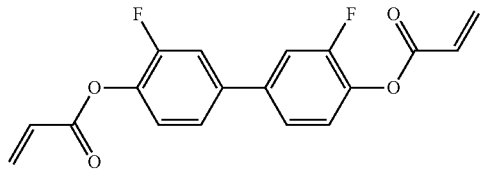 RM-20
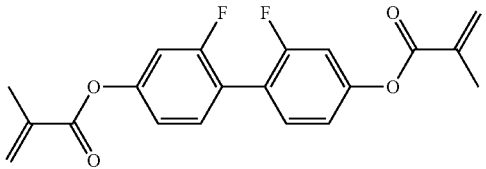 [SMILES: C=C(C)C(=O)Oc1ccc(-c2ccc(OC(=O)C(=C)C)cc2F)c(F)c1] RM-21
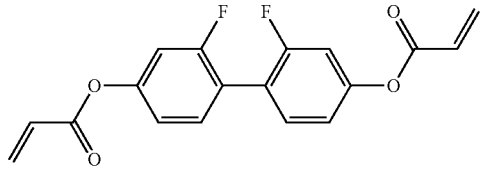 [SMILES: C=CC(=O)Oc1ccc(-c2ccc(OC(=O)C=C)cc2F)c(F)c1] RM-22
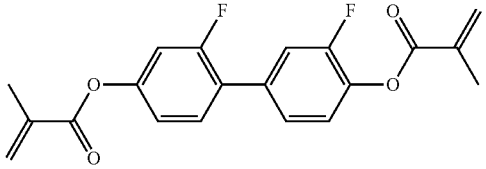 [SMILES: C=C(C)C(=O)Oc1ccc(-c2ccc(OC(=O)C(=C)C)c(F)c2)c(F)c1] RM-23
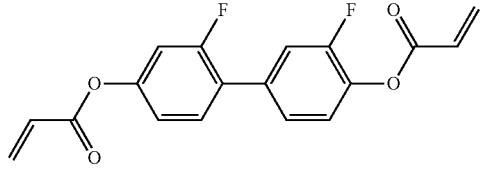 [SMILES: C=CC(=O)Oc1ccc(-c2ccc(OC(=O)C=C)c(F)c2)c(F)c1] RM-24
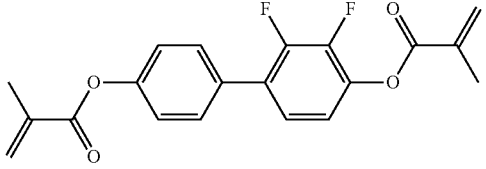 [SMILES: C=C(C)C(=O)Oc1ccc(-c2ccc(OC(=O)C(=C)C)c(F)c2F)cc1] RM-25
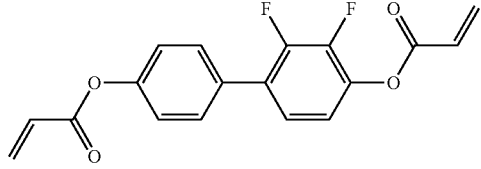 [SMILES: C=CC(=O)Oc1ccc(-c2ccc(OC(=O)C=C)c(F)c2F)cc1] RM-26
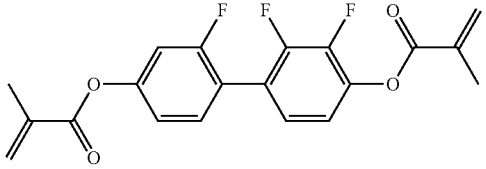 [SMILES: C=C(C)C(=O)Oc1ccc(-c2ccc(OC(=O)C(=C)C)c(F)c2F)c(F)c1F] RM-27

TABLE E-continued

| | |
|---|---|
| (structure) | RM-28 |
| (structure) | RM-29 |
| (structure) | RM-30 |
| (structure) | RM-31 |
| (structure) | RM-32 |
| (structure) | RM-33 |
| (structure) | RM-34 |
| (structure) | RM-35 |

TABLE E-continued
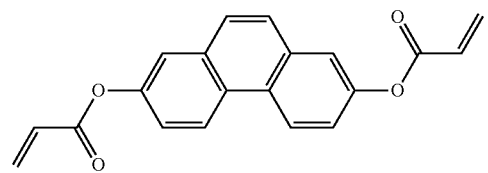 [SMILES: C=CC(=O)Oc1ccc2c(ccc3cc(OC(=O)C=C)ccc32)c1] RM-36
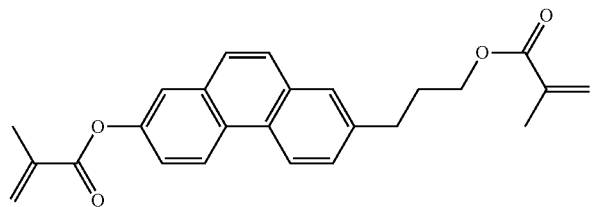 [SMILES: C=C(C)C(=O)OCCCc1ccc2c(ccc3cc(OC(=O)C(=C)C)ccc32)c1] RM-37
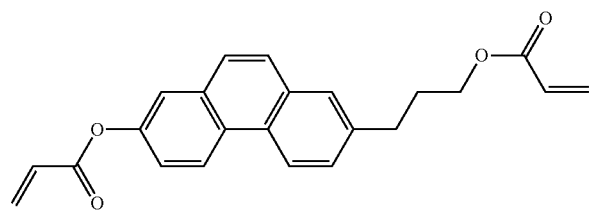 [SMILES: C=CC(=O)OCCCc1ccc2c(ccc3cc(OC(=O)C=C)ccc32)c1] RM-38
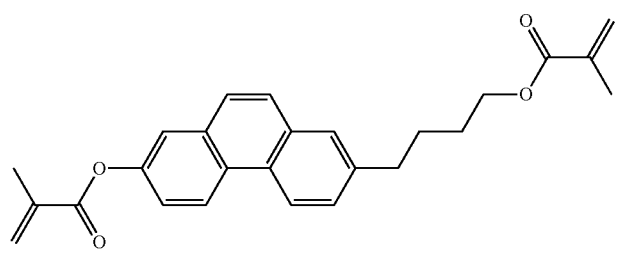 [SMILES: C=C(C)C(=O)OCCCCc1ccc2c(ccc3cc(OC(=O)C(=C)C)ccc32)c1] RM-39
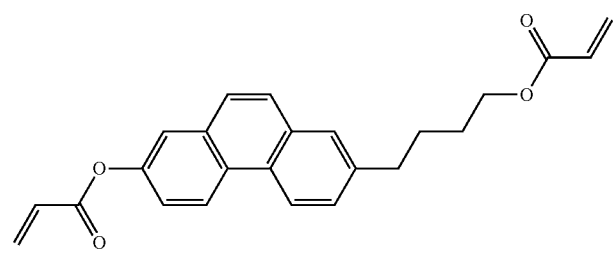 [SMILES: C=CC(=O)OCCCCc1ccc2c(ccc3cc(OC(=O)C=C)ccc32)c1] RM-40
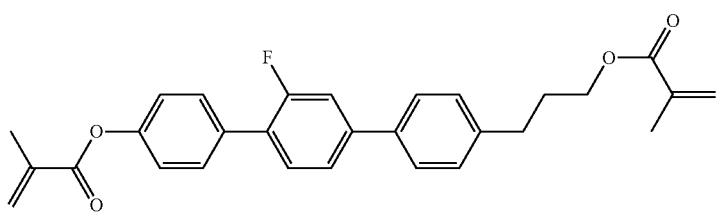 [SMILES: C=C(C)C(=O)OCCCc1ccc(-c2ccc(-c3ccc(OC(=O)C(=C)C)cc3)c(F)c2)cc1] RM-41
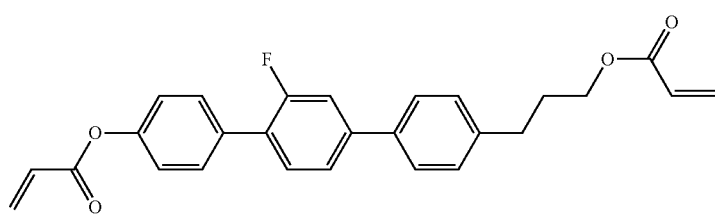 [SMILES: C=CC(=O)OCCCc1ccc(-c2ccc(-c3ccc(OC(=O)C=C)cc3)c(F)c2)cc1] RM-42

TABLE E-continued
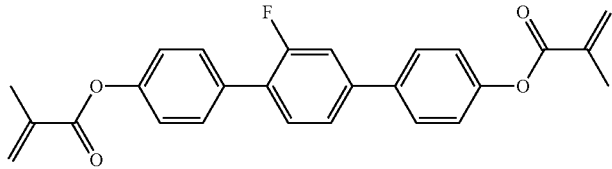 [SMILES: C=C(C)C(=O)Oc1ccc(-c2ccc(-c3ccc(OC(=O)C(=C)C)cc3)c(F)c2)cc1] RM-43
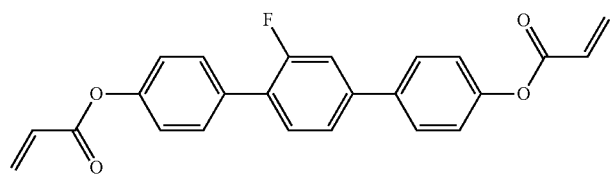 [SMILES: C=CC(=O)Oc1ccc(-c2ccc(-c3ccc(OC(=O)C=C)cc3)c(F)c2)cc1] RM-44
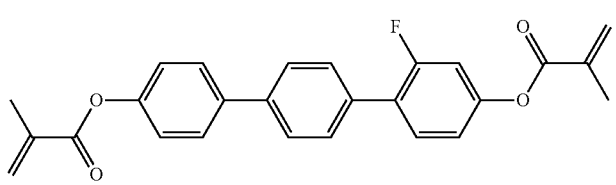 RM-45
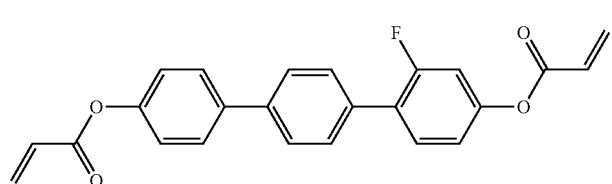 RM-46
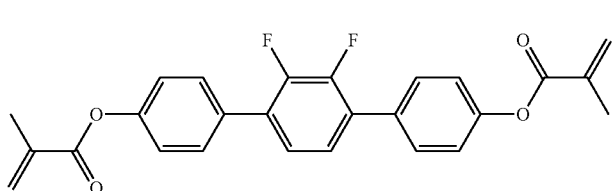 RM-47
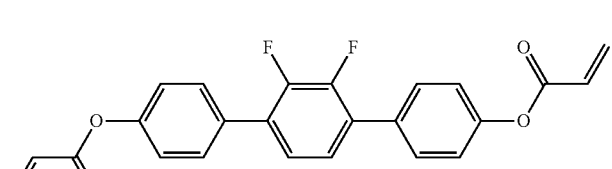 RM-48
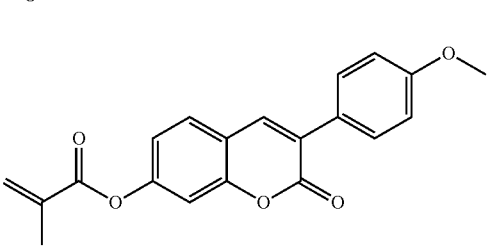 RM-49
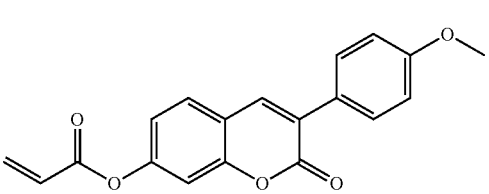 [SMILES: C=CC(=O)Oc1ccc2cc(-c3ccc(OC)cc3)c(=O)oc2c1] RM-50

TABLE E-continued
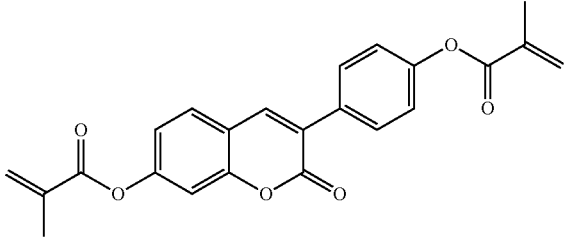 [SMILES: C=C(C)C(=O)Oc1ccc(-c2cc3ccc(OC(=O)C(=C)C)cc3oc2=O)cc1] RM-51
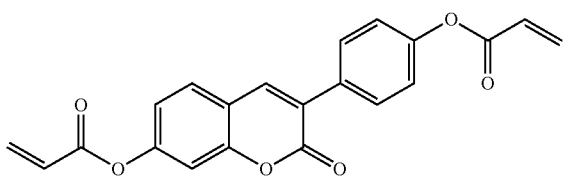 [SMILES: C=CC(=O)Oc1ccc(-c2cc3ccc(OC(=O)C=C)cc3oc2=O)cc1] RM-52
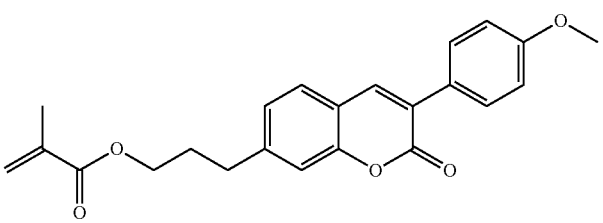 [SMILES: C=C(C)C(=O)OCCCc1ccc2cc(-c3ccc(OC)cc3)c(=O)oc2c1] RM-53
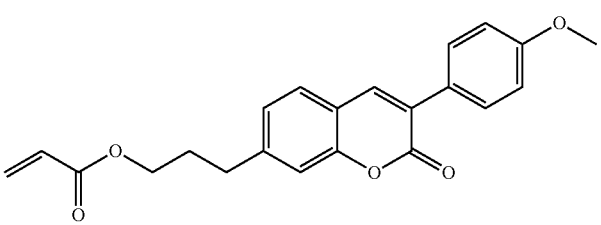 [SMILES: C=CC(=O)OCCCc1ccc2cc(-c3ccc(OC)cc3)c(=O)oc2c1] RM-54
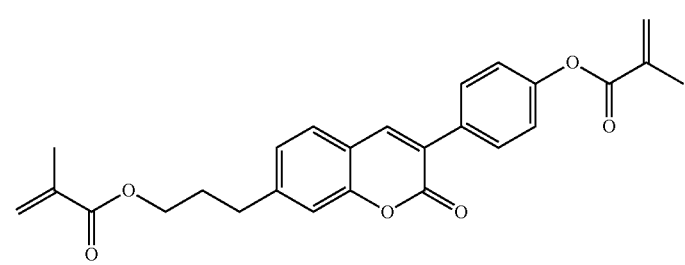 [SMILES: C=C(C)C(=O)OCCCc1ccc2cc(-c3ccc(OC(=O)C(=C)C)cc3)c(=O)oc2c1] RM-55
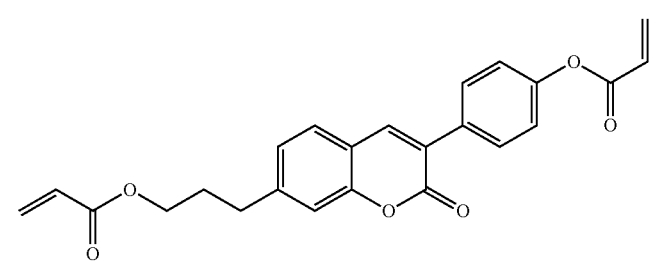 [SMILES: C=CC(=O)OCCCc1ccc2cc(-c3ccc(OC(=O)C=C)cc3)c(=O)oc2c1] RM-56
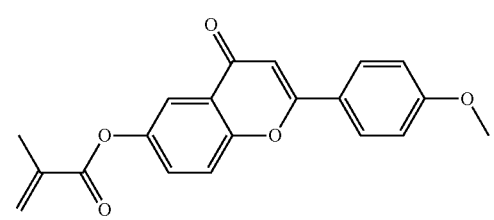 [SMILES: C=C(C)C(=O)Oc1ccc2oc(-c3ccc(OC)cc3)cc(=O)c2c1] RM-57

TABLE E-continued
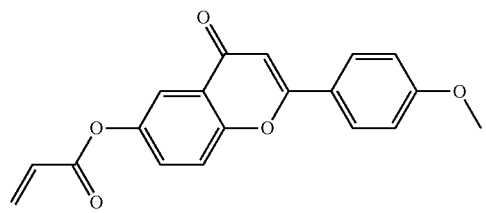 [SMILES: C=CC(=O)Oc1ccc2oc(-c3ccc(OC)cc3)cc(=O)c2c1]
RM-58
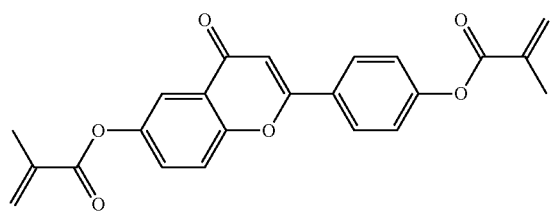 [SMILES: C=C(C)C(=O)Oc1ccc(-c2cc(=O)c3cc(OC(=O)C(=C)C)ccc3o2)cc1]
RM-59
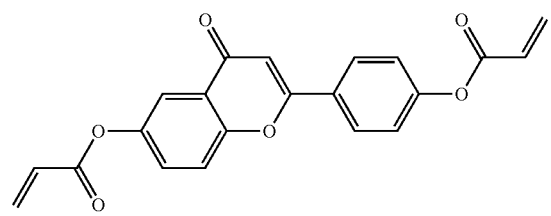 [SMILES: C=CC(=O)Oc1ccc(-c2cc(=O)c3cc(OC(=O)C=C)ccc3o2)cc1]
RM-60
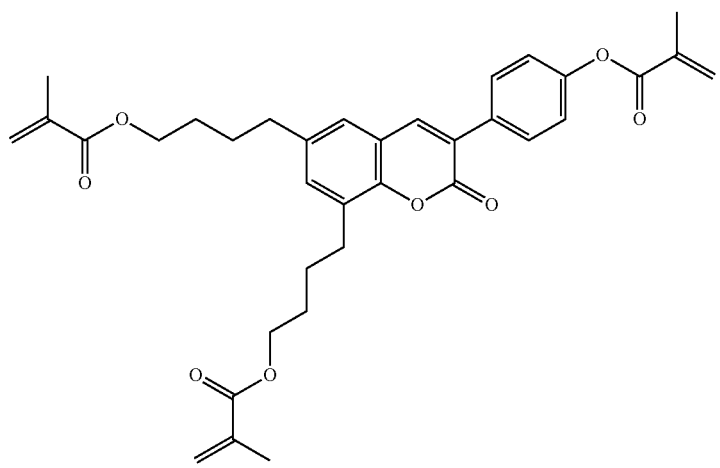 [SMILES: C=C(C)C(=O)OCCCCc1cc(CCCCOC(=O)C(=C)C)c2oc(=O)c(-c3ccc(OC(=O)C(=C)C)cc3)cc2c1]
RM-61
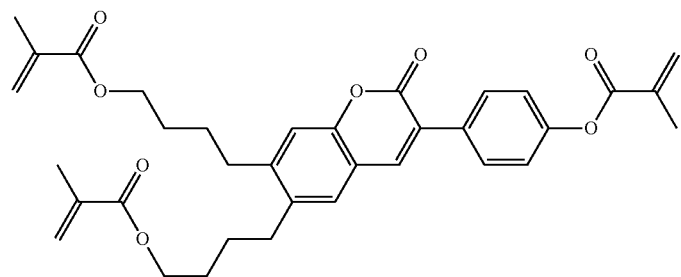 [SMILES: C=C(C)C(=O)OCCCCc1cc2cc(-c3ccc(OC(=O)C(=C)C)cc3)c(=O)oc2cc1CCCCOC(=O)C(=C)C]
RM-62

TABLE E-continued
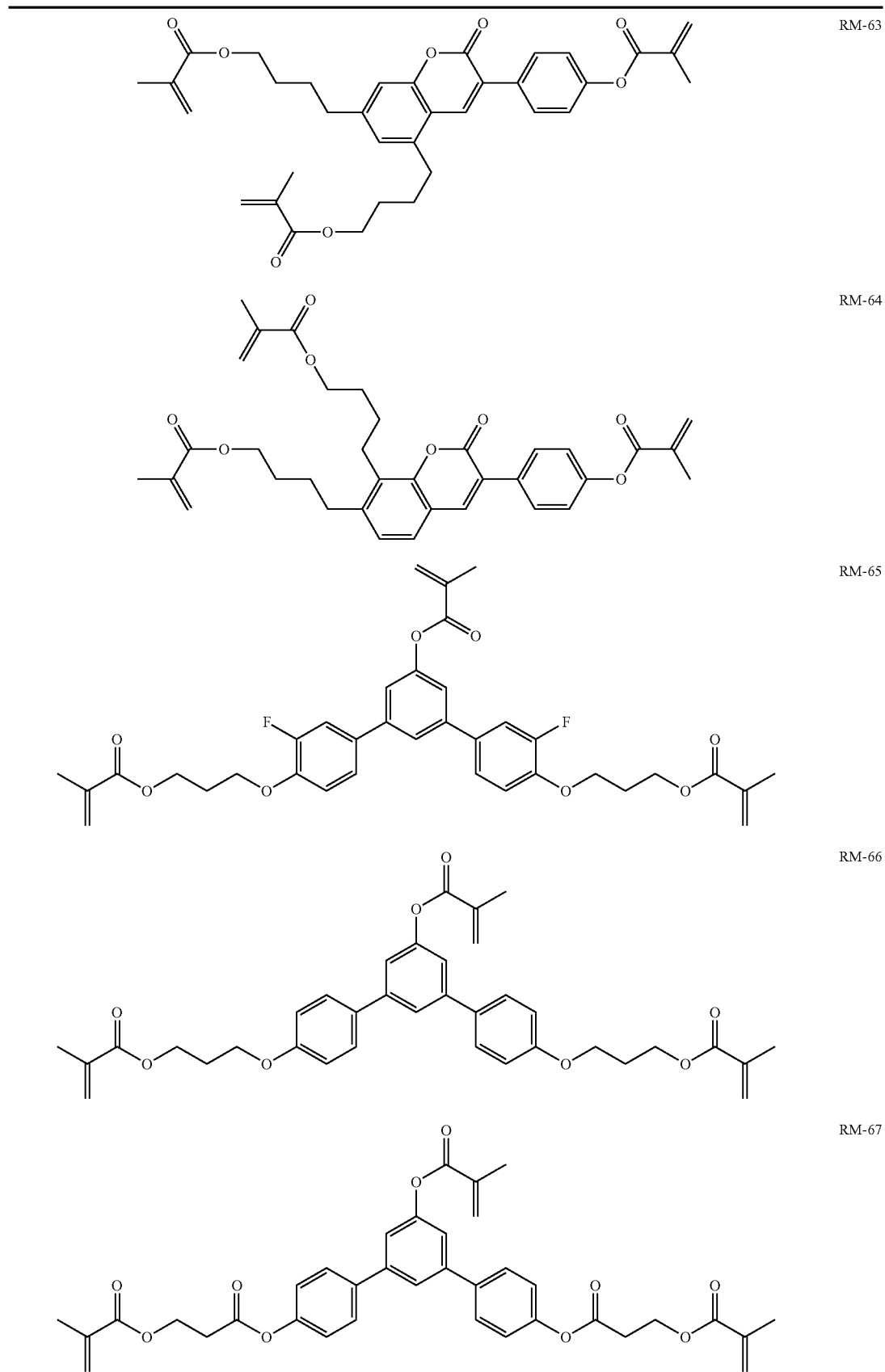

TABLE E-continued
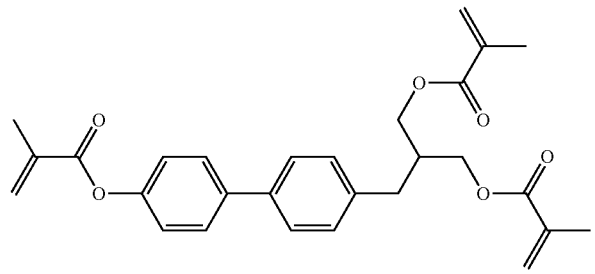 [SMILES: C=C(C)C(=O)OCC(COC(=O)C(=C)C)Cc1ccc(-c2ccc(OC(=O)C(=C)C)cc2)cc1]
RM-68
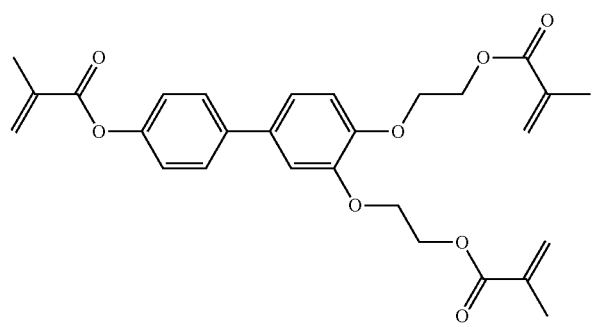 [SMILES: C=C(C)C(=O)OCCOc1ccc(-c2ccc(OC(=O)C(=C)C)cc2)cc1OCCOC(=O)C(=C)C]
RM-69
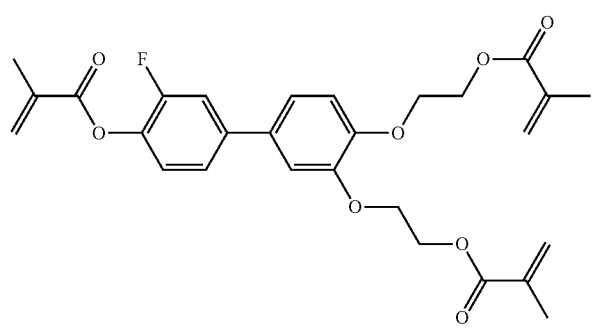 [SMILES: C=C(C)C(=O)OCCOc1ccc(-c2ccc(OC(=O)C(=C)C)c(F)c2)cc1OCCOC(=O)C(=C)C]
RM-70
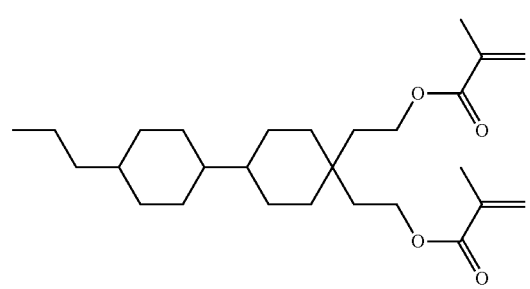 [SMILES: C=C(C)C(=O)OCCC1(CCOC(=O)C(=C)C)CCC(C2CCC(CCC)CC2)CC1]
RM-71
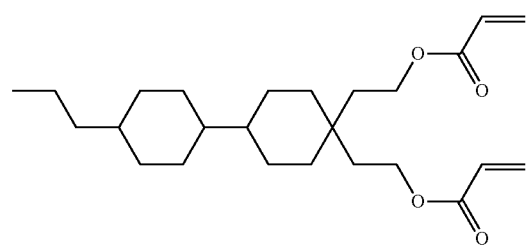 [SMILES: C=CC(=O)OCCC1(CCOC(=O)C=C)CCC(C2CCC(CCC)CC2)CC1]
RM-72

TABLE E-continued
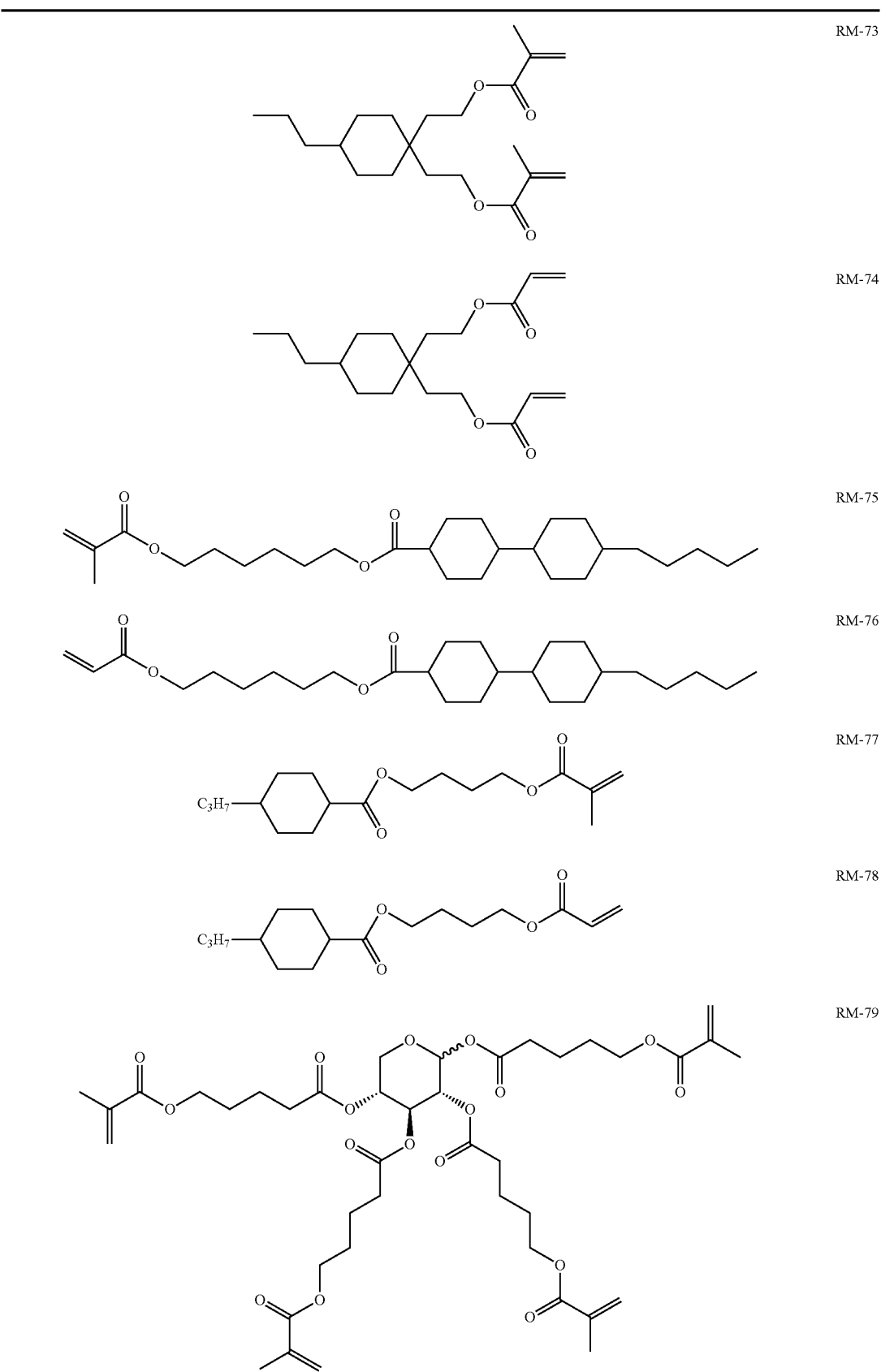

TABLE E-continued
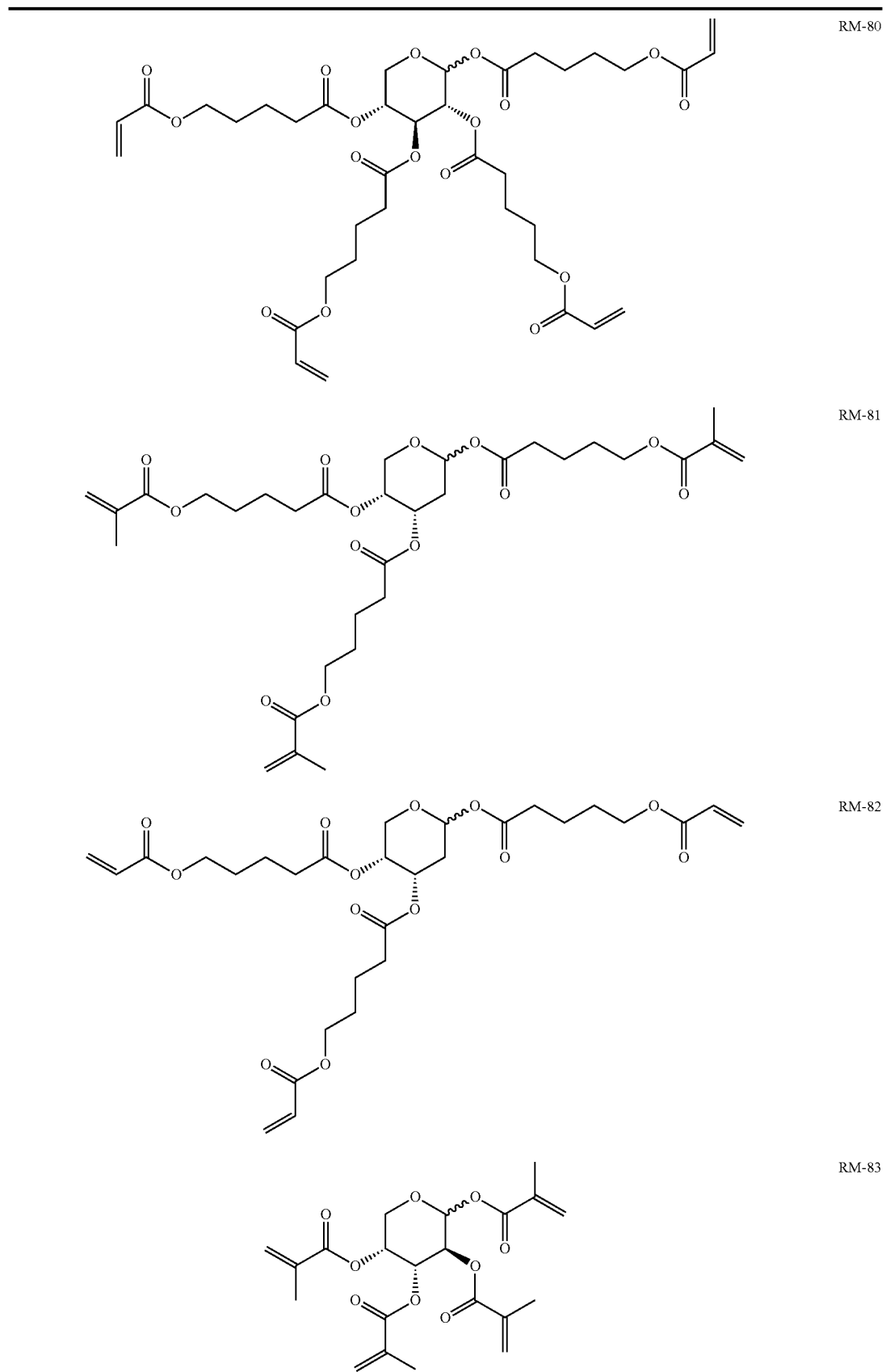
RM-80
RM-81
RM-82
RM-83

TABLE E-continued
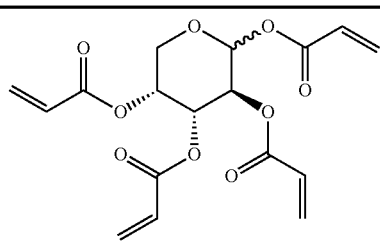
RM-84
Table E shows illustrative compounds which can be used in the LC media in accordance with the present invention, preferably as polymerisable compounds.
In a preferred embodiment of the present invention, the mesogenic media comprise one or more compounds selected from the group of the compounds from Table E.
TABLE F
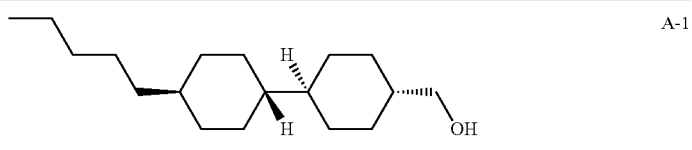
A-1
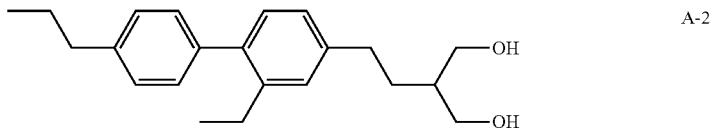
A-2
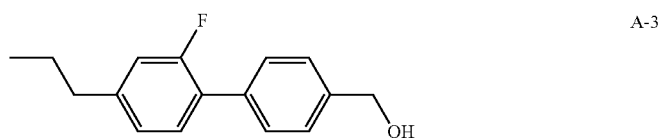
A-3
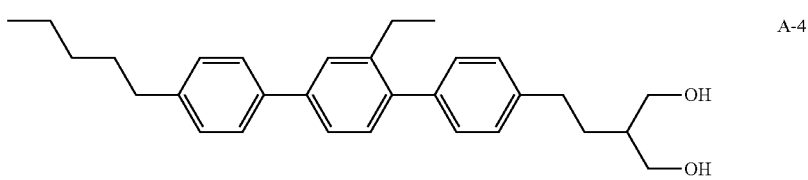
A-4
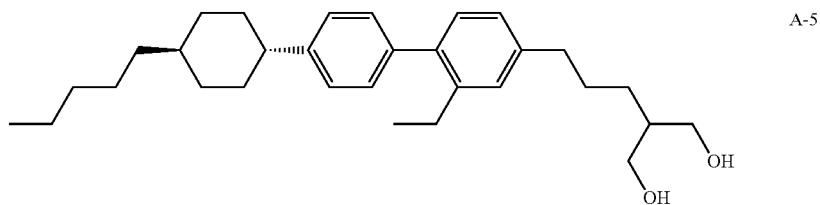
A-5
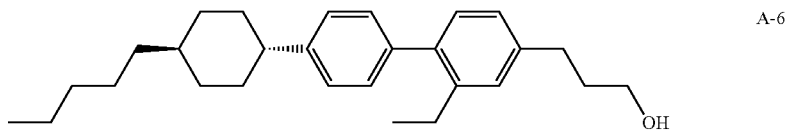
A-6
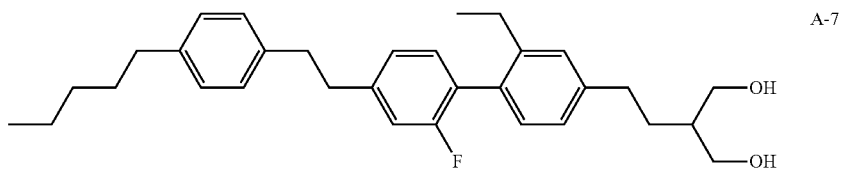
A-7

TABLE F-continued

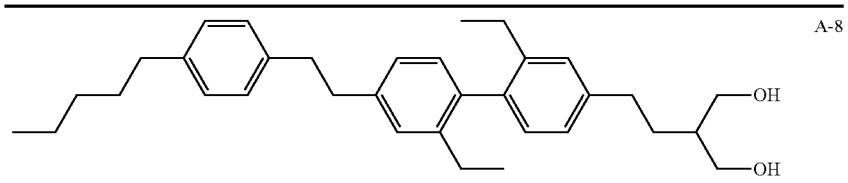

A-8

Table F shows illustrative compounds which can be employed in the LC media in accordance with the present invention, preferably as non-polymerisable self-alignment additives.

In the present application, the term "compounds", also written as "compound(s)", denotes, unless explicitly indicated otherwise, both one and also a plurality of compounds. Conversely, the term "compound" generally also encompasses a plurality of compounds, if this is possible according to the definition and is not indicated otherwise. The same applies to the terms LC media and LC medium. The term "component" in each case encompasses one or more substances, compounds and/or particles.

In addition, the following abbreviations and symbols are used:

$n_e$ extraordinary refractive index at 20° C. and 589 nm,
$n_o$ ordinary refractive index at 20° C. and 589 nm,
Δn optical anisotropy at 20° C. and 589 nm,
$\varepsilon\perp$ dielectric permittivity perpendicular to the director at 20° C. and 1 kHz,
$\varepsilon\|$ dielectric permittivity parallel to the director at 20° C. and 1 kHz,
Δε dielectric anisotropy at 20° C. and 1 kHz,
cl.p., T(N,l) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN]
$V_0$ capacitive threshold (Freedericks threshold) at 20° C. [V].

Unless explicitly noted otherwise, all concentrations in the present application are quoted in percent by weight and relate to the corresponding mixture as a whole comprising all solid or liquid-crystalline components, without solvents.

All physical properties are and have been determined in accordance with "Merck Liquid Crystals, Physical Properties of Liquid Crystals", Status Nov. 1997, Merck KGaA, Germany, and apply for a temperature of 20° C., and Δn is determined at 589 nm and Δε at 1 kHz, unless explicitly indicated otherwise in each case.

The polymerisable compounds are polymerised in the display or test cell by irradiation with UVA light (usually 365 nm) of defined intensity for a prespecified time, with a voltage optionally being applied simultaneously to the display (usually 10 to 30 V alternating current, 1 kHz). In the examples, unless indicated otherwise, a 100 mW/cm² mercury vapour lamp is used, and the intensity is measured using a standard UV meter (Ushio UNI meter) fitted with a 320 nm (optionally 340 nm) band-pass filter.

The following examples explain the present invention without intending to restrict it in any way. However, the physical properties make clear to the person skilled in the art what properties can be achieved and in what ranges they can be modified. In particular, the combination of the various properties which can preferably be achieved is thus well defined for the person skilled in the art.

Further combinations of the embodiments and variants of the invention in accordance with the description also arise from the claims.

EXAMPLES

The compounds employed, if not commercially available, are synthesised by standard laboratory procedures. The LC media originate from Merck KGaA, Germany.

A) Synthesis Examples

Example 1

2'-Fluoro-4"-(3-hydroxypropyl)-[1,1';4',1"]terphenyl-4-yl 2-methylacrylate

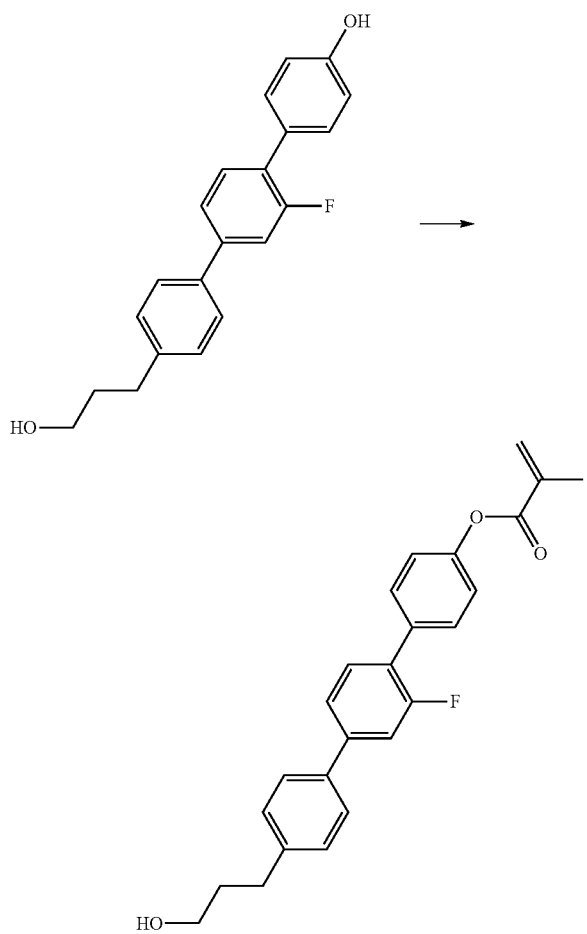

6.50 g (20.1 mmol) of 2'-fluoro-4"-(3-hydroxypropyl)-[1,1';4',1"]terphenyl-4-ol (CAS No. 1299463-47-0) are suspended in 100 ml of dichloromethane (DCM) and 10 ml of THF, 1.75 ml (20.6 mmol) of methacrylic acid and 245 mg (2.0 mmol) of DMAP are added, and a solution of 3.44 g (22.2 mmol) of 1-(3-dimethylaminopropyl)-3-ethylcarbodiimide (EDC) in 50 ml of dichloromethane is added dropwise with ice-cooling. After 1 h, the cooling is removed, and the batch is stirred at room temperature (RT) overnight. The solvent is removed in vacuo, the residue is chromatographed on silica gel with heptane/ethyl acetate (10%-70%), and the product obtained ($R_f$=0.3, heptane/ethyl acetate (1:1)) is recrystallised from acetonitrile, giving 2'-fluoro-4''-(3-hydroxypropyl)-[1,1';4',1'']terphenyl-4-yl 2-methylacrylate as colourless crystals.

Phases: C 139° C. I $^1$H-NMR (500 MHz, DMSO-$d_6$)

δ=1.74 ppm (q, 6.71 Hz, 2H, CH$_2$), 2.01 (s, 3H, CH$_3$), 2.65 (t, 7.67 Hz, 2H, CH$_2$), 3.43 (t, 6.17 Hz, 2H, CH$_2$—O), 4.47 (t, 5.06 Hz, 1H, OH), 5.90 (s, 1H), 6.30 (s, 1H), 7.29 (m$_e$, 4H), 7.69-7.54 (m, 7H).

Example 2

4'-(4-Hydroxy-3-hydroxymethylbutyl)biphenyl-4-yl 2-methylacrylate

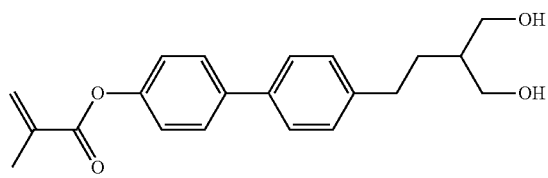 [SMILES: C=C(C)C(=O)Oc1ccc(-c2ccc(CCC(CO)CO)cc2)cc1]

1) 5-[2-(4'-Benzyloxybiphenyl-4-yl)ethyl]-2,2-di-tert-butyl-1,3,2-dioxasilinane

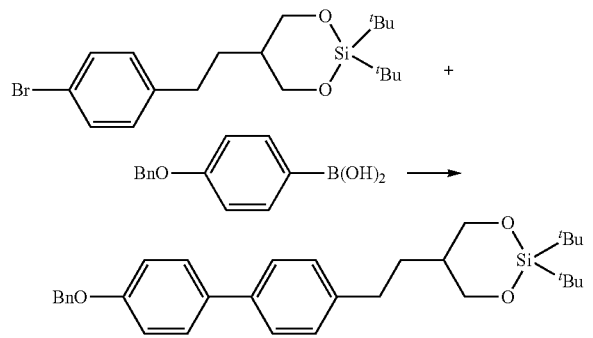

60 ml of THF, 5.00 g (22 mmol) of 4-benzyloxybenzeneboronic acid, 8.00 g (22 mmol) of 5-[2-(4-bromophenyl)ethyl]-2,2-di-tert-butyl-1,3,2-dioxasilinane and 0.28 g of bis(triphenylphosphine)palladium(II) chloride and 0.02 ml of hydrazinium hydroxide are added to 4.14 g (30 mmol) of sodium metaborate tetrahydrate in 12 ml of water, and the batch is heated under reflux overnight. 100 ml of methyl tert-butyl ether (MTB ether) and 100 ml of water are subsequently added, and the mixture is acidified using 2 M hydrochloric acid. The aq. phase is separated off and extracted three times with MTB ether. The combined org. phases are washed with sat. sodium chloride solution and dried over sodium sulfate. The solvent is removed in vacuo, the residue is filtered through silica gel with heptane/ethyl acetate (7:3 to 1:1), and the crude product is recrystallised from acetonitrile, giving 5-[2-(4'-benzyloxy-biphenyl-4-yl) ethyl]-2,2-di-tert-butyl-1,3,2-dioxasilinane as a colourless solid.

2) 4'-[2-(2,2-Di-tert-butyl-1,3,2-dioxasilinan-5-yl)ethyl]biphenyl-4-ol

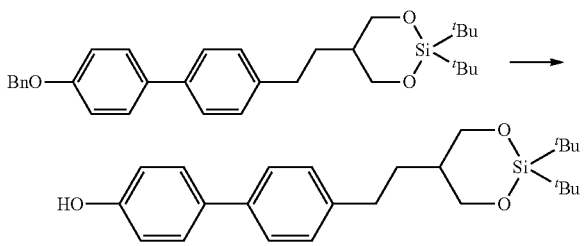

5-[2-(4'-Benzyloxybiphenyl-4-yl)ethyl]-2,2-di-tert-butyl-1,3,2-dioxasilinane is hydrogenated to completeness in THF on palladium/activated carbon catalyst. The catalyst is filtered off, the filtrate is evaporated, and the residue is recrystallised from heptane, giving 4'-[2-(2,2-di-tert-butyl-1,3,2-dioxasilinan-5-yl)-ethyl]biphenyl-4-ol as colourless, wadding-like needles.

$^1$H NMR (500 MHz, CDCl$_3$)

δ=1.02 ppm (s, 9H, tBu) 1.06 (s, 9H, tBu), 1.42 (m$_e$, 2H, —CH$_2$—), 2.19 (m$_e$, 1H, >CH—), 2.68 (m$_e$, 2H, Ar—CH$_2$—), 3.83 (t, J=11.1 Hz, 2H, CH$_2$O), 4.17 (dd, J=4.3 Hz, J=11.1 Hz, 2H, CH$_2$O), 4.93 (s, 1H, OH), 6.95 (AB-d, J=8.6 Hz, 2H, Ar—H), 7.26 (AB-d, J=8.2 Hz, 2H, Ar—H), 7.52 (AB-d, J=8.5 Hz, 2H, Ar—H).

3) 4'-[2-(2,2-Di-tert-butyl-1,3,2-dioxasilinan-5-yl)ethyl]biphenyl-4-yl 2-methylacrylate

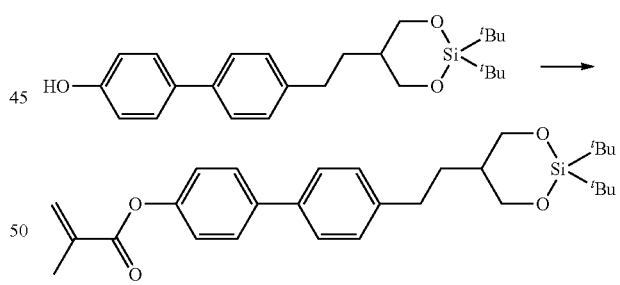

4'-[2-(2,2-Di-tert-butyl-1,3,2-dioxasilinan-5-yl)ethyl]biphenyl-4-ol is reacted with methacrylic acid analogously to Example 1, giving 4'-[2-(2,2-di-tert-butyl-1,3,2-dioxasilinan-5-yl)ethyl]biphenyl-4-yl2-methylacrylate as colourless crystals.

$^1$H NMR (500 MHz, CDCl$_3$)

δ=1.03 ppm (s, 9H, tBu) 1.06 (s, 9H, tBu), 1.43 (m$_e$, 2H, —CH$_2$—), 2.12 (m$_e$, 3H, CH$_3$), 2.19 (m$_e$, 1H, >CH—), 2.69 (m$_e$, 2H, Ar—CH$_2$—), 3.85 (t, J=11.2 Hz, 2H, CH$_2$O), 4.18 (dd, J=4.2 Hz, J=11.2 Hz, 2H, CH$_2$O), 5.83 (m$_e$, 1H, =CHH), 6.43 (m$_e$, 1H, =CHH), 7.25 (AB-d, J=8.7 Hz, 2H, Ar—H), 7.29 (AB-d, J=8.3 Hz, 2H, Ar—H), 7.57 (AB-d, J=8.3 Hz, 2H, Ar—H), 7.67 (AB-d, J=8.7 Hz, 2H, Ar—H).

4) 4'-(4-Hydroxy-3-hydroxymethylbutyl)biphenyl-4-yl 2-methylacrylate

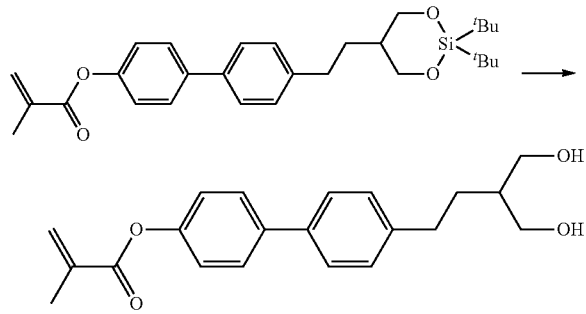

300 mg (0.624 mmol) of 4'-[2-(2,2-di-tert-butyl-1,3,2-dioxasilinan-5-yl)ethyl]-biphenyl-4-yl 2-methylacrylate are dissolved in 10 ml of dichloromethane, and 1.2 g (7.4 mmol) of triethylamine trishydrogenfluoride are added with ice-cooling. The cooling is removed, and the batch is left to stir at RT overnight. The solution is subsequently filtered through 100 g of silica gel, subsequently eluted with dichloromethane/methanol (9:1), and the filtrate is evaporated. The residue is digested with heptane and filtered off, giving 4'-(4-hydroxy-3-hydroxymethylbutyl)biphenyl-4-yl 2-methylacrylate as a colourless solid.

$^1$H-NMR (500 MHz, DMSO-d$_6$)
δ=1.62-1.46 (m, 3H), 2.02 (s, 3H, CH$_3$), 2.65 (m$_e$, 2H), 3.43 (m$_e$, 4H), 4.33 (t, 5.23 Hz, 2H, OH), 5.91 (m$_e$, 1H), 6.30 (s, 1H), 7.24 (d, 8.67 Hz, 2H), 7.30 (d, 8.21 Hz, 2H), 7.58 (d, 8.21 Hz, 2H), 7.69 (d, 8.68 Hz, 2H).

Example 3

Synthesis of 4-{2-[2'-ethyl-2-fluoro-4'-(3-hydroxypropyl)biphenyl-4-yl]ethyl}-phenyl 2-methylacrylate

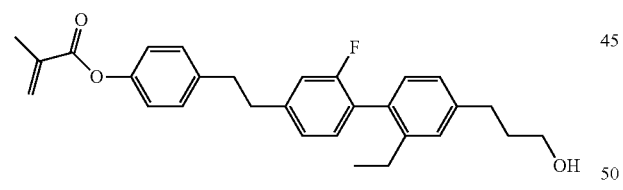

1) Synthesis of 4'-bromo-2'-ethylbiphenyl-4-ol A

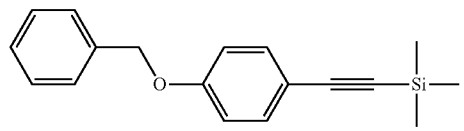

100.0 g (380 mmol) of 1-benzyloxy-4-bromobenzene and 55.99 g (570 mmol) of ethynyltrimethylsilane are dissolved in 1.07 l of diisopropylamine, and the mixture is degassed using a stream of argon for 60 min. 2.56 g (11.40 mmol) of palladium(II) acetate, 6.62 g (22.8 mmol) of tri-tert-butylphosphonium tetra-fluoroborate and 724 mg (3.80 mmol) of copper(I) iodide are then added, and the mixture is stirred at 60° C. for 18 h. When the reaction is complete, the reaction mixture is carefully added to a mixture of ice and methyl tert-butyl ether (MTB ether) and adjusted to pH=7-8. The organic phase is separated off, and the water phase is washed twice with MTB ether. The combined organic phases are then washed 1× with water and 1× with saturated NaCl solution, dried over sodium sulfate, filtered and evaporated in vacuo. The crude product obtained is filtered through 3 l of silica gel with heptane, giving 88.8 g of the product as a brown oil.

MS (El): 280.1 [M$^+$]
$^1$H NMR (500 MHz, CDCl$_3$) δ=0.24 (s, 9H, Si(CH$_3$)$_3$), 5.04 (s, 2H, benzylic CH$_2$), 6.88 (d, 8.9 Hz, arom.-H), 7.29-7.41 (m, 7H, arom.-H).

2) Synthesis of 1-benzyloxy-4-ethynylbenzene B

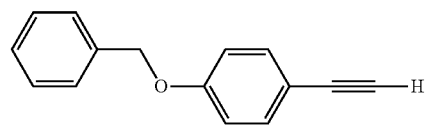

17.7 g (317 mmol) of KOH are carefully dissolved in 577 ml of methanol under a nitrogen atmosphere with stirring. The alkyne A is then added, and the reaction mixture is stirred at room temperature (RT) for 18 h. Water is carefully added to the reaction mixture, the latter is neutralised using dilute HCl, the water phase is extracted twice with MTB ether, and the combined organic phases are washed with water, dried over sodium sulfate, filtered and evaporated, giving 70 g of the crude product as a brown liquid, which is chromatographed on silica gel with heptane/chlorobutane (3:1), giving 54 g of the product having a purity of 99.9% (GC).

3) Synthesis of 4-(4-benzyloxyphenylethynyl)-1-bromo-2-fluorobenzene C

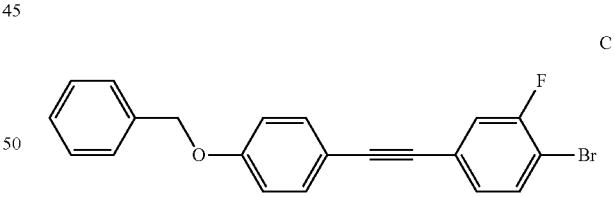

50.0 g (240.1 mmol) of alkyne B and 73.7 g (240 mmol) of 1-bromo-2-fluoro-4-iodobenzene are dissolved in a mixture of 166 ml of triethylamine and 389 ml of tetrahydrofuran (THF) with stirring, and the mixture is degassed. 3.37 g (5.0 mmol) of bis(triphenylphosphine)palladium(II) chloride and 0.91 g (4.82 mmol) of copper(I) iodide are subsequently added. After addition of the catalyst, the reaction mixture warms to 60° C., and the reaction is complete after about 10 min. The cooled reaction mixture is then introduced into a mixture of ice-water and ethyl acetate (EA) and carefully acidified using dilute hydrochloric acid. The organic phase is separated off, and the water phase is extracted twice with EA. The combined organic phases are washed with water and saturated NaCl solution, dried over sodium sulfate, filtered and evaporated. The crude product obtained is dissolved in warm toluene and filtered through 4 l of silica gel. The product obtained is subsequently crystallised from a mixture of 3 l of heptane and 300 ml of toluene at 5° C., giving 80 g of the product as golden-coloured crystals.

Synthesis of 4-(4-benzyloxyphenylethynyl)-2-fluorophenylboronic acid D

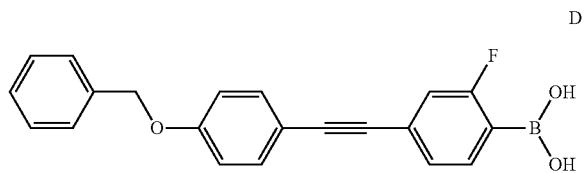 [SMILES: OB(O)c1ccc(C#Cc2ccc(OCc3ccccc3)cc2)cc1F]

86.4 g (227 mmol) of bromide C are dissolved in 1380 ml of THF and cooled to −78° C. The starting material precipitates out again at this temperature, but redissolves after addition of 155.8 ml (249 mmol) of n-butyllithium. After the addition, the mixture is stirred at −78° C. for a further 60 min, 28.3 ml (249 mmol) of trimethyl borate are subsequently carefully added, and the mixture is stirred at −78° C. for 20 min. The reaction mixture is then allowed to warm slowly to 0° C., acidified using 2 N hydrochloric acid with cooling, subsequently stirred briefly, and the phases are separated. The water phase is extracted by stirring with MTB ether, and the combined organic phases are washed with saturated NaCl solution and dried over sodium sulfate, filtered and evaporated. The crude product obtained (dark-brown crystals) is washed by stirring with hot toluene (1:20) and cooled to RT overnight, filtered off with suction and dried in a vacuum drying cabinet, giving 54 g of the product as beige crystals.

4) Synthesis of 4-(4-benzyloxyphenylethynyl)-4'-bromo-2'-ethyl-2-fluorobiphenyl E

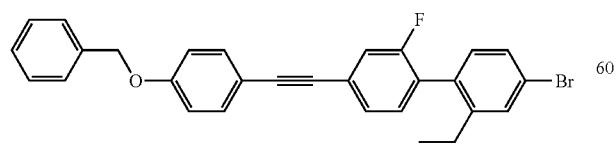

25.0 g (72.0 mmol) of boronic acid D, 22.4 g (72.0 mmol) of 4-bromo-2-ethyl-1-iodobenzene and 18.3 g (173 mmol) of sodium carbonate are suspended in a mixture of 337 ml of ethanol, 230 ml of toluene and 68 ml of water and degassed under argon. 1.67 g (1.44 mmol) of tetrakis(triphenylphosphine)-palladium(0) are subsequently added, and the mixture is heated to 80° C. The beige suspension is subsequently refluxed for 3 h and, when the conversion is complete (thin-layer check), cooled to RT. A sufficient amount of water and ethyl acetate (EA) are then added to the reaction mixture, and the organic phase is separated off. The water phase is extracted twice with EA, and the combined organic phases are washed with saturated NaCl solution. The organic phase remains a suspension and is warmed to complete dissolution, sodium sulfate is added at the temperature for drying, and the mixture is filtered while warm and allowed to cool (5° C.) for crystallisation. The crystalline product is filtered off with suction and rinsed with cold toluene, giving the product (22.2 g) as white crystals.

MS (EI): 486.1 [M$^+$]

$^1$H NMR (500 MHz, CDCl$_3$) δ=1.07 ppm (t, 7.5 Hz, 3H, CH$_3$), 2.48 (q, 7.4, 14.8 Hz, CH$_2$CH$_3$), 5.08 (s, 2H, benzylic CH$_2$), 6.96 (d, 8.7 Hz, 2H, arom.-H), 7.04 (d, 8.2 Hz, 1H, arom.-H), 7.16 (t, 7.8 Hz, 1 h, arom.-H), 7.27 (d, 10 Hz, 1H, arom.-H), 7.32-7.52 (m, 10H, arom.-H).

5) Synthesis of {3-[4'-(4-benzyloxyphenylethynyl)-2-ethyl-2'-fluorobiphenyl-4-yl]prop-2-ynyloxy}-tert-butyldimethylsilane F

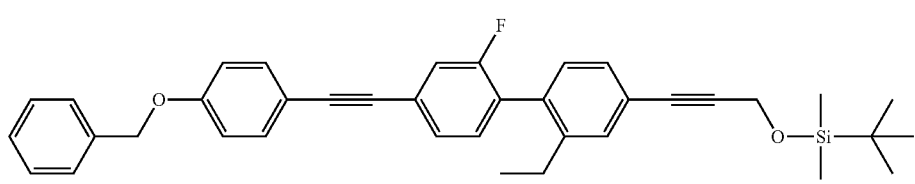

19.2 g (40.0 mmol) of bromide E and 24.06 ml (118.7 mmol) of tert-butyl-dimethylprop-2-ynyloxysilane are dissolved in 403 ml of diisopropylamine and degassed while argon is passed in (30 min). 444 mg (1.98 mmol) of palladium(II) acetate, 573.8 mg (1.978 mmol) of tri-tert-butylphosphonium tetra-fluoroborate and 301.3 mg (1.582 mmol) of copper(I) iodide are then added to the reaction mixture, and the mixture is stirred under reflux for 3 h. The reaction mixture is allowed to cool to RT, water is added, and the mixture is extracted with MTB ether. The phases are separated, the water phase is extracted with MTB ether, and the combined organic phases are washed with saturated NaCl solution, dried over sodium sulfate, filtered and evaporated in vacuo. The crude product is filtered through silica gel with chlorobutane/heptane (1:1) and crystallised from isopropanol (1:20), giving 17.4 g of the product.

$^1$H NMR (500 MHz, CDCl$_3$)

δ=0.00 ppm (s, 6H, Si(CH$_3$)$_2$), 0.78 (s, 9H, Si(C(CH$_3$)$_3$), 0.89 (t, 7.57 Hz, 3H, CH$_3$), 2.30 (q, 7.53, 2H, CH$_2$CH$_3$), 4.38 (s, 2H, CH$_2$—OSi(CH$_3$)$_2$C(CH$_3$)$_3$, 4.91 (s, 2H, benzylic CH$_2$), 6.78 (d, 8.85 Hz, 2H, arom.-H), 6.93 (d, 7.85 Hz, 1H, arom.-H), 7.25-7.04 (m, 9H, arom.-H), 7.29 (d, 8.83 Hz, 2H, arom.-H).

6) Synthesis of 4-(2-{4'-[3-(tert-butyldimethylsilanyloxy)propyl]-2'-ethyl-2-fluorobiphenyl-4-yl}ethyl)phenol G

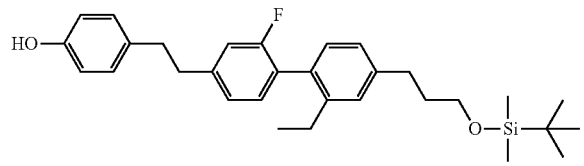

16.7 g (28.0 mmol) of alkyne F are dissolved in 170 ml of THF and hydrogenated at room temperature (RT) and atmospheric pressure for 58 h with 5.7 g of sponge nickel catalyst (water-wet) and 4.2 l of hydrogen. When the reaction is complete, the reaction solution is filtered, evaporated and filtered through silica gel with dichloromethane (DCM), giving 13.5 g of the product.

$^1$H NMR (500 MHz, CDCl$_3$)

δ=0.00 ppm (s, 6H, Si(CH$_3$)$_2$), 0.84 (s, 9H, Si(C(CH$_3$)$_3$), 0.99 (t, 7.58 Hz, 3H, CH$_3$), 1.82 (m$_e$, 2H), 2.41 (q, 7.54 Hz, 2H), 2.63 (t, 7.95 Hz, 2H), 2.96 (s, 4H, phenyl-CH$_2$—CH$_2$-phenyl), 3.45 (q, 6.4 Hz, 2H), 4.46 (t, 5.15 Hz, 1H, OH), 6.67 (d, 8.49 Hz, 2H, arom.-H), 6.84 (dd, 1.41, 10.61 Hz, 1H, arom.-H), 6.88 (dd, 1.53, 7.73 Hz, 1H, arom.-H), 6.96 (d, 8.43 Hz, 2H, arom.-H), 7.06-6.98 (m, 4H, arom.-H).

7) Synthesis of 4-(2-{4'-[3-(tert-butyldimethylsilanyloxy)propyl]-2'-ethyl-2-fluorobiphenyl-4-yl}ethyl)phenyl 2-methylacrylate H

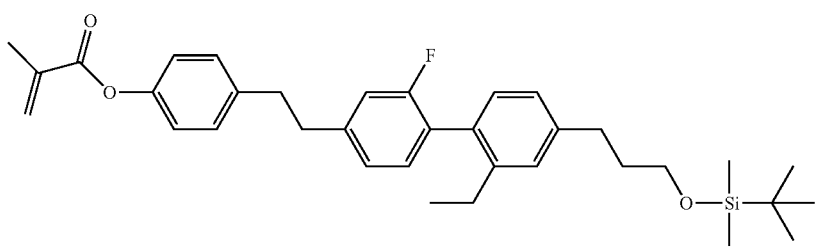

3.00 g (6.09 mmol) of alcohol G, 37.2 mg (0.30 mmol) of 4-(dimethylamino)-pyridine and 0.72 ml (8.52 mmol) of methacrylic acid are initially introduced in 45 ml of dichloromethane and cooled to 0° C. A solution of 1.51 ml (8.52 mmol) of 1-(3-dimethylaminopropyl)-3-ethylcarbodiimide in 20 ml of dichloromethane is then added dropwise, and the mixture is allowed to warm to RT. After stirring at RT for a further 2 days and when the reaction is complete, the reaction mixture is chromatographed directly on silica gel with dichloromethane, giving 2.6 g of the product having a purity of 99% (HPLC).

$^1$H NMR (500 MHz, CDCl$_3$)

δ=0.00 ppm (s, 6H, Si(CH$_3$)$_2$), 0.85 (s, 9H, Si(C(CH$_3$)$_3$), 1.00 (t, 7.57 Hz, 3H, CH$_3$), 1.82 (m$_e$, 2H, CH$_2$), 1.99 (s, 3H, CH$_3$), 2.42 (q, 7.53, 2H), 2.64 (t, 7.93 Hz, 2H), 2.89 (s, 4H, phenyl-CH$_2$—CH$_2$-phenyl), 3.61 (t, 6.32 Hz, 2H), 5.67 (s, 1H), 6.27 (s, 1H), 6.64 (d, 11.9 Hz, 1H, arom.-H), 6.91 (dd, 1.53, 7.72 Hz, 1H, arom.-H), 6.98 (d, 8.5 Hz, 2H, arom.-H), 7.09-6.98 (m, 4H, arom.-H), 7.13 (d, 8.47 Hz, 2H, arom.-H).

8) Synthesis of 4-{2-[2'-ethyl-2-fluoro-4'-(3-hydroxypropyl)biphenyl-4-yl]ethyl}-phenyl 2-methylacrylate

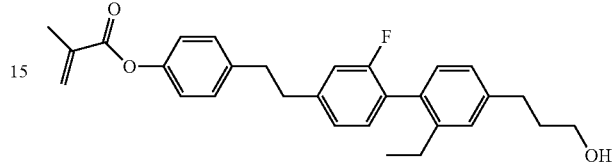

2.60 g (4.63 mmol) of silyl ether H are dissolved in 56 ml of tetrahydrofuran (THF), the solution is cooled to 0° C., and 2.66 ml (2 mol/l, 5.33 mmol) of HCl are added dropwise. The reaction solution is allowed to warm to room temperature and, after 3 hours, carefully neutralised using sodium hydrogen-carbonate solution. MTB ether is added, the mixture is extracted, and the phases are separated. The organic phase is washed with water, dried over sodium sulfate, filtered and evaporated. The crude product is chromatographed on silica gel with heptane/ethyl acetate, and the product fractions are evaporated, giving 1.3 g (67%) of the product as a crystalline solid having a purity of 99.9% (HPLC).

Phases: Tg 15° C. C 88° C. I $^1$H NMR (500 MHz, DMSO-D$_6$)

δ=1.00 (t, 7.57 Hz, 3H, CH$_3$), 1.76 (m$_e$, 2H), 2.07 (s, 3H, CH$_3$), 2.42 (q, 7.55 Hz, 2H), 2.64 (t, 7.92 Hz, 2H), 2.96 (s, 4H, phenyl-CH$_2$—CH$_2$-phenyl), 3.46 (q, 6.4 Hz, 2H), 4.46 (t, 5.15 1H, OH), 5.89 (s, 1H), 6.27 (s, 1H), 6.64 (d, 11.9 Hz, 1H, arom.-H), 7.04 (d, 7.71 Hz, 1H, arom.-H), 7.15-7.06 (m, 3H, arom.-H), 7.21-7.16 (m, 4H, arom.-H), 7.32 (d, 8.54 Hz, 2H, arom.-H).

Example 4

2-(4-{2-[2'-Ethyl-2-fluoro-4'-(3-hydroxypropyl)biphenyl-4-yl]ethyl}phenoxy)ethyl 2-methacrylate

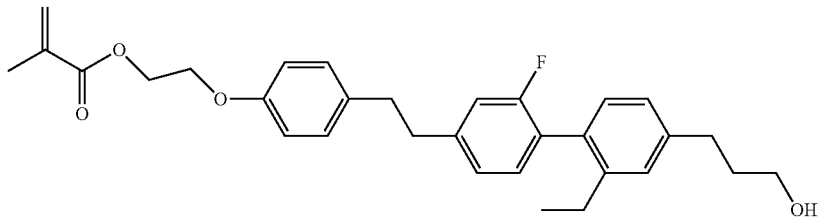 [SMILES: C=C(C)C(=O)OCCOc1ccc(CCc2ccc(-c3ccc(CCCO)cc3CC)c(F)c2)cc1]

1) Synthesis of 4-{2-[2'-ethyl-2-fluoro-4'-(3-hydroxypropyl)biphenyl-4-yl]ethyl}-phenyl 2-methylacrylate H

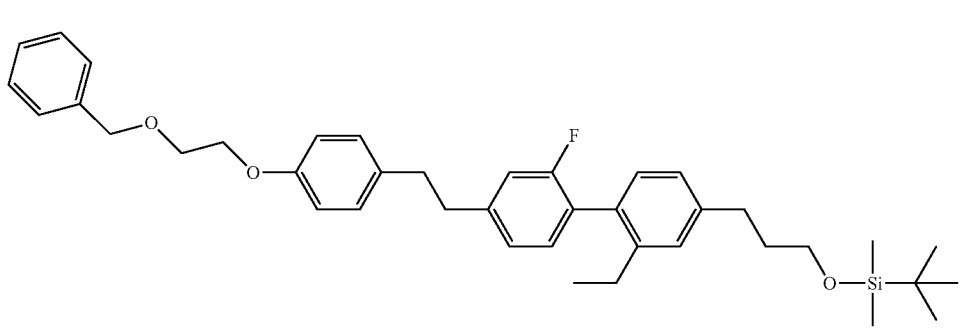

K 8.20 g (16.5 mmol) of alcohol G (cf. example above) are dissolved in 119 ml of ethyl methyl ketone, and 5.69 g (41 mmol) of potassium carbonate are added. 13.14 g (61.1 mmol) of 2-bromoethoxymethylbenzene are subsequently added in portions, and the mixture is refluxed for 48 h. The reaction mixture is subsequently allowed to cool to room temperature (RT), filtered and rinsed with acetone. The organic phases are evaporated and purified by chromatography on silica gel with toluene, giving 7.3 g of the desired product.

$^1$H NMR (500 MHz, CDCl$_3$)

δ=0.00 ppm (s, 6H, Si(CH$_3$)$_2$), 0.84 (s, 9H, Si(C(CH$_3$)$_3$), 1.00 (t, 7.56 Hz, 3H, CH$_3$), 1.80 (m$_e$, 2H), 2.42 (q, 7.53 Hz, 2H), 2.63 (t, 7.92 Hz, 2H), 2.84 (s, 4H, phenyl-CH$_2$—CH$_2$-phenyl), 3.61 (t, 6.3 Hz, 2H), 3.76 (t, 4.84 Hz, 2H), 4.07 (t, 5.08 Hz, 2H), 4.57 (s, 2H), 6.68 (d, 8.6 Hz, 2H, arom.-H), 6.86 (dd, 10.61, 1.42 Hz, 1H, arom.-H), 6.89 (dd, 7.72, 1.56 Hz, 1H, arom.-H), 7.11-6.97 (m, 7H, arom.-H), 7.24-7.16 (m, 1H, arom.-H, superimposed with toluene) 7.32-7.25 (m, 3H, arom.-H, superimposed with toluene).

2) Synthesis of 2-[4-(2-{4'-[3-(tert-butyldimethylsilanyloxy)propyl]-2'-ethyl-2-fluorobiphenyl-4-yl}ethyl)phenoxy]ethanol I

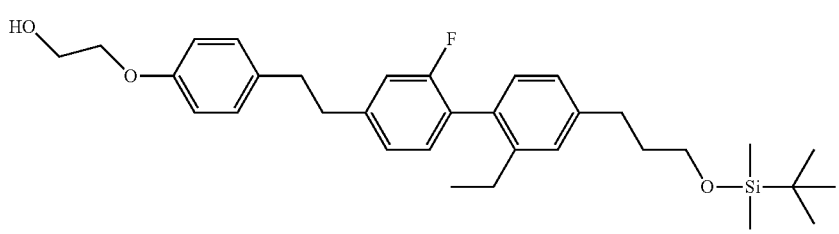

L 6.4 g (10.0 mmol) of benzyl ester K are dissolved in 70 ml of tetrahydrofuran, and 0.39 g (3.87 mmol) of NEt$_3$ and 12.0 g of 5% Pd/C (54% of water) are added. The mixture is subsequently stirred at 50° C. and a hydrogen pressure of 5 bar for 82 h. The reaction mixture is filtered, and the crude product is filtered through silica gel with dichloromethane and MTB ether, giving 5.5 g of the desired product.

$^1$H NMR (500 MHz, CDCl$_3$)

δ=0.00 ppm (s, 6H, Si(CH$_3$)$_2$), 0.85 (s, 9H, Si(C(CH$_3$)$_3$), 1.00 (t, 7.57 Hz, 3H, CH$_3$), 1.82 (m$_e$, 2H), 1.92 (t, 6.25 Hz, 1H, OH), 2.42 (q, 7.52 Hz, 2H), 2.64 (t, 7.95 Hz, 2H), 2.85 (s, 4H, phenyl-CH$_2$—CH$_2$-phenyl), 3.61 (t, 6.3 Hz, 2H), 3.89 (m, 2H), 4.07 (t, 4.64 Hz, 2H), 6.78 (d, 8.5 Hz, 2H, arom.-H), 6.86 (d, 10.69, 1H, arom.-H), 6.89 (d, 7.74 Hz, 1H, arom.-H), 7.07-6.98 (m, 6H, arom.-H).

3) Synthesis of 2-[4-(2-{4'-[3-(tert-butyldimethylsilanyloxy)propyl]-2'-ethyl-2-fluorobiphenyl-4-yl}ethyl)phenoxy]ethyl 2-methylacrylate J

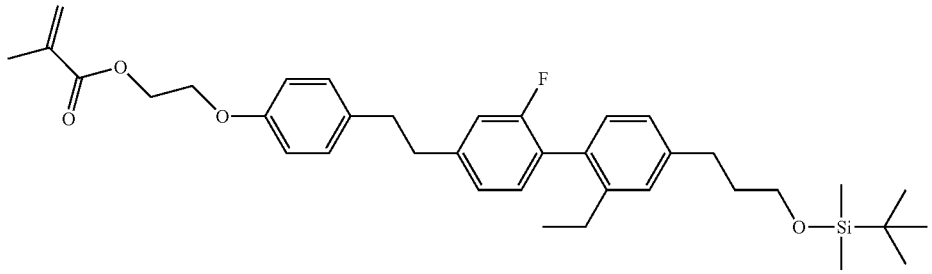

M 5.60 g (10.4 mmol) of alcohol M, 5.19 ml (61.5 mmol) of methacrylic acid and 62.6 mg (0.512 mmol) of 4-(dimethylamino)pyridine are dissolved in 45 ml of dichloromethane (DCM) and cooled to 0° C. 10.87 ml (61.5 mmol) of EDC (dissolved in 30 ml of DCM) are then added, and the mixture is stirred at RT for 48 h. The reaction mixture is chromatographed directly on 250 g of silica gel with DCM, and the product fractions are evaporated in vacuo, giving 5.6 g of the desired product.

$^1$H NMR (500 MHz, CDCl$_3$)

δ=0.00 ppm (s, 6H, Si(CH$_3$)$_2$), 0.85 (s, 9H, Si(C(CH$_3$)$_3$), 1.00 (t, 7.57 Hz, 3H, CH$_3$), 1.81 (m$_e$, 2H), 1.89 (s, 3H), 2.42 (q, 7.54 Hz, 2H), 2.64 (t, 7.94 Hz, 2H), 2.85 (s, 4H, phenyl-CH$_2$—CH$_2$-phenyl), 3.61 (t, 6.3 Hz, 2H), 4.14 (t, 4.8 Hz, 2H), 4.42 (t, 5.02 Hz, 2H), 5.51 (s, 1H), 6.07 (s, 1H), 6.78 (d, 8.6 Hz, 2H, arom.-H), 6.86 (dd, 10.57, 1.33 Hz, 1H, arom.-H), 6.89 (dd, 7.74, 1.48 Hz, 1H, arom.-H), 7.1-6.97 (m, 6H, arom.-H).

4) Synthesis of 2-(4-{2-[2'-ethyl-2-fluoro-4'-(3-hydroxypropyl)biphenyl-4-yl]-ethyl}phenoxy)ethyl 2-methylacrylate

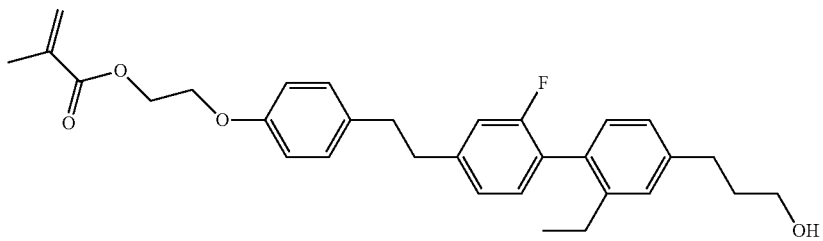 [SMILES: C=C(C)C(=O)OCCOc1ccc(CCc2ccc(-c3ccc(CCCO)cc3CC)c(F)c2)cc1]

5.60 g (9.30 mmol) of methacrylic acid ester M are dissolved in 112 ml of tetrahydrofuran (THF), the solution is cooled to 0° C., and 5.27 ml (10.5 mmol/2 N) of hydrochloric acid are added dropwise. The reaction solution is allowed to warm to room temperature and stirred for 3 h. When the reaction is complete, the mixture is carefully neutralised using NaHCO$_3$ solution, and the product is extracted a number of times with MTB ether. The combined organic phases are dried over sodium sulfate, filtered and evaporated. The reaction product is chromatographed on silica gel with heptane/ethyl acetate, and the product fractions are evaporated in vacuo. The product is subsequently dried at 40° C. and 1.6·10$^{-4}$ bar for 3 hours in order to remove solvent residues, giving 3.6 g of the desired product.

Phases: Tg −24° C. I $^1$H NMR (500 MHz, CDCl$_3$)

δ=1.10 (t, 7.57 Hz, 3H, CH$_3$), 1.32 (s, 1H, OH), 1.81 (m$_e$, 2H), 1.98 (m$_e$, 5H), 2.53 (q, 7.54 Hz, 2H), 2.77 (t, 7.92 Hz, 2H), 2.95 (s, 4H, phenyl-CH$_2$—CH$_2$-phenyl), 3.76 (t, 6.42 Hz, 2H), 4.24 (t, 4.75 Hz, 2H), 4.52 (t, 5.0 Hz, 2H), 5.61 (s, 1H), 6.17 (s, 1H), 6.88 (d, 8.56 Hz, 2H, arom.-H), 6.96 (dd, 10.56, 1.01 Hz, 1H, arom.-H), 7.04 (d, 7.75, 1.29 Hz, 1H, arom.-H), 7.2-7.08 (m, 6H, arom.-H).

The following example compounds are prepared analogously to the above examples:

| No. | Structure of the example compound |
|---|---|
| 5. | 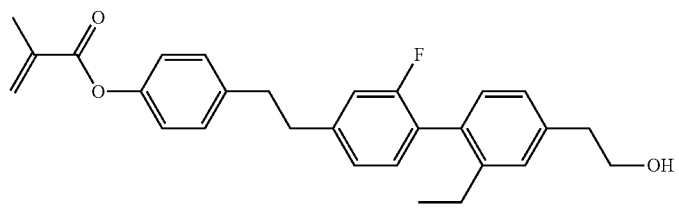 |
| 6. | 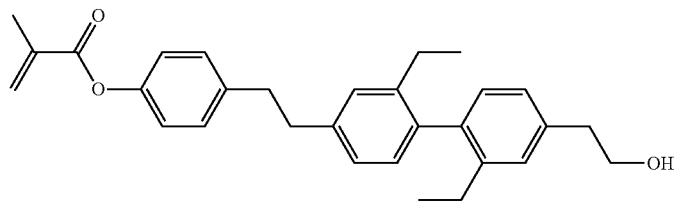 [SMILES: C=C(C)C(=O)Oc1ccc(CCc2ccc(-c3ccc(CCO)cc3CC)c(CC)c2)cc1] |
| 7. | 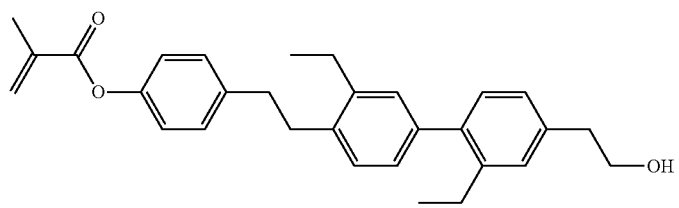 [SMILES: C=C(C)C(=O)Oc1ccc(CCc2ccc(-c3ccc(CCO)cc3CC)cc2CC)cc1] |
| 8. | 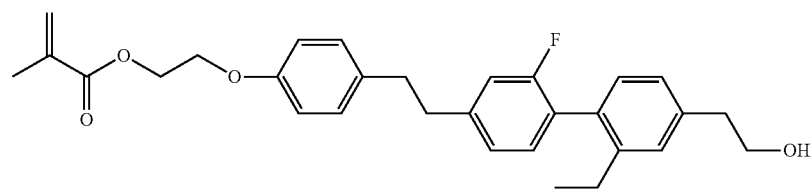 [SMILES: C=C(C)C(=O)OCCOc1ccc(CCc2ccc(-c3ccc(CCO)cc3CC)c(F)c2)cc1] |
| 9. | 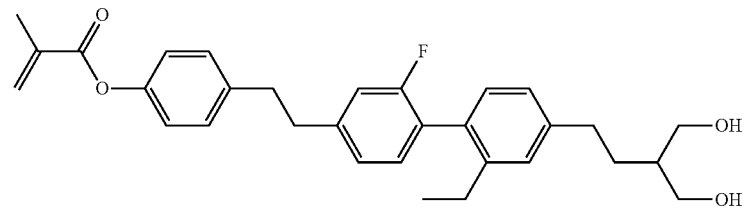 [SMILES: C=C(C)C(=O)Oc1ccc(CCc2ccc(-c3ccc(CCC(CO)CO)cc3CC)c(F)c2)cc1] |
| 10. | 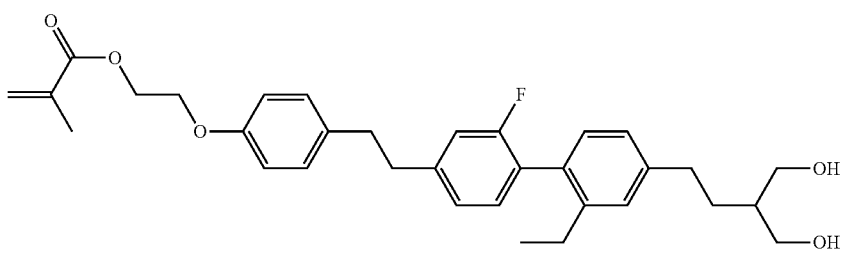 |
| 11. | 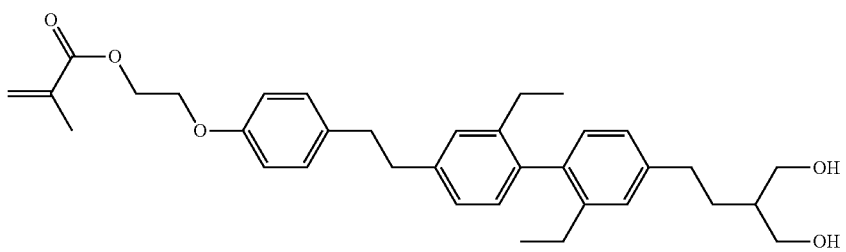 |

-continued
| No. | Structure of the example compound |
|---|---|
| 12. | 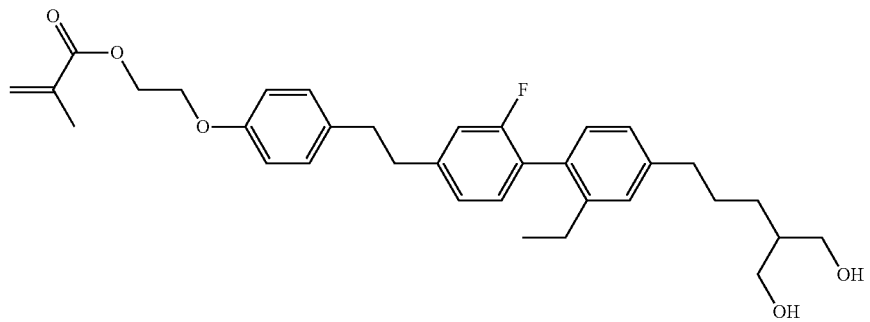 [SMILES: C=C(C)C(=O)OCCOc1ccc(CCc2ccc(-c3ccc(CCCC(CO)CO)cc3CC)c(F)c2)cc1] |
| 13. | 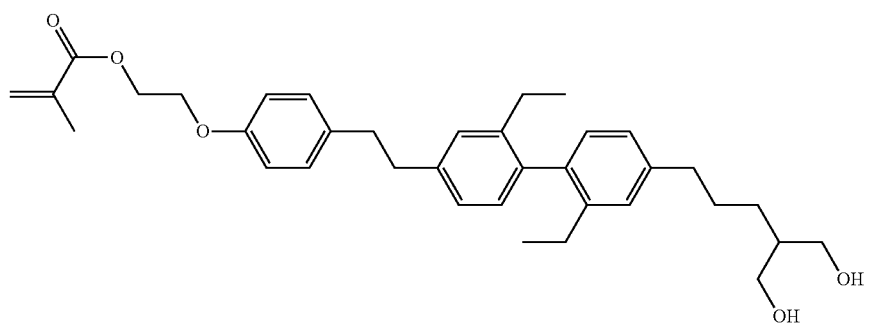 [SMILES: C=C(C)C(=O)OCCOc1ccc(CCc2ccc(-c3ccc(CCCC(CO)CO)cc3CC)c(CC)c2)cc1] |
| 14. | 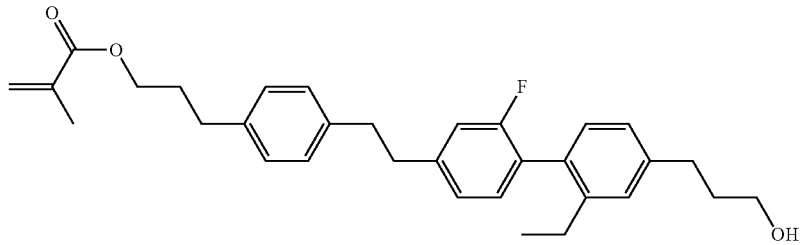 [SMILES: C=C(C)C(=O)OCCCc1ccc(CCc2ccc(-c3ccc(CCCO)cc3CC)c(F)c2)cc1] |
| 15. | 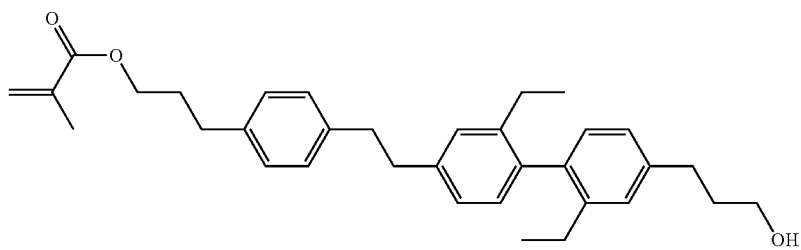 [SMILES: C=C(C)C(=O)OCCCc1ccc(CCc2ccc(-c3ccc(CCCO)cc3CC)c(CC)c2)cc1] |
| 16. | 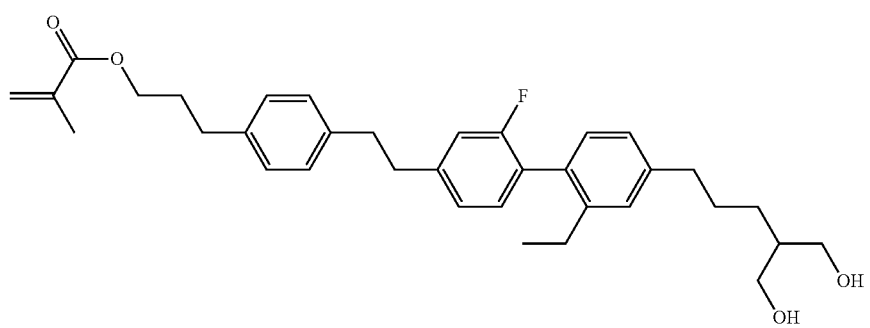 [SMILES: C=C(C)C(=O)OCCCc1ccc(CCc2ccc(-c3ccc(CCCC(CO)CO)cc3CC)c(F)c2)cc1] |

-continued
| No. | Structure of the example compound |
|---|---|
| 17. | 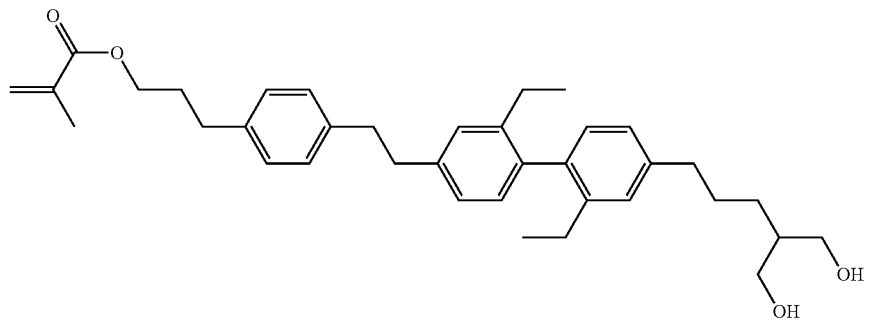 [SMILES: C=C(C)C(=O)OCCCc1ccc(CCc2ccc(-c3ccc(CCCC(CO)CO)cc3CC)c(CC)c2)cc1] |
| 18. | 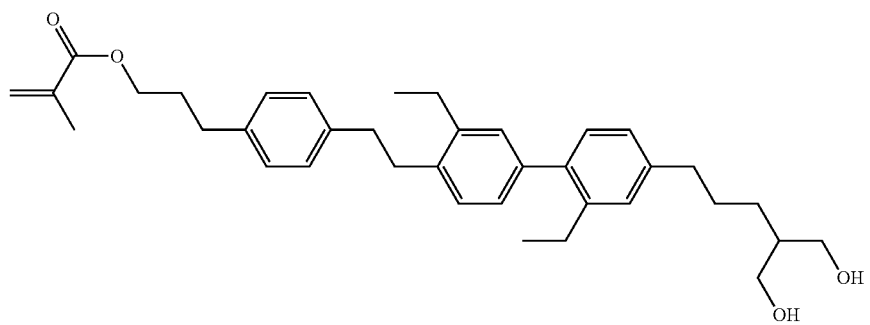 [SMILES: C=C(C)C(=O)OCCCc1ccc(CCc2ccc(-c3ccc(CCCC(CO)CO)cc3CC)cc2CC)cc1] |
| 19. | 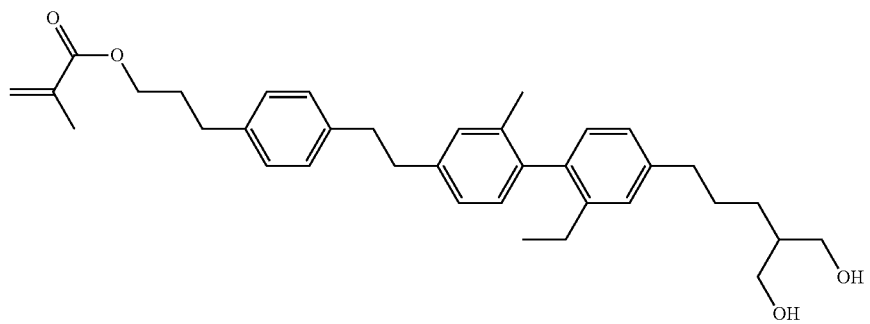 [SMILES: C=C(C)C(=O)OCCCc1ccc(CCc2ccc(-c3ccc(CCCC(CO)CO)cc3CC)c(C)c2)cc1] |
| 20. | 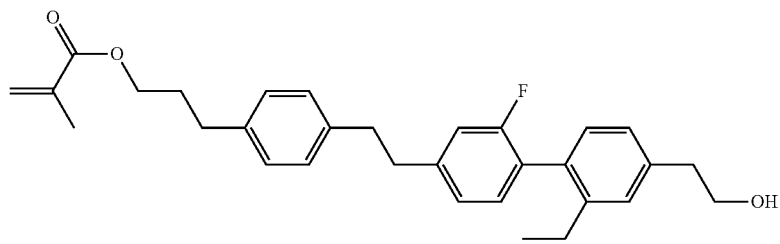 |
| 21. | 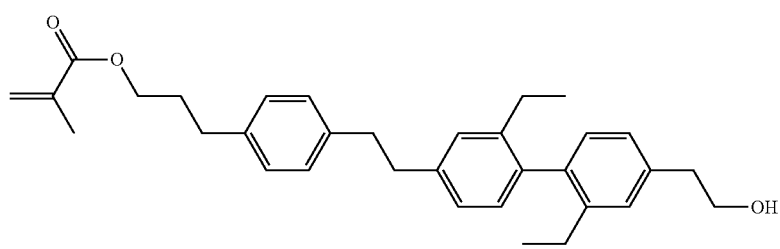 [SMILES: C=C(C)C(=O)OCCCc1ccc(CCc2ccc(-c3ccc(CCO)cc3CC)c(CC)c2)cc1] |

| No. | Structure of the example compound |
|---|---|
| 22. | 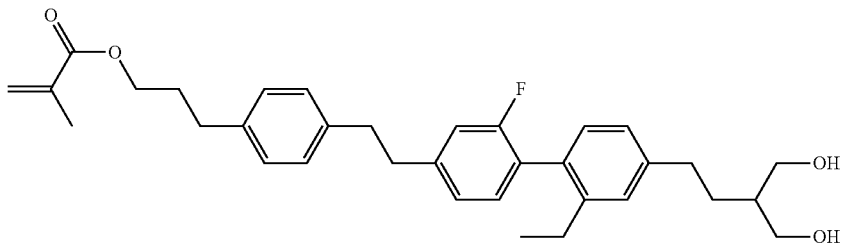 [SMILES: C=C(C)C(=O)OCCCc1ccc(CCc2ccc(-c3ccc(CCC(CO)CO)cc3CC)c(F)c2)cc1] |
| 23. | 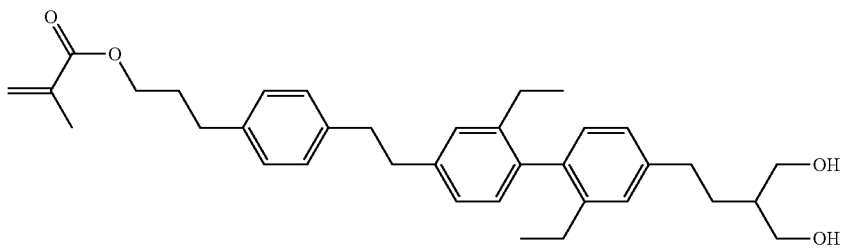 |
| 24. | 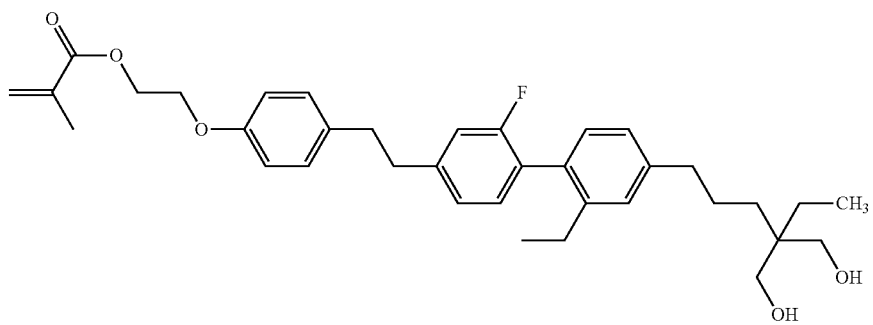 [SMILES: C=C(C)C(=O)OCCOc1ccc(CCc2ccc(-c3ccc(CCCC(CC)(CO)CO)cc3CC)c(F)c2)cc1] |
| 25. | 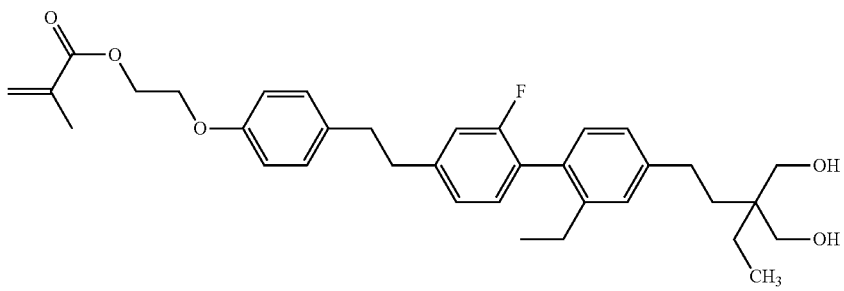 |
| 26. | 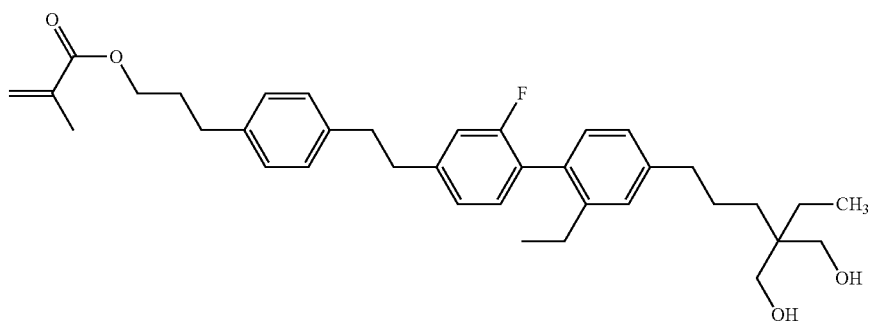 [SMILES: C=C(C)C(=O)OCCCc1ccc(CCc2ccc(-c3ccc(CCCC(CC)(CO)CO)cc3CC)c(F)c2)cc1] |

| No. | Structure of the example compound |
|---|---|
| 27. | 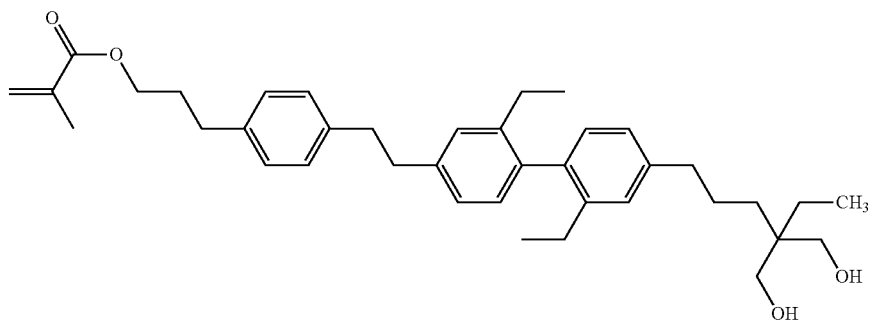 |
| 28. | 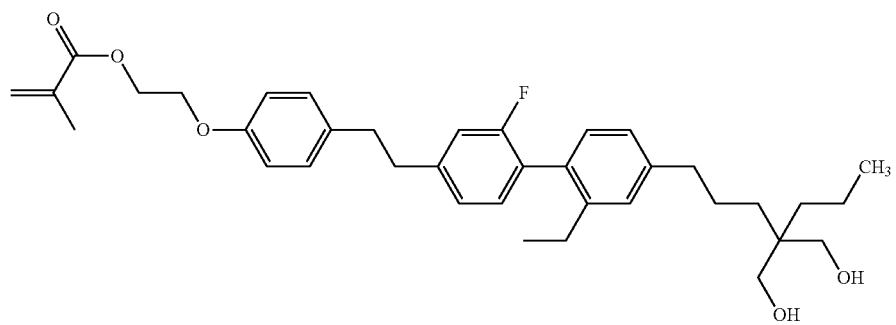 [SMILES: C=C(C)C(=O)OCCOc1ccc(CCc2ccc(-c3ccc(CCCC(CO)(CO)CCC)cc3CC)c(F)c2)cc1] |
| 29. | 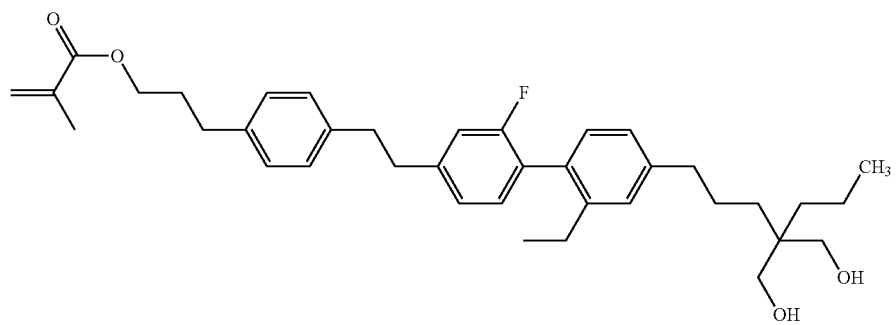 [SMILES: C=C(C)C(=O)OCCCc1ccc(CCc2ccc(-c3ccc(CCCC(CO)(CO)CCC)cc3CC)c(F)c2)cc1] |
| 30. | 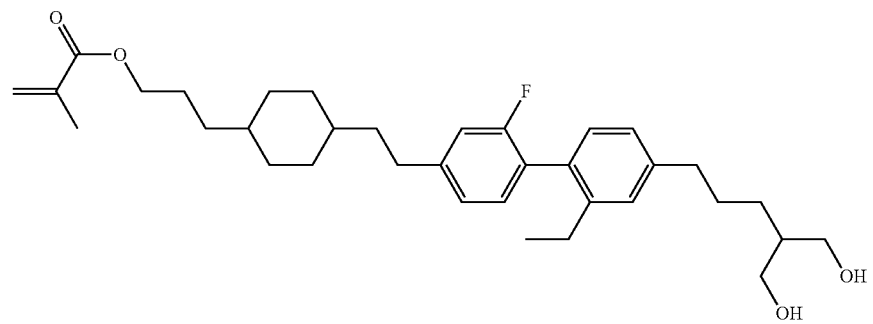 |
| 31. | 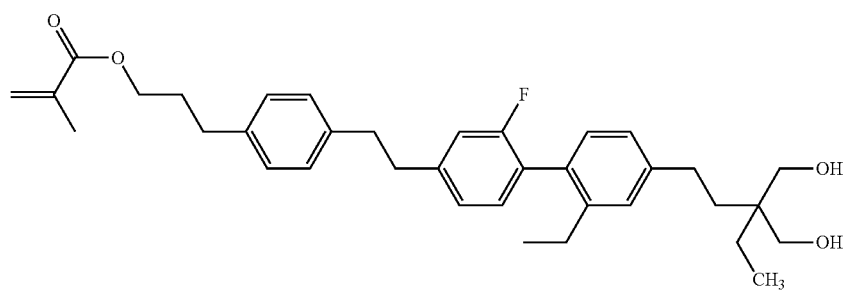 [SMILES: C=C(C)C(=O)OCCCc1ccc(CCc2ccc(-c3ccc(CCC(CC)(CO)CO)cc3CC)c(F)c2)cc1] |

| No. | Structure of the example compound |
|---|---|
| 32. | 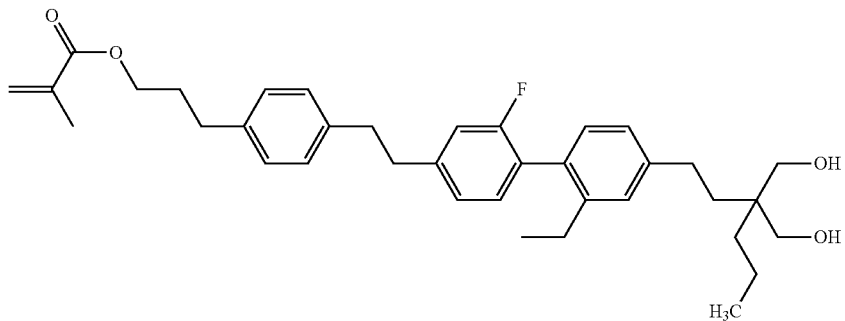 [SMILES: C=C(C)C(=O)OCCCc1ccc(CCc2ccc(-c3ccc(CCC(CO)(CO)CCC)cc3CC)c(F)c2)cc1] |
| 33. | 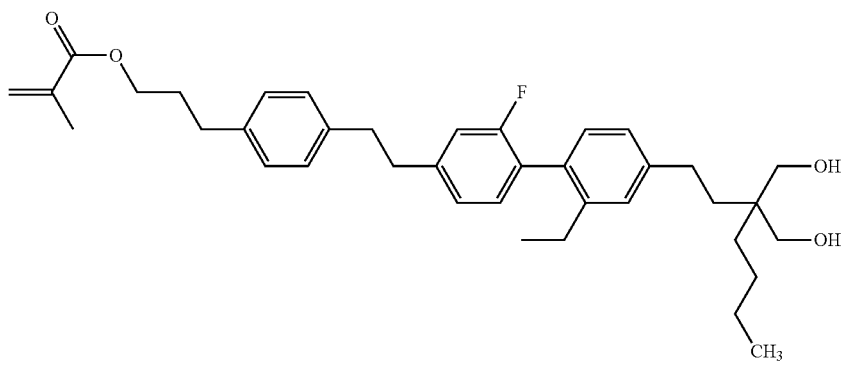 [SMILES: C=C(C)C(=O)OCCCc1ccc(CCc2ccc(-c3ccc(CCC(CO)(CO)CCCC)cc3CC)c(F)c2)cc1] |
| 34. | 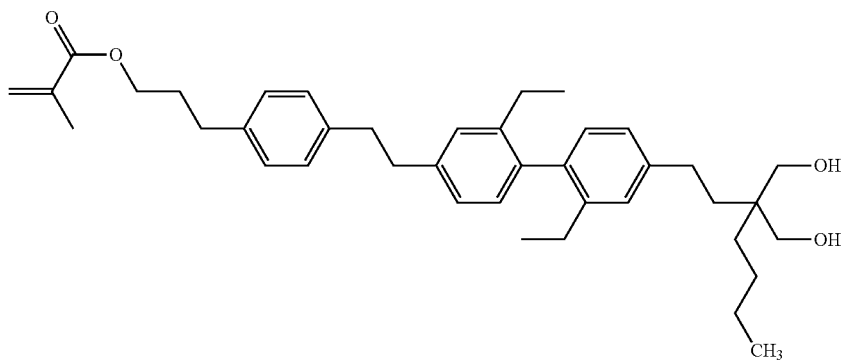 |
| 35. | 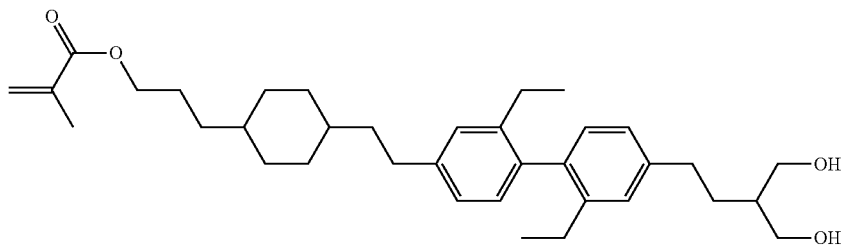 [SMILES: C=C(C)C(=O)OCCCC1CCC(CCc2ccc(-c3ccc(CCC(CO)CO)cc3CC)c(CC)c2)CC1] |
| 36. | 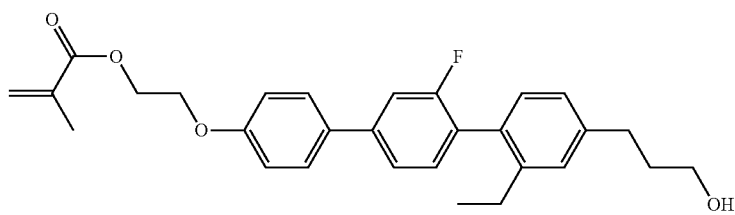 [SMILES: C=C(C)C(=O)OCCOc1ccc(-c2ccc(-c3ccc(CCCO)cc3CC)c(F)c2)cc1] |

| No. | Structure of the example compound |
|---|---|
| 37. | 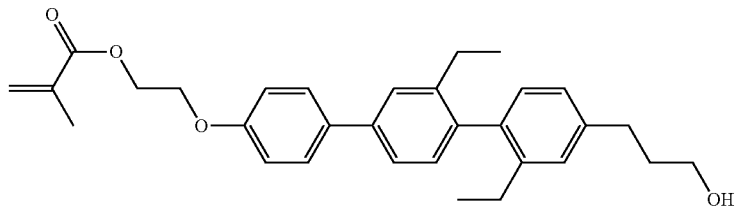 [SMILES: C=C(C)C(=O)OCCOc1ccc(-c2ccc(-c3ccc(CCCO)cc3CC)c(CC)c2)cc1] |
| 38. | 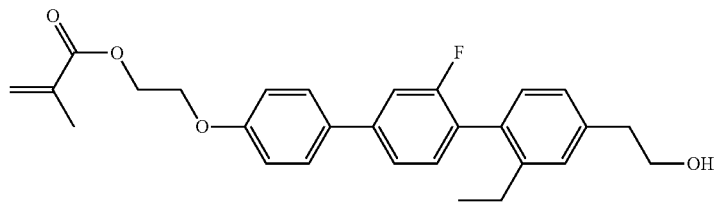 |
| 39. | 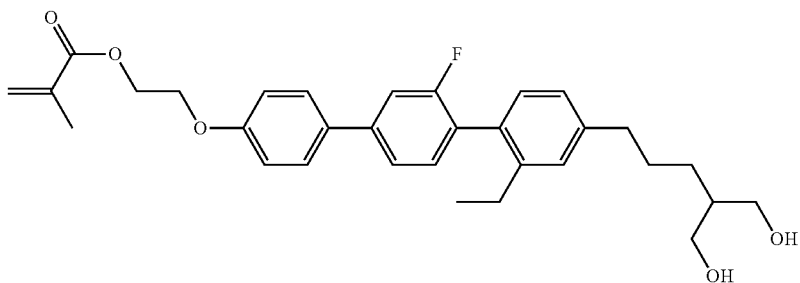 [SMILES: C=C(C)C(=O)OCCOc1ccc(-c2ccc(-c3ccc(CCCC(CO)CO)cc3CC)c(F)c2)cc1] |
| 40. | 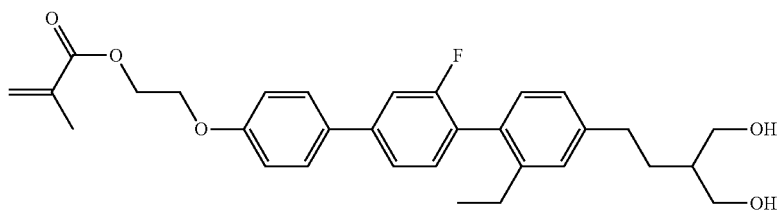 |
| 41. | 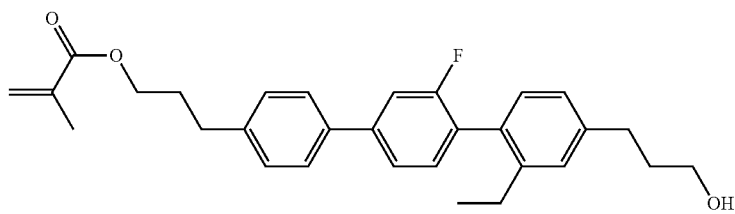 [SMILES: C=C(C)C(=O)OCCCc1ccc(-c2ccc(-c3ccc(CCCO)cc3CC)c(F)c2)cc1] |
| 42. | 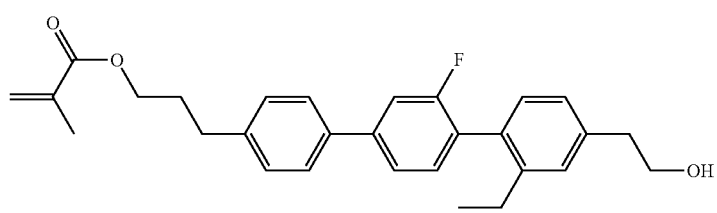 [SMILES: C=C(C)C(=O)OCCCc1ccc(-c2ccc(-c3ccc(CCO)cc3CC)c(F)c2)cc1] |

| No. | Structure of the example compound |
|---|---|
| 43. | 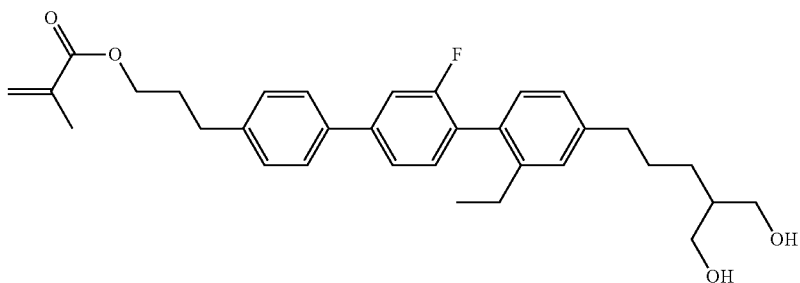 [SMILES: C=C(C)C(=O)OCCCc1ccc(-c2ccc(-c3ccc(CCCC(CO)CO)cc3CC)c(F)c2)cc1] |
| 44. | 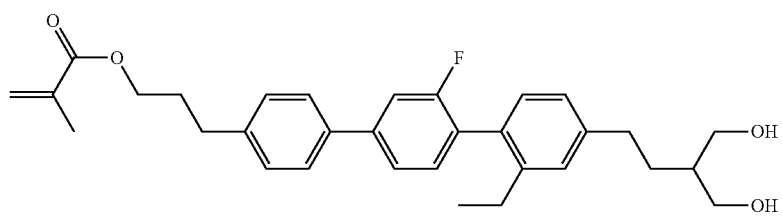 [SMILES: C=C(C)C(=O)OCCCc1ccc(-c2ccc(-c3ccc(CCC(CO)CO)cc3CC)c(F)c2)cc1] |
| 45. | 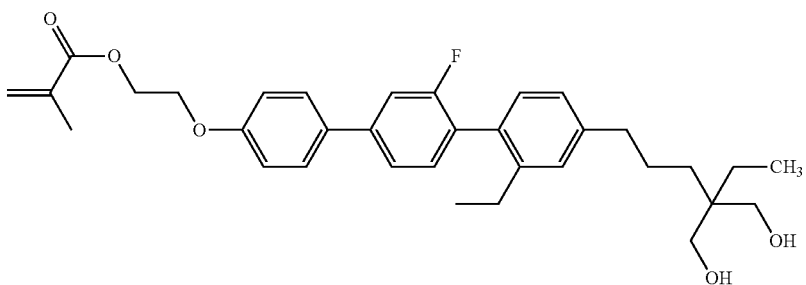 [SMILES: C=C(C)C(=O)OCCOc1ccc(-c2ccc(-c3ccc(CCCC(CC)(CO)CO)cc3CC)c(F)c2)cc1] |
| 46. | 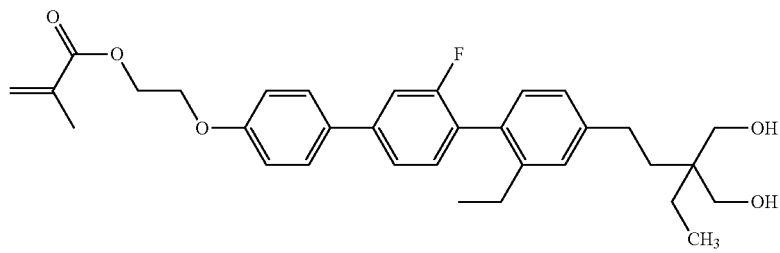 |
| 47. | 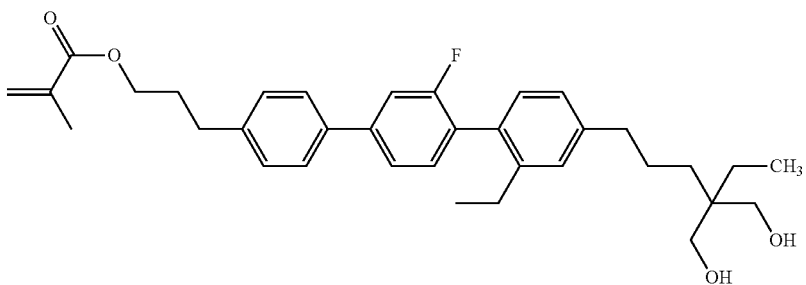 |

-continued
| No. | Structure of the example compound |
|---|---|
| 48. | 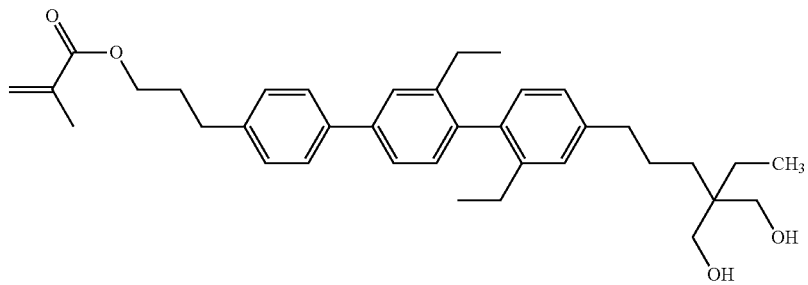 [SMILES: C=C(C)C(=O)OCCCc1ccc(-c2ccc(-c3ccc(CCCC(CC)(CO)CO)cc3CC)c(CC)c2)cc1] |
| 49. | 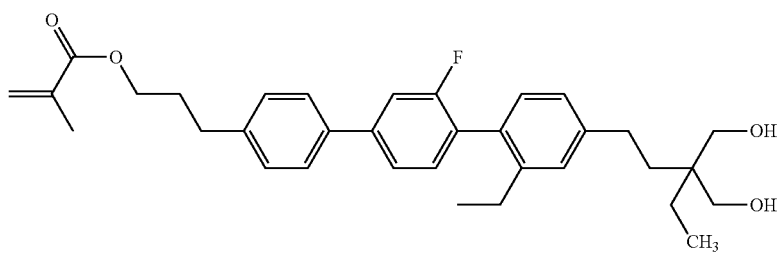 |
| 50. | 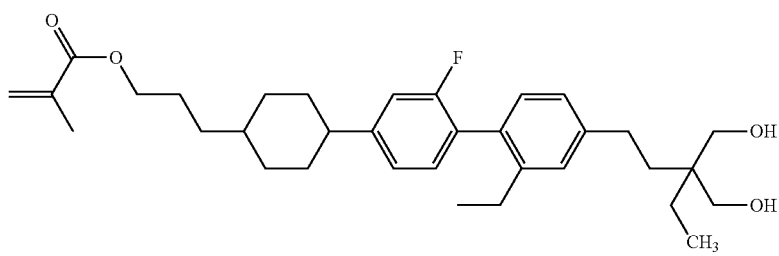 [SMILES: C=C(C)C(=O)OCCCC1CCC(c2ccc(-c3ccc(CCC(CO)(CO)CCC)cc3CC)c(F)c2)CC1] |
| 51. | 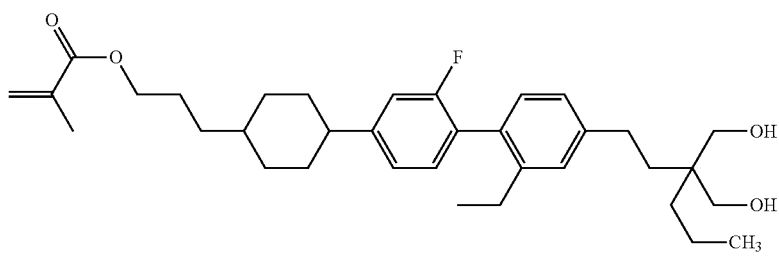 |
| 52. | 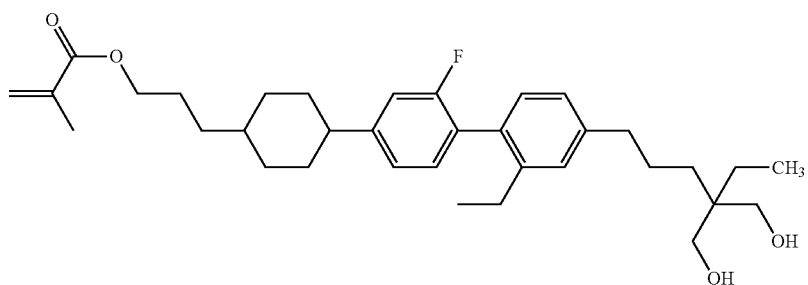 [SMILES: C=C(C)C(=O)OCCCC1CCC(c2ccc(-c3ccc(CCCC(CC)(CO)CO)cc3CC)c(F)c2)CC1] |

| No. | Structure of the example compound |
|---|---|
| 53. | 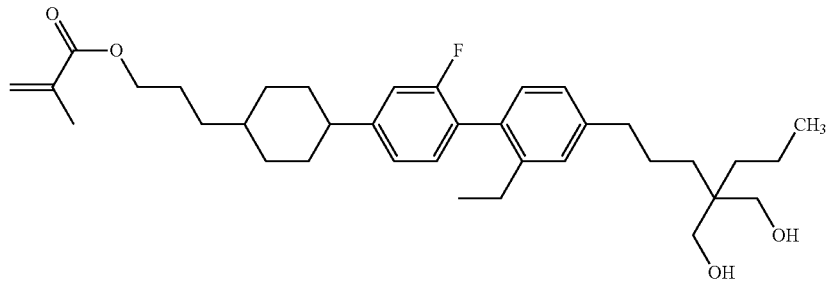 [SMILES: C=C(C)C(=O)OCCCC1CCC(c2ccc(-c3ccc(CCCC(CO)(CO)CCC)cc3CC)c(F)c2)CC1] |
| 54. | 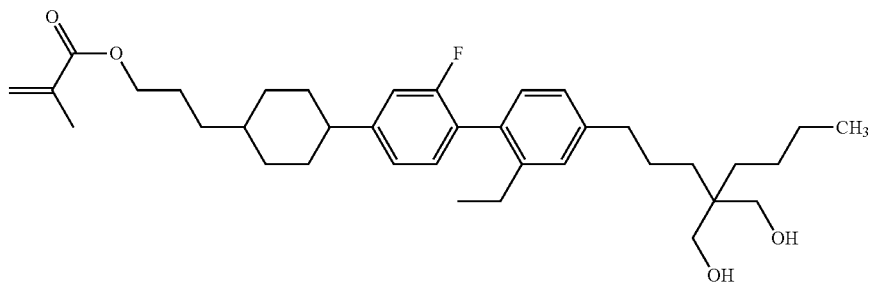 [SMILES: C=C(C)C(=O)OCCCC1CCC(c2ccc(-c3ccc(CCCC(CO)(CO)CCCC)cc3CC)c(F)c2)CC1] |
| 55. | 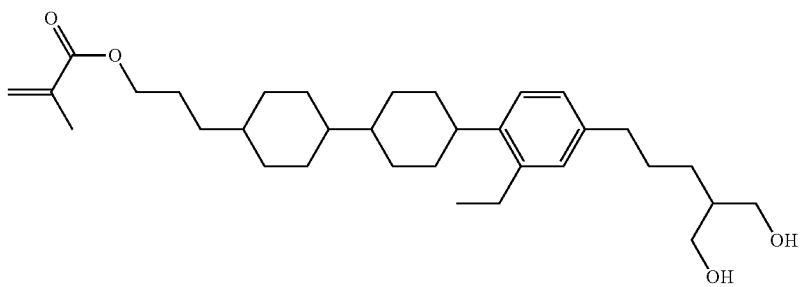 [SMILES: C=C(C)C(=O)OCCCC1CCC(C2CCC(c3ccc(CCCC(CO)CO)cc3CC)CC2)CC1] |
| 56. | 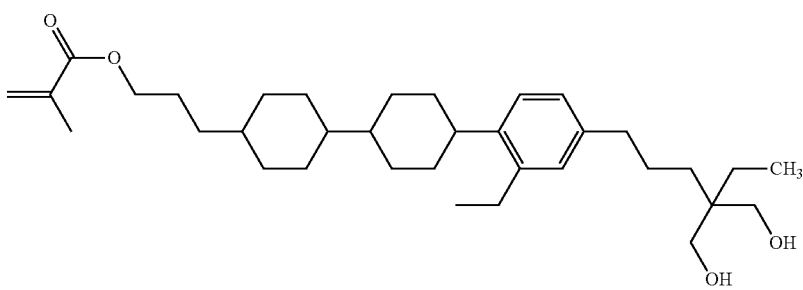 [SMILES: C=C(C)C(=O)OCCCC1CCC(C2CCC(c3ccc(CCCC(CC)(CO)CO)cc3CC)CC2)CC1] |
| 57. | 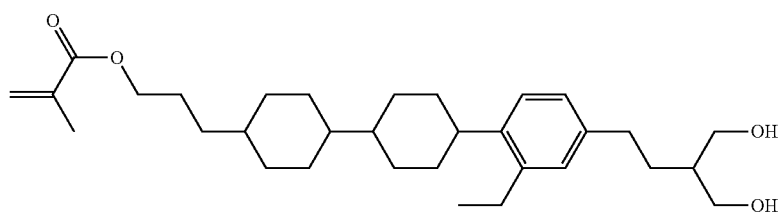 |

US 10,294,426 B2
155    156
-continued
| No. | Structure of the example compound |
|---|---|
| 58. | 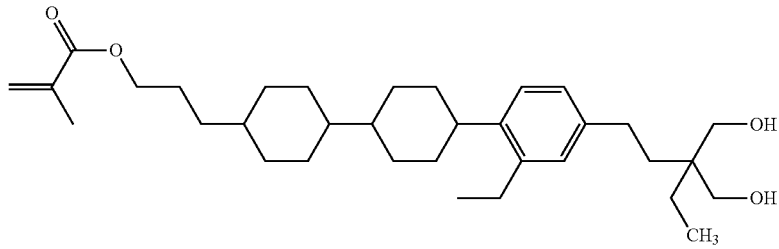 |
| 59. | 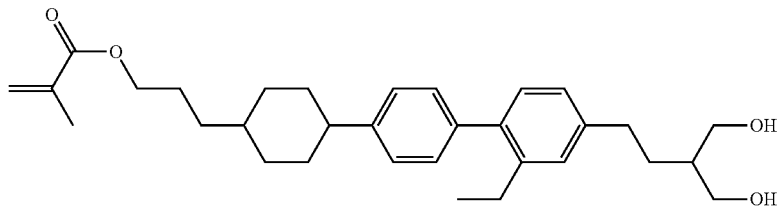 [SMILES: C=C(C)C(=O)OCCCC1CCC(c2ccc(-c3ccc(CCC(CO)CO)cc3CC)cc2)CC1] |
| 60. | 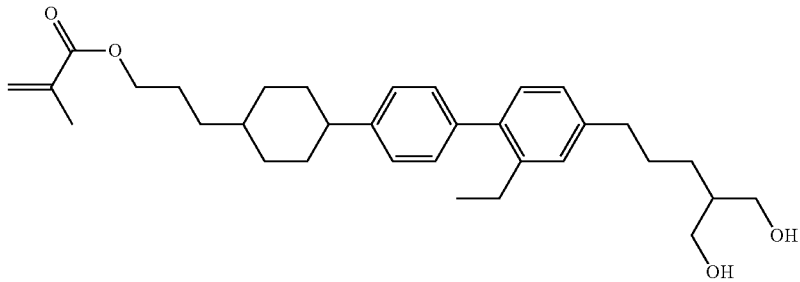 [SMILES: C=C(C)C(=O)OCCCC1CCC(c2ccc(-c3ccc(CCCC(CO)CO)cc3CC)cc2)CC1] |
| 61. | 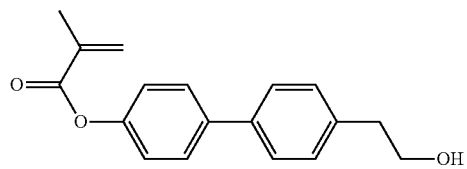 [SMILES: C=C(C)C(=O)Oc1ccc(-c2ccc(CCO)cc2)cc1] |
| 62. | 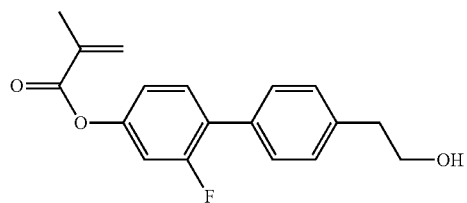 [SMILES: C=C(C)C(=O)Oc1ccc(-c2ccc(CCO)cc2)c(F)c1] |
| 63. | 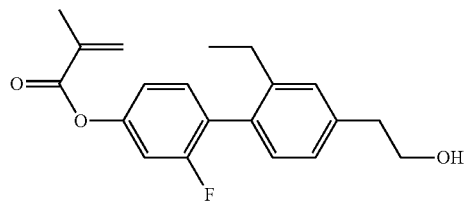 [SMILES: C=C(C)C(=O)Oc1ccc(-c2ccc(CCO)cc2CC)c(F)c1] |
| 64. | 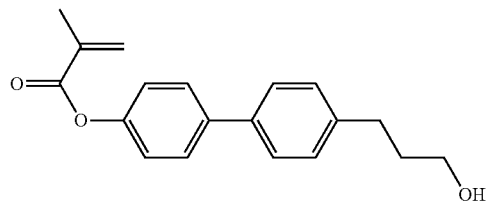 [SMILES: C=C(C)C(=O)Oc1ccc(-c2ccc(CCCO)cc2)cc1] |

| No. | Structure of the example compound |
|---|---|
| 65. | 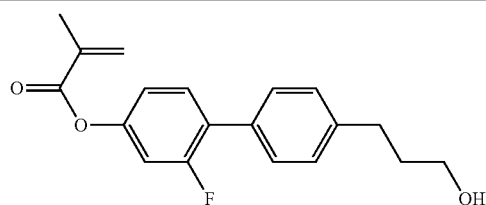 [SMILES: C=C(C)C(=O)Oc1ccc(-c2ccc(CCCO)cc2)c(F)c1] |
| 66. | 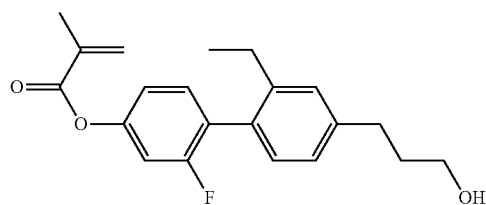 [SMILES: C=C(C)C(=O)Oc1ccc(-c2ccc(CCCO)cc2CC)c(F)c1] |
| 67. | 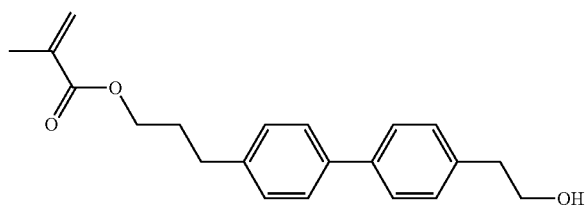 [SMILES: C=C(C)C(=O)OCCCc1ccc(-c2ccc(CCO)cc2)cc1] |
| 68. | 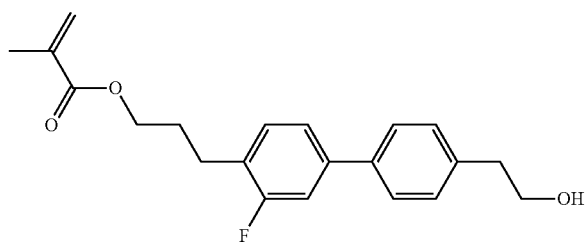 [SMILES: C=C(C)C(=O)OCCCc1ccc(-c2ccc(CCO)cc2)cc1F] |
| 69. | 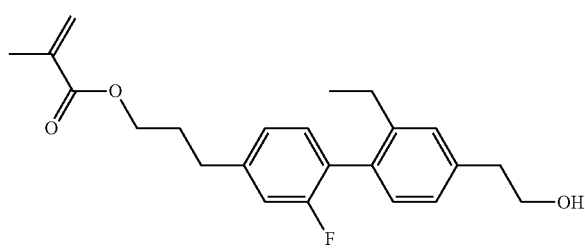 [SMILES: C=C(C)C(=O)OCCCc1ccc(-c2ccc(CCO)cc2CC)c(F)c1] |
| 70. | 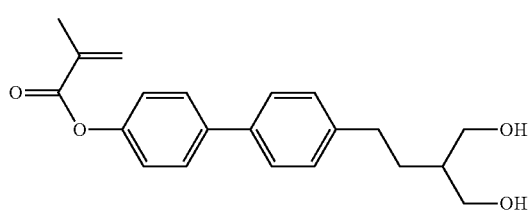 [SMILES: C=C(C)C(=O)Oc1ccc(-c2ccc(CCC(CO)CO)cc2)cc1] |
| 71. | 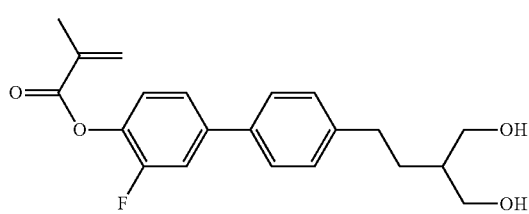 [SMILES: C=C(C)C(=O)Oc1ccc(-c2ccc(CCC(CO)CO)cc2)cc1F] |

| No. | Structure of the example compound |
|---|---|
| 72. | 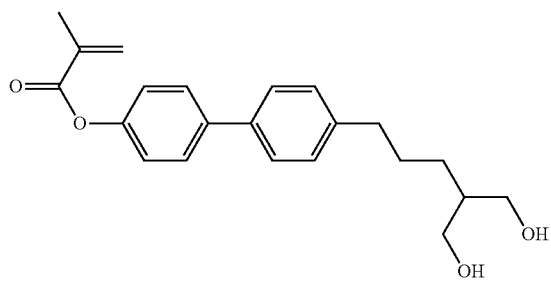 [SMILES: C=C(C)C(=O)Oc1ccc(-c2ccc(CCCC(CO)CO)cc2)cc1] |
| 73. | 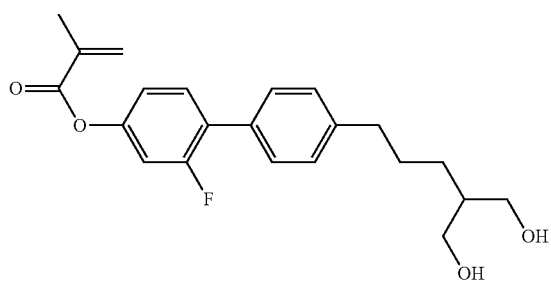 [SMILES: C=C(C)C(=O)Oc1ccc(-c2ccc(CCCC(CO)CO)cc2)c(F)c1] |
| 74. | 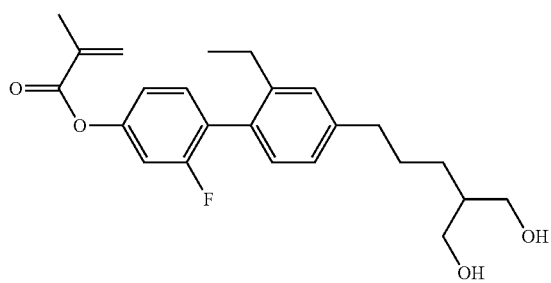 [SMILES: C=C(C)C(=O)Oc1ccc(-c2ccc(CCCC(CO)CO)cc2CC)c(F)c1] |
| 75. | 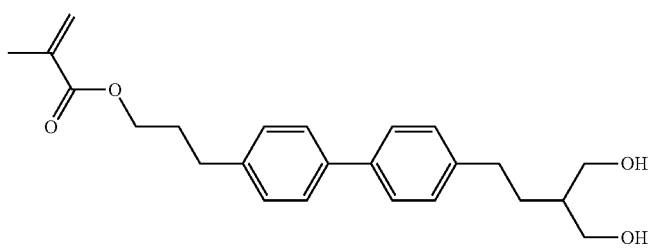 [SMILES: C=C(C)C(=O)OCCCc1ccc(-c2ccc(CCC(CO)CO)cc2)cc1] |
| 76. | 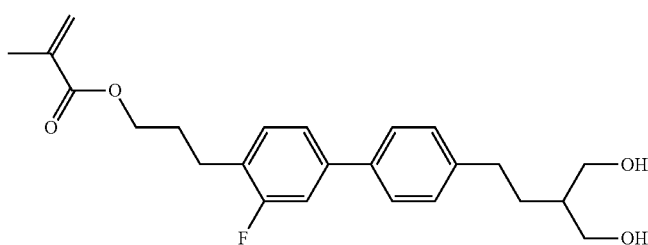 [SMILES: C=C(C)C(=O)OCCCc1ccc(-c2ccc(CCC(CO)CO)cc2)cc1F] |
| 77. | 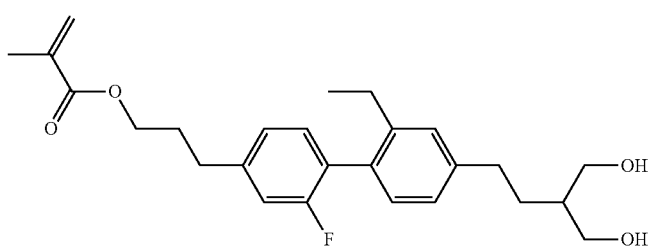 [SMILES: C=C(C)C(=O)OCCCc1ccc(-c2ccc(CCC(CO)CO)cc2CC)c(F)c1] |

| No. | Structure of the example compound |
|---|---|
| 78. | 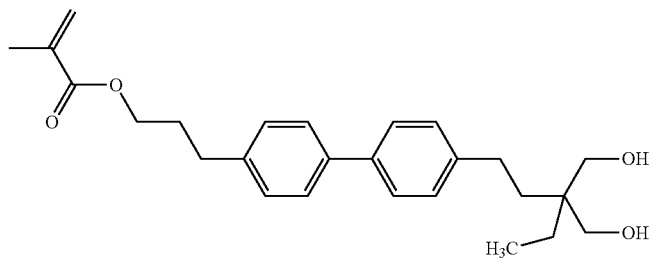 [SMILES: C=C(C)C(=O)OCCCc1ccc(-c2ccc(CCC(CC)(CO)CO)cc2)cc1] |
| 79. | 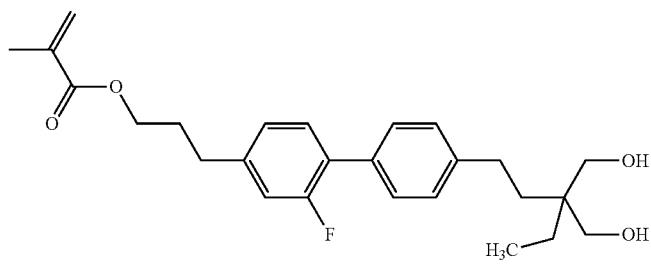 [SMILES: C=C(C)C(=O)OCCCc1ccc(-c2ccc(CCC(CC)(CO)CO)cc2)c(F)c1] |
| 80. | 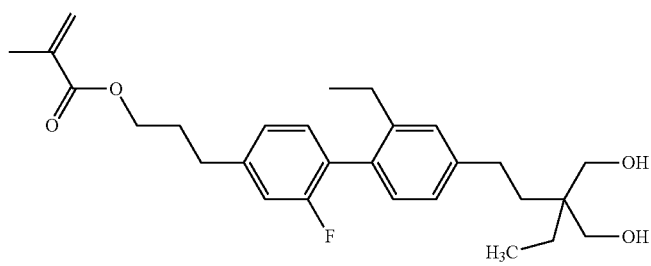 [SMILES: C=C(C)C(=O)OCCCc1ccc(-c2ccc(CCC(CC)(CO)CO)cc2CC)c(F)c1] |
| 81. | 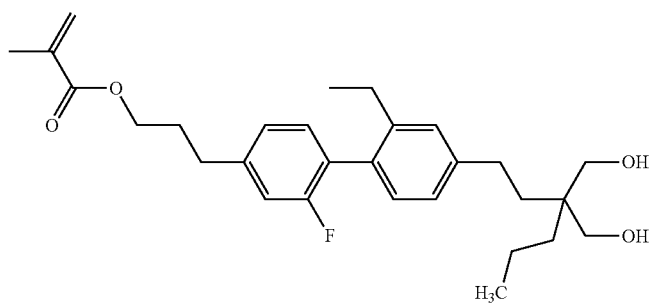 [SMILES: C=C(C)C(=O)OCCCc1ccc(-c2ccc(CCC(CO)(CO)CCC)cc2CC)c(F)c1] |
| 82. | 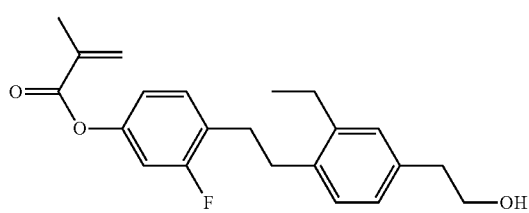 [SMILES: C=C(C)C(=O)Oc1ccc(CCc2ccc(CCO)cc2CC)c(F)c1] |
| 83. | 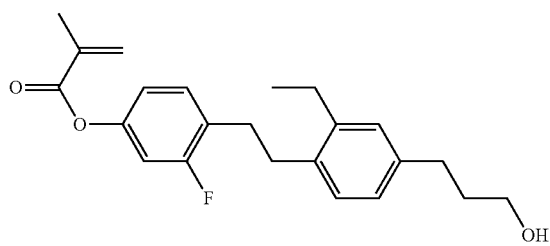 [SMILES: C=C(C)C(=O)Oc1ccc(CCc2ccc(CCCO)cc2CC)c(F)c1] |

US 10,294,426 B2
163                                                                           164
-continued
| No. | Structure of the example compound |
|---|---|
| 84. | 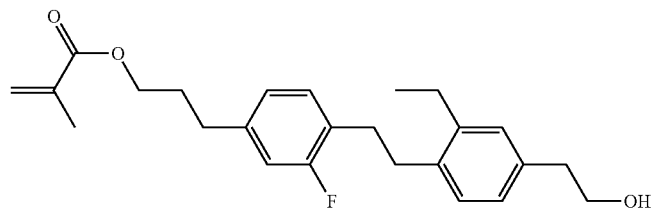 [SMILES: C=C(C)C(=O)OCCCc1ccc(CCc2ccc(CCO)cc2CC)c(F)c1] |
| 85. | 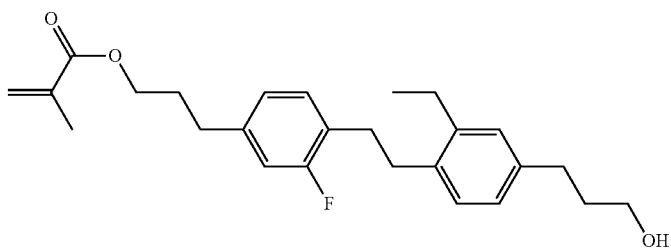 [SMILES: C=C(C)C(=O)OCCCc1ccc(CCc2ccc(CCCO)cc2CC)c(F)c1] |
| 86. | 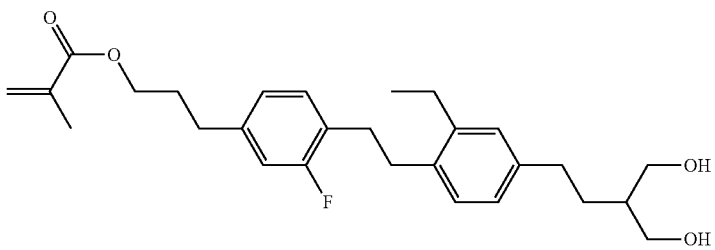 [SMILES: C=C(C)C(=O)OCCCc1ccc(CCc2ccc(CCC(CO)CO)cc2CC)c(F)c1] |
| 87. | 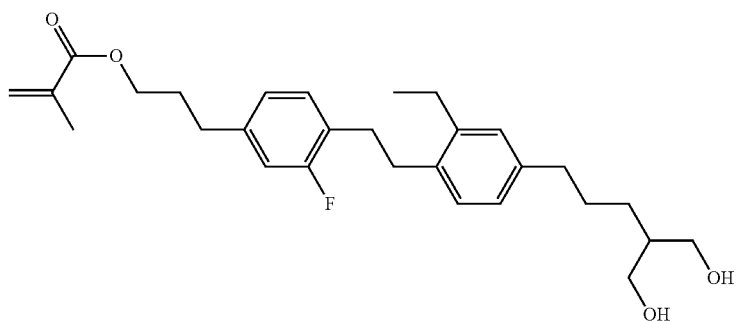 [SMILES: C=C(C)C(=O)OCCCc1ccc(CCc2ccc(CCCC(CO)CO)cc2CC)c(F)c1] |
| 88. | 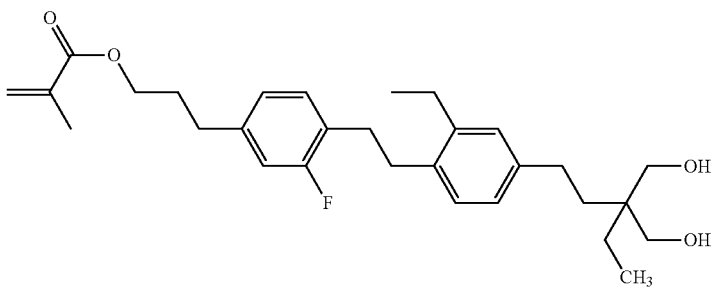 [SMILES: C=C(C)C(=O)OCCCc1ccc(CCc2ccc(CCC(CC)(CO)CO)cc2CC)c(F)c1] |

| No. | Structure of the example compound |
|---|---|
| 89. | 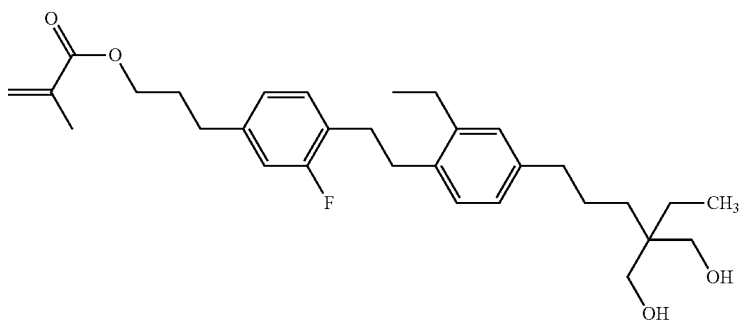 [SMILES: C=C(C)C(=O)OCCCc1ccc(CCc2ccc(CCCC(CC)(CO)CO)cc2CC)c(F)c1] |
| 90. | 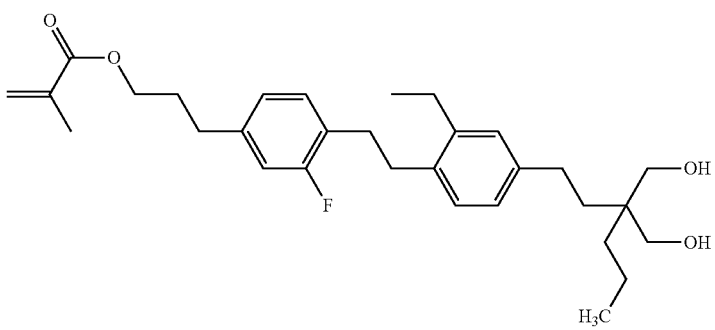 [SMILES: C=C(C)C(=O)OCCCc1ccc(CCc2ccc(CCC(CO)(CO)CCC)cc2CC)c(F)c1] |
| 91. | 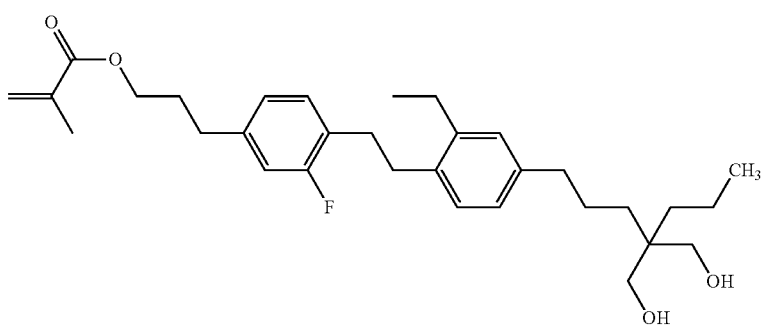 [SMILES: C=C(C)C(=O)OCCCc1ccc(CCc2ccc(CCCC(CO)(CO)CCC)cc2CC)c(F)c1] |

B) Mixture Examples

LC media according to the invention are prepared using the following liquid-crystalline mixtures consisting of low-molecular-weight components in the percentage proportions by weight indicated.

| H1: Nematic host mixture ($\Delta\varepsilon < 0$) | | | |
|---|---|---|---|
| CY-3-O2 | 15.50% | Clearing point [° C.]: | 75.1 |
| CCY-3-O3 | 8.00% | $\Delta n$ [589 nm, 20° C.]: | 0.098 |
| CCY-4-O2 | 10.00% | $\Delta\varepsilon$ [1 kHz, 20° C.]: | −3.0 |
| CPY-2-O2 | 5.50% | $\varepsilon_{\parallel}$ [1 kHz, 20° C.]: | 3.4 |
| CPY-3-O2 | 11.50% | $\varepsilon_{\perp}$ [1 kHz, 20° C.]: | 6.4 |
| CCH-34 | 9.25% | $K_1$ [pN, 20° C.]: | 13.1 |
| CCH-23 | 24.50% | $K_3$ [pN, 20° C.]: | 13.3 |
| PYP-2-3 | 8.75% | $\gamma_1$ [mPa · s, 20° C.]: | 113 |
| PCH-301 | 7.00% | $V_0$ [20° C., V]: | 2.22 |

| H2: Nematic host mixture ($\Delta\varepsilon < 0$) | | | |
|---|---|---|---|
| CY-3-O4 | 14.00% | Clearing point [° C.]: | 80.0 |
| CCY-3-O2 | 9.00% | $\Delta n$ [589 nm, 20° C.]: | 0.090 |
| CCY-3-O3 | 9.00% | $\Delta\varepsilon$ [1 kHz, 20° C.]: | −3.3 |
| CPY-2-O2 | 10.00% | $\varepsilon_{\parallel}$ [1 kHz, 20° C.]: | 3.4 |
| CPY-3-O2 | 10.00% | $\varepsilon_{\perp}$ [1 kHz, 20° C.]: | 6.7 |
| CCY-3-1 | 8.00% | $K_1$ [pN, 20° C.]: | 15.1 |
| CCH-34 | 9.00% | $K_3$ [pN, 20° C.]: | 14.6 |
| CCH-35 | 6.00% | $\gamma_1$ [mPa · s, 20° C.]: | 140 |
| PCH-53 | 10.00% | $V_0$ [20° C., V]: | 2.23 |
| CCH-301 | 6.00% | | |
| CCH-303 | 9.00% | | |

| H3: Nematic host mixture ($\Delta\varepsilon < 0$) | | | |
|---|---|---|---|
| CC-3-V1 | 9.00% | Clearing point [° C.]: | 74.7 |
| CCH-23 | 18.00% | $\Delta n$ [589 nm, 20° C.]: | 0.098 |
| CCH-34 | 3.00% | $\Delta\varepsilon$ [1 kHz, 20° C.]: | −3.4 |
| CCH-35 | 7.00% | $\varepsilon_{\parallel}$ [1 kHz, 20° C.]: | 3.5 |
| CCP-3-1 | 5.50% | $\varepsilon_{\perp}$ [1 kHz, 20° C.]: | 6.9 |
| CCY-3-O2 | 11.50% | $K_1$ [pN, 20° C.]: | 14.9 |
| CPY-2-O2 | 8.00% | $K_3$ [pN, 20° C.]: | 15.9 |

-continued

H3: Nematic host mixture ($\Delta\varepsilon < 0$)

| | | | |
|---|---|---|---|
| CPY-3-O2 | 11.00% | $\gamma_1$ [mPa · s, 20° C.]: | 108 |
| CY-3-O2 | 15.50% | $V_0$ [20° C., V]: | 2.28 |
| PY-3-O2 | 11.50% | | |

H4: Nematic host mixture ($\Delta\varepsilon < 0$)

| | | | |
|---|---|---|---|
| CC-3-V | 37.50% | Clearing point [° C.]: | 74.8 |
| CC-3-V1 | 2.00% | $\Delta n$ [589 nm, 20° C.]: | 0.099 |
| CCY-4-O2 | 14.50% | $\Delta\varepsilon$ [1 kHz, 20° C.]: | −2.9 |
| CPY-2-O2 | 10.50% | $\varepsilon_\parallel$ [1 kHz, 20° C.]: | 3.7 |
| CPY-3-O2 | 9.50% | $\varepsilon_\perp$ [1 kHz, 20° C.]: | 6.6 |
| CY-3-O2 | 15.00% | $K_1$ [pN, 20° C.]: | 12.2 |
| CY-3-O4 | 4.50% | $K_3$ [pN, 20° C.]: | 13.4 |
| PYP-2-4 | 5.50% | $\gamma_1$ [mPa · s, 20° C.]: | 92 |
| PPGU-3-F | 1.00% | $V_0$ [20° C., V]: | 2.28 |

H5: Nematic host mixture ($\Delta\varepsilon < 0$)

| | | | |
|---|---|---|---|
| CCH-23 | 20.00% | Clearing point [° C.]: | 74.8 |
| CCH-301 | 6.00% | $\Delta n$ [589 nm, 20° C.]: | 0.105 |
| CCH-34 | 6.00% | $\Delta\varepsilon$ [1 kHz, 20° C.]: | −3.2 |
| CCP-3-1 | 3.00% | $\varepsilon_\parallel$ [1 kHz, 20° C.]: | 3.5 |
| CCY-3-O2 | 11.00% | $\varepsilon_\perp$ [1 kHz, 20° C.]: | 6.8 |
| CPY-2-O2 | 12.00% | $K_1$ [pN, 20° C.]: | 12.7 |
| CPY-3-O2 | 11.00% | $K_3$ [pN, 20° C.]: | 13.6 |
| CY-3-O2 | 14.00% | $\gamma_1$ [mPa · s, 20° C.]: | 120 |
| CY-3-O4 | 4.00% | $V_0$ [20° C., V]: | 2.16 |
| PCH-301 | 4.00% | | |
| PYP-2-3 | 9.00% | | |

H6: Nematic host mixture ($\Delta\varepsilon < 0$)

| | | | |
|---|---|---|---|
| CC-4-V | 17.00% | Clearing point [° C.]: | 106.1 |
| CCP-V-1 | 15.00% | $\Delta n$ [589 nm, 20° C.]: | 0.120 |
| CCPC-33 | 2.50% | $\Delta\varepsilon$ [1 kHz, 20° C.]: | −3.6 |
| CCY-3-O2 | 4.00% | $\varepsilon_\parallel$ [1 kHz, 20° C.]: | 3.5 |
| CCY-3-O3 | 5.00% | $\varepsilon_\perp$ [1 kHz, 20° C.]: | 7.0 |
| CCY-4-O2 | 5.00% | $K_1$ [pN, 20° C.]: | 16.8 |
| CLY-3-O2 | 3.50% | $K_3$ [pN, 20° C.]: | 17.3 |
| CLY-3-O3 | 2.00% | $\gamma_1$ [mPa · s, 20° C.]: | 207 |
| CPY-2-O2 | 8.00% | $V_0$ [20° C., V]: | 2.33 |
| CPY-3-O2 | 10.00% | | |
| CY-3-O4 | 17.00% | | |
| PYP-2-3 | 11.00% | | |

H7: Nematic host mixture ($\Delta\varepsilon < 0$)

| | | | |
|---|---|---|---|
| CY-3-O2 | 15.00% | Clearing point [° C.]: | 75.5 |
| CCY-4-O2 | 9.50% | $\Delta n$ [589 nm, 20° C.]: | 0.108 |
| CCY-5-O2 | 5.00% | $\Delta\varepsilon$ [1 kHz, 20° C.]: | −3.0 |
| CPY-2-O2 | 9.00% | $\varepsilon_\parallel$ [1 kHz, 20° C.]: | 3.5 |
| CPY-3-O2 | 9.00% | $\varepsilon_\perp$ [1 kHz, 20° C.]: | 6.5 |
| CCH-34 | 9.00% | $K_1$ [pN, 20° C.]: | 12.9 |
| CCH-23 | 22.00% | $K_3$ [pN, 20° C.]: | 13.0 |
| PYP-2-3 | 7.00% | $\gamma_1$ [mPa · s, 20° C.]: | 115 |
| PYP-2-4 | 7.50% | $V_0$ [20° C., V]: | 2.20 |
| PCH-301 | 7.00% | | |

H8: Nematic host mixture ($\Delta\varepsilon < 0$)

| | | | |
|---|---|---|---|
| CY-3-O2 | 15.00% | Clearing point [° C.]: | 74.7 |
| CY-5-O2 | 6.50% | $\Delta n$ [589 nm, 20° C.]: | 0.108 |
| CCY-3-O2 | 11.00% | $\Delta\varepsilon$ [1 kHz, 20° C.]: | −3.0 |
| CPY-2-O2 | 5.50% | $\varepsilon_\parallel$ [1 kHz, 20° C.]: | 3.6 |
| CPY-3-O2 | 10.50% | $\varepsilon_\perp$ [1 kHz, 20° C.]: | 6.6 |
| CC-3-V | 28.50% | $K_1$ [pN, 20° C.]: | 12.9 |
| CC-3-V1 | 10.00% | $K_3$ [pN, 20° C.]: | 15.7 |
| PYP-2-3 | 12.50% | $\gamma_1$ [mPa · s, 20° C.]: | 97 |
| PPGU-3-F | 0.50% | $V_0$ [20° C., V]: | 2.42 |

H9: Nematic host mixture ($\Delta\varepsilon < 0$)

| | | | |
|---|---|---|---|
| CCH-35 | 9.50% | Clearing point [° C.]: | 79.1 |
| CCH-501 | 5.00% | $\Delta n$ [589 nm, 20° C.]: | 0.091 |
| CCY-2-1 | 9.50% | $\Delta\varepsilon$ [1 kHz, 20° C.]: | −3.6 |
| CCY-3-1 | 10.50% | $\varepsilon_\parallel$ [1 kHz, 20° C.]: | 3.5 |
| CCY-3-O2 | 10.50% | $\varepsilon_\perp$ [1 kHz, 20° C.]: | 7.1 |
| CCY-5-O2 | 9.50% | $K_1$ [pN, 20° C.]: | 14.6 |
| CPY-2-O2 | 12.00% | $K_3$ [pN, 20° C.]: | 14.5 |
| CY-3-O4 | 9.00% | $\gamma_1$ [mPa · s, 20° C.]: | 178 |
| CY-5-O4 | 11.00% | $V_0$ [20° C., V]: | 2.12 |
| PCH-53 | 13.50% | | |

H10: Nematic host mixture ($\Delta\varepsilon < 0$)

| | | | |
|---|---|---|---|
| BCH-32 | 4.00% | Clearing point [° C.]: | 74.8 |
| CC-3-V1 | 8.00% | $\Delta n$ [589 nm, 20° C.]: | 0.106 |
| CCH-23 | 13.00% | $\Delta\varepsilon$ [1 kHz, 20° C.]: | −3.5 |
| CCH-34 | 7.00% | $\varepsilon_\parallel$ [1 kHz, 20° C.]: | 3.6 |
| CCH-35 | 7.00% | $\varepsilon_\perp$ [1 kHz, 20° C.]: | 7.1 |
| CCY-3-O2 | 13.00% | $K_1$ [pN, 20° C.]: | 14.8 |
| CPY-2-O2 | 7.00% | $K_3$ [pN, 20° C.]: | 15.8 |
| CPY-3-O2 | 12.00% | $\gamma_1$ [mPa · s, 20° C.]: | 115 |
| CY-3-O2 | 12.00% | $V_0$ [20° C., V]: | 2.23 |
| PCH-301 | 2.00% | | |
| PY-3-O2 | 15.00% | | |

H11: Nematic host mixture ($\Delta\varepsilon < 0$)

| | | | |
|---|---|---|---|
| CY-3-O4 | 22.00% | Clearing point [° C.]: | 86.9 |
| CY-5-O4 | 12.00% | $\Delta n$ [589 nm, 20° C.]: | 0.111 |
| CCY-3-O2 | 6.00% | $\Delta\varepsilon$ [1 kHz, 20° C.]: | −4.9 |
| CCY-3-O3 | 6.00% | $\varepsilon_\parallel$ [1 kHz, 20° C.]: | 3.8 |
| CCY-4-O2 | 6.00% | $\varepsilon_\perp$ [1 kHz, 20° C.]: | 8.7 |
| CPY-2-O2 | 10.00% | $K_1$ [pN, 20° C.]: | 14.9 |
| CPY-3-O2 | 10.00% | $K_3$ [pN, 20° C.]: | 15.9 |
| PYP-2-3 | 7.00% | $\gamma_1$ [mPa · s, 20° C.]: | 222 |
| CC-3-V1 | 7.00% | $V_0$ [20° C., V]: | 1.91 |
| CC-5-V | 10.00% | | |
| CCPC-33 | 2.00% | | |
| CCPC-35 | 2.00% | | |

H12: Nematic host mixture ($\Delta\varepsilon < 0$)

| | | | |
|---|---|---|---|
| CY-3-O4 | 12.00% | Clearing point [° C.]: | 86.0 |
| CY-5-O2 | 10.00% | $\Delta n$ [589 nm, 20° C.]: | 0.110 |
| CY-5-O4 | 8.00% | $\Delta\varepsilon$ [1 kHz, 20° C.]: | −5.0 |
| CCY-3-O2 | 8.00% | $\varepsilon_\parallel$ [1 kHz, 20° C.]: | 3.8 |
| CCY-4-O2 | 7.00% | $\varepsilon_\perp$ [1 kHz, 20° C.]: | 8.8 |

-continued

H12: Nematic host mixture (Δε < 0)

| | | | |
|---|---|---|---|
| CCY-5-O2 | 6.00% | $K_1$ [pN, 20° C.]: | 14.7 |
| CCY-2-1 | 8.00% | $K_3$ [pN, 20° C.]: | 16.0 |
| CCY-3-1 | 7.00% | $\gamma_1$ [mPa · s, 20° C.]: | 250 |
| CPY-3-O2 | 9.00% | $V_0$ [20° C., V]: | 1.90 |
| CPY-3-O2 | 9.00% | | |
| BCH-32 | 6.00% | | |
| PCH-53 | 10.00% | | |

H13: Nematic host mixture (Δε < 0)

| | | | |
|---|---|---|---|
| CC-3-V1 | 10.25% | Clearing point [° C.]: | 74.7 |
| CCH-23 | 18.50% | Δn [589 nm, 20° C.]: | 0.103 |
| CCH-35 | 6.75% | Δε [1 kHz, 20° C.]: | −3.1 |
| CCP-3-1 | 6.00% | $\varepsilon_\parallel$ [1 kHz, 20° C.]: | 3.4 |
| CCY-3-1 | 2.50% | $\varepsilon_\perp$ [1 kHz, 20° C.]: | 6.4 |
| CCY-3-O2 | 12.00% | $K_1$ [pN, 20° C.]: | 15.4 |
| CPY-2-O2 | 6.00% | $K_3$ [pN, 20° C.]: | 16.8 |
| CPY-3-O2 | 9.75% | $\gamma_1$ [mPa · s, 20° C.]: | 104 |
| CY-3-O2 | 11.50% | $V_0$ [20° C., V]: | 2.46 |
| PP-1-2V1 | 3.75% | | |
| PY-3-O2 | 13.00% | | |

H14: Nematic host mixture (Δε < 0)

| | | | |
|---|---|---|---|
| CC-3-V | 27.50% | Clearing point [° C.]: | 74.7 |
| CC-3-V1 | 10.00% | Δn [589 nm, 20° C.]: | 0.104 |
| CCH-35 | 8.00% | Δε [1 kHz, 20° C.]: | −3.0 |
| CCY-3-O2 | 9.25% | $\varepsilon_\parallel$ [1 kHz, 20° C.]: | 3.4 |
| CLY-3-O2 | 10.00% | $\varepsilon_\perp$ [1 kHz, 20° C.]: | 6.4 |
| CPY-3-O2 | 11.75% | $K_1$ [pN, 20° C.]: | 15.3 |
| PY-3-O2 | 14.00% | $K_3$ [pN, 20° C.]: | 16.2 |
| PY-4-O2 | 9.00% | $\gamma_1$ [mPa · s, 20° C.]: | 88 |
| PYP-2-4 | 0.50% | $V_0$ [20° C., V]: | 2.44 |

H15: Nematic host mixture (Δε < 0)

| | | | |
|---|---|---|---|
| CC-4-V | 10.00% | Clearing point [° C.]: | 77.0 |
| CC-5-V | 13.50% | Δn [589 nm, 20° C.]: | 0.113 |
| PGU-3-F | 6.50% | Δε [1 kHz, 20° C.]: | 19.2 |
| ACQU-2-F | 10.00% | $\varepsilon_\parallel$ [1 kHz, 20° C.]: | 23.8 |
| ACQU-3-F | 12.00% | $\varepsilon_\perp$ [1 kHz, 20° C.]: | 4.6 |
| PUQU-3-F | 11.00% | $K_1$ [pN, 20° C.]: | 11.5 |
| CCP-V-1 | 12.00% | $K_3$ [pN, 20° C.]: | 11.1 |
| APUQU-2-F | 6.00% | $\gamma_1$ [mPa · s, 20° C.]: | 122 |
| APUQU-3-F | 7.00% | $V_0$ [20° C., V]: | 0.81 |
| PGUQU-3-F | 8.00% | | |
| CPGU-3-OT | 4.00% | | |

H16: Nematic host mixture (Δε < 0)

| | | | |
|---|---|---|---|
| PGU-2-F | 3.50% | Clearing point [° C.]: | 77.0 |
| PGU-3-F | 7.00% | Δn [589 nm, 20° C.]: | 0.105 |
| CC-3-V1 | 15.00% | Δε [1 kHz, 20° C.]: | 7.2 |
| CC-4-V | 18.00% | $\varepsilon_\parallel$ [1 kHz, 20° C.]: | 10.3 |
| CC-5-V | 20.00% | $\varepsilon_\perp$ [1 kHz, 20° C.]: | 3.1 |
| CCP-V-1 | 6.00% | $K_1$ [pN, 20° C.]: | 15.3 |
| APUQU-3-F | 15.00% | $K_3$ [pN, 20° C.]: | 13.5 |
| PUQU-3-F | 5.50% | $\gamma_1$ [mPa · s, 20° C.]: | 63 |
| PGP-2-4 | 3.00% | $V_0$ [20° C., V]: | 1.53 |
| BCH-32 | 7.00% | | |

H17: Nematic host mixture (Δε < 0)

| | | | |
|---|---|---|---|
| APUQU-2-F | 6.00% | Clearing point [° C.]: | 74.0 |
| APUQU-3-F | 12.00% | Δn [589 nm, 20° C.]: | 0.120 |
| PUQU-3-F | 18.00% | Δε [1 kHz, 20° C.]: | 17.4 |
| CPGU-3-OT | 9.00% | $\varepsilon_\parallel$ [1 kHz, 20° C.]: | 22.0 |
| CCGU-3-F | 3.00% | $\varepsilon_\perp$ [1 kHz, 20° C.]: | 4.5 |
| BCH-3F.F.F | 14.00% | $K_1$ [pN, 20° C.]: | 10.1 |
| CCQU-3-F | 10.00% | $K_3$ [pN, 20° C.]: | 10.8 |
| CC-3-V | 25.00% | $\gamma_1$ [mPa · s, 20° C.]: | 111 |
| PGP-2-2V | 3.00% | $V_0$ [20° C., V]: | 0.80 |

H18: Nematic host mixture (Δε < 0)

| | | | |
|---|---|---|---|
| PUQU-3-F | 15.00% | Clearing point [° C.]: | 74.3 |
| APUQU-2-F | 5.00% | Δn [589 nm, 20° C.]: | 0.120 |
| APUQU-3-F | 12.00% | Δε [1 kHz, 20° C.]: | 14.9 |
| CCQU-3-F | 11.00% | $\varepsilon_\parallel$ [1 kHz, 20° C.]: | 19.1 |
| CCQU-5-F | 1.50% | $\varepsilon_\perp$ [1 kHz, 20° C.]: | 4.3 |
| CPGU-3-OT | 5.00% | $K_1$ [pN, 20° C.]: | 11.2 |
| CCP-30CF3 | 4.50% | $K_3$ [pN, 20° C.]: | 10.8 |
| CGU-3-F | 10.00% | $\gamma_1$ [mPa · s, 20° C.]: | 98 |
| PGP-2-3 | 1.50% | $V_0$ [20° C., V]: | 0.91 |
| PGP-2-2V | 8.00% | | |
| CC-3-V | 26.50% | | |

H19: Nematic host mixture (Δε < 0)

| | | | |
|---|---|---|---|
| CCQU-3-F | 9.00% | Clearing point [° C.]: | 94.5 |
| CCQU-5-F | 9.00% | Δn [589 nm, 20° C.]: | 0.121 |
| PUQU-3-F | 16.00% | Δε [1 kHz, 20° C.]: | 20.4 |
| APUQU-2-F | 8.00% | $\varepsilon_\parallel$ [1 kHz, 20° C.]: | 24.7 |
| APUQU-3-F | 9.00% | $\varepsilon_\perp$ [1 kHz, 20° C.]: | 4.3 |
| PGUQU-3-F | 8.00% | $K_1$ [pN, 20° C.]: | 12.1 |
| CPGU-3-OT | 7.00% | $K_3$ [pN, 20° C.]: | 13.9 |
| CC-4-V | 18.00% | $\gamma_1$ [mPa · s, 20° C.]: | 163 |
| CC-5-V | 5.00% | $V_0$ [20° C., V]: | 0.81 |
| CCP-V-1 | 6.00% | | |
| CCPC-33 | 3.00% | | |
| PPGU-3-F | 2.00% | | |

H20: Nematic host mixture (Δε < 0)

| | | | |
|---|---|---|---|
| CC-3-V | 28.50% | Clearing point [° C.]: | 85.6 |
| CCP-V1 | 3.00% | Δn [589 nm, 20° C.]: | 0.121 |
| CCPC-33 | 2.00% | Δε [1 kHz, 20° C.]: | 19.5 |
| PGU-2-F | 4.00% | $\varepsilon_\parallel$ [1 kHz, 20° C.]: | 23.8 |
| CCQU-3-F | 8.00% | $\varepsilon_\perp$ [1 kHz, 20° C.]: | 4.3 |
| CCQU-5-F | 6.00% | $K_1$ [pN, 20° C.]: | 11.6 |
| CCGU-3-F | 3.00% | $K_3$ [pN, 20° C.]: | 12.7 |
| PUQU-2-F | 2.00% | $\gamma_1$ [mPa · s, 20° C.]: | 126 |
| PUQU-3-F | 10.00% | $V_0$ [20° C., V]: | 0.81 |
| APUQU-2-F | 6.00% | | |
| APUQU-3-F | 9.00% | | |
| PGUQU-3-F | 5.00% | | |
| PGUQU-4-F | 5.00% | | |
| PGUQU-5-F | 4.00% | | |
| CPGU-3-OT | 4.00% | | |
| PPGU-3-F | 0.50% | | |

The following polymerisable self-alignment additives (PSAAs) are used:

| PSAA No. | Structure |
|---|---|
| 1 | ![structure 1] |
| 2 | ![structure 2] |
| 3 | ![structure 3] |

The following polymerisable compound is used:

RM-41

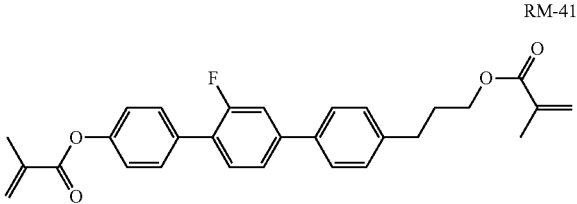 [SMILES: C=C(C)C(=O)OCCCc1ccc(-c2ccc(-c3ccc(OC(=O)C(=C)C)cc3)c(F)c2)cc1]

The following non-polymerisable self-alignment additives are used:

A-1

A-2

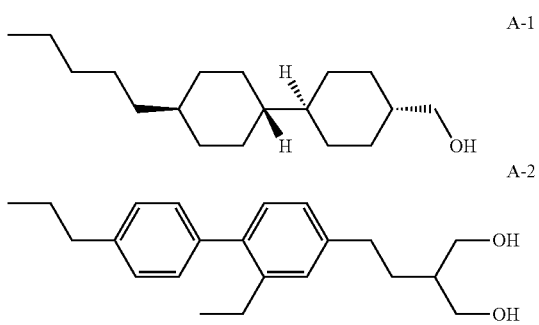

Mixture Example 1

Polymerisable self-alignment additive 1 (1.0% by weight) is added to a nematic LC medium H1 of the VA type ($\Delta\varepsilon<0$), and the mixture is homogenised.

Use in Test cells without Pre-Alignment Layer:

The mixture formed is introduced into a test cell (without polyimide alignment layer, layer thickness d≈4.0 μm, ITO coating on both sides, without passivation layer). The LC medium has a spontaneous homeotropic (vertical) alignment with respect to the substrate surfaces. This alignment remains stable up to the clearing point, and the VA cell formed can be switched reversibly by application of a voltage.

VA alignment layers which are used for PM-VA, PVA, MVA and analogous technologies are no longer necessary with the use of additives such as polymerisable self-alignment additive 1.

Mixture Example 2

Polymerisable self-alignment additive 1 (1.0% by weight) is added to a nematic LC medium H15 of the VA-IPS type ($\Delta\varepsilon>0$), and the mixture is homogenised.

Use in Test Cells without Pre-Alignment Layer:

The mixture formed is introduced into a test cell (without polyimide alignment layer, layer thickness d≈4 μm, ITO interdigital electrodes arranged on one substrate surface, glass on the opposite substrate surface, without passivation layer). The LC medium has a spontaneous homeotropic (vertical) alignment with respect to the substrate surfaces. This alignment remains stable up to the clearing point, and the VA-IPS cell formed can be switched reversibly by application of a voltage.

VA alignment layers which are used for VA-IPS, HT-VA and analogous technologies are no longer necessary with the use of additives such as polymerisable self-alignment additive 1.

Mixture Examples 3 and 4

Polymerisable self-alignment additives 2 (1.5% by weight) and 3 (2.0% by weight) are added to a nematic LC medium H1 (Δε<0) analogously to Mixture Example 1, and the mixture is homogenised. The mixtures formed are introduced into test cells without pre-alignment layer. The LC media have a spontaneous homeotropic (vertical) alignment with respect to the substrate surfaces. This alignment remains stable up to the clearing point, and the VA cells formed can be switched reversibly by application of a voltage.

Mixture Examples 5 and 6

Polymerisable self-alignment additives 2 (1.5% by weight) and 3 (2.0% by weight) are added to a nematic LC medium H15 (Δε>0) analogously to Mixture Example 2, and the mixture is homogenised. The mixtures formed are introduced into test cells without pre-alignment layer. The LC media have a spontaneous homeotropic (vertical) alignment with respect to the substrate surfaces. This alignment remains stable up to the clearing point, and the VA-IPS cells formed can be switched reversibly by application of a voltage.

Mixture Examples 7-20

Polymerisable self-alignment additive 1 (1.0% by weight) is added to nematic
LC media H2-H14 (Δε<0) analogously to Mixture Example 1, and the mixture is homogenised. The mixtures formed are introduced into test cells without pre-alignment layer (cf. Mixture Example 1). The LC media have a spontaneous homeotropic (vertical) alignment with respect to the substrate surfaces. This alignment remains stable up to the clearing point, and the VA cells formed can be switched reversibly by application of a voltage.

Mixture Examples 21-26

Polymerisable self-alignment additive 1 (1.0% by weight) is added to nematic LC media H16-H20 (Δε>0) analogously to Mixture Example 2, and the mixture is homogenised. The mixtures formed are introduced into test cells without pre-alignment layer (cf. Mixture Example 2). The LC media have a spontaneous homeotropic (vertical) alignment with respect to the substrate surfaces. This alignment remains stable up to the clearing point, and the VA-IPS cells formed can be switched reversibly by application of a voltage.

Mixture Examples 27-28

A polymerisable self-alignment additive 1 (0.3% by weight) and in each case a non-polymerisable self-alignment additive A-1 (1.5% by weight) or A-2 (0.3% by weight) are added to a nematic LC medium H1 of the VA type (Δε<0), and the mixture is homogenised.
Use in Test Cells without Alignment Layer:
The mixture formed is introduced into a test cell (without polyimide alignment layer, cell thickness d≈4.0 μm, ITO coating on both sides, without passivation layer). The LC medium has a spontaneous homeotropic (vertical) alignment to the substrate surfaces. This alignment remains stable up to the clearing point, and the VA cell formed can be switched reversibly by application of a voltage.
VA alignment layers which are used for PM-VA, PVA, MVA and analogous technologies are no longer necessary on use of additives such as the polymerisable self-alignment additive 1 in combination with A-1 or A-2.

Mixture Examples 1a and 3a (Polymerisation of Mixture Examples 1 and 3)

In each case a polymerisable self-alignment additive 1 (1.0% by weight) or 2 (1.5% by weight) is added to a nematic LC medium H1 (Δε<0), and the mixture is homogenised.
Use in Test Cells without Pre-Alignment Layer:
The mixtures formed are introduced into test cells (without polyimide alignment layer, cell thickness d≈4.0 μm, ITO coating on both sides, without passivation layer). The LC media have a spontaneous homeotropic (vertical) alignment with respect to the substrate surfaces. This alignment remains stable up to the clearing point, and the VA cell formed can be switched reversibly by application of a voltage.
While a voltage greater than the optical threshold voltage (for example 14 Vpp) is applied, the VA cells are irradiated with UV light having an intensity of 100 mW/cm$^2$ at 20° C. or 40° C. with a 340 nm band-pass filter. This causes polymerisation of the polymerisable compounds. The homeotropic alignment is thus additionally stabilised, a 'pre-tilt' is established, and a polymer layer forms. The PSA-VA cells obtained can be switched reversibly up to the clearing point on application of a voltage. The response times are shortened compared with the unpolymerised cell. The threshold voltages ($V_{10}$) change (Table 1).
The polymerisation can also be carried out without application of a voltage. The homeotropic alignment is thus additionally stabilised and a polymer layer forms without a 'pre-tilt' being established. The polymer layer acts as protective layer and improves the long-term stability of the PSA-VA cell.
VA alignment layers which are used for PSA, PS-VA and analogous technologies are no longer necessary with the use of additives such as the polymerisable self-alignment additives 1 and 2.

Mixture Example 1b (Polymer Stabilisation of Mixture Example 1a)

A polymerisable compound RM-41 (0.3% by weight) and a polymerisable self-alignment additive 1 (1.0% by weight) are added to a nematic LC medium H1 (Δε<0), and the mixture is homogenised.
Use in Test cells without Alignment Layer:
The mixtures formed are introduced into test cells (without polyimide alignment layer, cell thickness d≈4.0 μm, ITO coating on both sides, without passivation layer). The LC media have a spontaneous homeotropic (vertical) alignment with respect to the substrate surfaces. This alignment remains stable up to the clearing point, and the VA cell formed can be switched reversibly by application of a voltage.
While a voltage greater than the optical threshold voltage (for example 14 Vpp) is applied, the VA cells are irradiated with UV light having an intensity of 100 mW/cm$^2$ at 20° C. or 40° C. with a 340 nm band-pass filter. This causes polymerisation of the polymerisable compounds. The homeotropic alignment is thus additionally stabilised, a pre-tilt is established, and a polymer layer forms. The PSA-VA cells obtained can be switched reversibly up to the clearing point by application of a voltage. The response times are shortened compared with the unpolymerised cell. The threshold voltages ($V_{10}$) change (Table 1).
The polymerisation can also be carried out without application of a voltage. The homeotropic alignment is thus additionally stabilised and a polymer layer forms without a 'pre-tilt' being established. The polymer layer acts as protective layer and improves the long-term stability of the PSA-VA cell.

VA alignment layers which are used for PSA, PS-VA and analogous technologies are no longer necessary with the use of additives such as the polymerisable self-alignment additives 1 in combination with RM-41.

Mixture Example 28a (Polymerisation of Mixture Example 28)

A polymerisable self-alignment additive 1 (0.3% by weight) and an unpolymerisable self-alignment additive A-2 (0.3% by weight) are added to a nematic LC medium H1 of the VA type ($\Delta\varepsilon$<0), and the mixture is homogenised.

Use in Test Cells without Pre-Alignment Layer:

The mixtures formed are introduced into test cells (without polyimide alignment layer, cell thickness d≈4.0 µm, ITO coating on both sides, without passivation layer). The LC media have a spontaneous homeotropic (vertical) alignment with respect to the substrate surfaces. This alignment remains stable up to the clearing point, and the VA cell formed can be switched reversibly by application of a voltage.

While a voltage greater than the optical threshold voltage (for example 14 Vpp) is applied, the VA cells are irradiated with UV light having an intensity of 100 mW/cm$^2$ at 20° C. or 40° C. with a 340 nm band-pass filter. This causes polymerisation of the polymerisable compounds. The homeotropic alignment is thus additionally stabilised, a 'pre-tilt' is established, and a polymer layer forms. The PSA-VA cells obtained can be switched reversibly up to the clearing point on application of a voltage. The response times are shortened compared with the unpolymerised cell. The threshold voltages ($V_{10}$) change (Table 1).

The polymerisation can also be carried out without application of a voltage. The homeotropic alignment is thus additionally stabilised and a polymer layer forms without a 'pre-tilt' being established. The polymer layer acts as protective layer and improves the long-term stability of the PSA-VA cell.

VA alignment layers which are used for PSA, PS-VA and analogous technologies are no longer necessary with the use of additives such as polymerisable self-alignment additive 1 in combination with A-2.

Mixture Example 27b (Polymerisation of Mixture Example 27a)

A polymerisable compound RM-41 (0.3% by weight), a polymerisable self-alignment additive 1 (0.3% by weight) and an unpolymerisable self-alignment additive A-1 (1.5% by weight) are added to a nematic LC medium H1 of the VA type ($\Delta\varepsilon$<0), and the mixture is homogenised.

Use in Test Cells without Pre-Alignment Layer:

The mixtures formed are introduced into test cells (without polyimide alignment layer, cell thickness d≈4.0 µm, ITO coating on both sides, without passivation layer). The LC media have a spontaneous homeotropic (vertical) alignment with respect to the substrate surfaces. This alignment remains stable up to the clearing point, and the VA cell formed can be switched reversibly by application of a voltage.

While a voltage greater than the optical threshold voltage (for example 14 Vpp) is applied, the VA cells are irradiated with UV light having an intensity of 100 mW/cm$^2$ at 20° C. or 40° C. with a 340 nm band-pass filter. This causes polymerisation of the polymerisable compounds. The homeotropic alignment is thus additionally stabilised, a 'pre-tilt' is established, and a polymer layer forms. The PSA-VA cells obtained can be switched reversibly up to the clearing point on application of a voltage. The response times are shortened compared with the unpolymerised cell. The threshold voltages ($V_{10}$) change (Table 1).

The polymerisation can also be carried out without application of a voltage. The homeotropic alignment is thus additionally stabilised and a polymer layer forms without a 'pre-tilt' being established. The polymer layer acts as protective layer and improves the long-term stability of the PSA-VA cell.

VA alignment layers which are used for PSA, PS-VA and analogous technologies are no longer necessary with the use of additives such as polymerisable self-alignment additive 1 in combination with RM-41 and A-2.

TABLE 1

Threshold voltages $V_{10}$ of VA and PSA cells. Host H1 in combination with polymerisable self-alignment additive (PSOA). Polymerisation conditions: 340 nm band-pass filter, 20° C., 0 Vpp, 10 min, 100 mW/cm$^2$.

| Mixture Example | PSOA | Further comp. | UV irradiation | Cell type | $V_{10}$/V | Response time/ms 0 V→5 V |
|---|---|---|---|---|---|---|
| 1 | 1 | | No | VA | 2.47 | 27 |
| 3 | 2 | | No | VA | 2.47 | 34 |
| 27 | 1 | A-1 | No | VA | 2.55 | 25 |
| 28 | 1 | A-2 | No | VA | 2.50 | 26 |
| 1a | 1 | | Yes | PSA | 4.54 | 15 |
| 1b | 1 | RM-41 | Yes | PSA | 4.81 | 17 |
| 3a | 2 | | Yes | PSA | 2.63 | 17 |
| 27b | 1 | A-1, RM-41 | Yes | PSA | 2.57 | 22 |
| 28a | 1 | A-2 | Yes | PSA | 2.58 | 23 |

The invention claimed is:

1. A LC medium comprising:
   i) a low-molecular-weight, non polymerizable liquid-crystalline component
   and
   ii) one or more polymerizable compounds of the formula I,
   or
   a polymerized component obtainable by polymerization of the polymerisable compound of formula I,

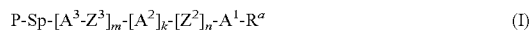

P-Sp-[A$^3$-Z$^3$]$_m$-[A$^2$]$_k$-[Z$^2$]$_n$-A$^1$-R$^a$     (I)

in which

A$^1$, A$^2$, A$^3$ each, independently of one another, denote an aromatic, heteroaromatic, alicyclic or heterocyclic group, which may also contain fused rings, and which may also be mono- or polysubstituted by a group L, L in each case, independently of one another, denotes H, F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, P denotes a polymerizable group, Sp denotes a spacer group or a single bond, $Z^2$ in each case, independently of one another, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —C≡C—, —CH═CH—COO—, —OCO—CH═CH—, —(CR$^0$R$^{00}$)$_{n1}$—, $Z^3$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —C≡C—, —CH═CH—COO—, —OCO—CH═CH—, —(CR$^0$R$^{00}$)$_{n1}$—, n1 denotes 1, 2, 3 or 4,
n denotes 0 or 1,
m denotes 0, 1, 2, 3, 4, 5 or 6,
k denotes 0 or 1,
$R^0$ in each case, independently of one another, denotes alkyl having 1 to 12 C atoms,
$R^{00}$ in each case, independently of one another, denotes H or alkyl having 1 to 12 C atoms,
$R^a$ denotes an anchor group of the formula

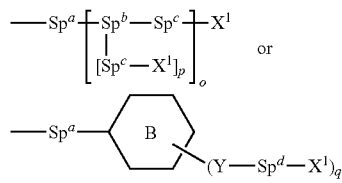

p denotes 1 or 2,
q denotes 2 or 3,
B denotes a substituted or unsubstituted ring system or condensed ring system,
Y, independently of one another, denotes —O—, —S—, —C(O)—, —C(O)O—, —OC(O)—, —NR$^{11}$— or a single bond,
o denotes 0 or 1,
$X^1$, independently of one another, denotes H, alkyl, fluoroalkyl, OH, NH$_2$, NHR$^{11}$, NR$^{11}{}_2$, OR$^{11}$, C(O)OH, —CHO,
where at least one group $X^1$ denotes a radical selected from —OH, —NH$_2$, NHR$^{11}$, C(O)OH and —CHO,
$R^{11}$ denotes alkyl having 1 to 12 C atoms,
Sp$^a$, Sp$^c$, Sp$^d$ each, independently of one another, denote a spacer group or a single bond, and
Sp$^b$ denotes a tri- or tetravalent group.

2. A Medium according to claim 1, wherein, for formula I,
$A^1$, $A^2$, $A^3$ each, independently of one another, denote 1,4-phenylene, 1,3-phenylene, naphthalene-1,4-diyl or naphthalene-2,6-diyl, where, in addition, one or more CH groups in these groups may be replaced by N, cyclohexane-1,4-diyl, in which, in addition, one or more non-adjacent CH$_2$ groups may be replaced by O and/or S, 3,3'-bicyclobutylidene, 1,4-cyclohexenylene, bicyclo[1.1.1]pentane-1,3-diyl, bicyclo[2.2.2]octane-1, 4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, perhydrocyclopenta[a]phenanthrene-3,17-diyl (in particular gonane-3,17-diyl),
where all these groups may be unsubstituted or mono- or polysubstituted by a group L.

3. A Medium according to claim 1, wherein the compound of the formula I is a compound of the formula I1,

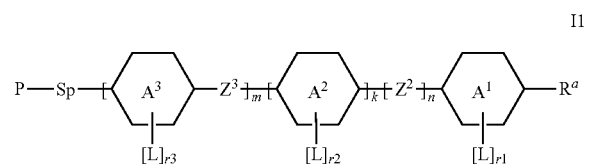

in which
$R^a$, $A^1$, $A^2$, $A^3$, $Z^2$, $Z^3$, L, Sp, P, k, m and n independently are as defined in claim 1, and
r1, r2, r3 independently denote 0, 1, 2 or 3.

4. A LC medium according to claim 1, wherein the compound of the formula I contains in total at least one group L on the groups $A^1$, $A^2$ and $A^3$, as are present.

5. A LC medium according to claim 1, wherein the one or more compounds of the formula I are selected from compounds of the formulae IA, IB, IC, ID, IE or IF:

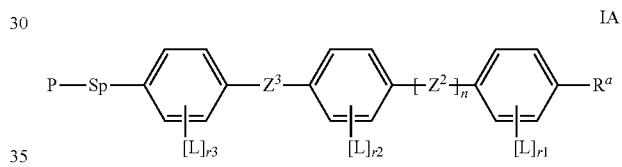

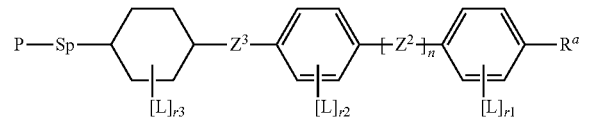

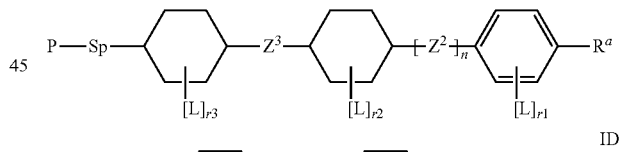

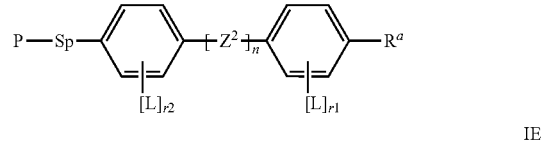

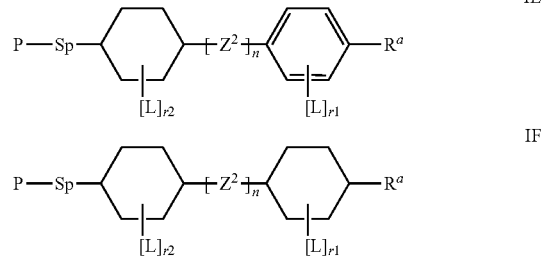

in which $R^a$, $Z^2$, $Z^3$, L, Sp, P and n independently are as defined in claim 1, and
r1, r2, r3 independently denote 0, 1, 2 or 3.

6. A LC medium according to claim 1, wherein, besides one or more compounds of the formula I, the polymerizable or polymerized component comprises one or more further polymerizable or polymerized compounds, where the polymerized component is obtainable by polymerization of the polymerizable component.

7. A LC medium according to claim 1, wherein one or more compounds of the formula I, additionally comprises one or more non-polymerizable compounds of the formula I', $$R^1\text{-}[A^3\text{-}Z^3]_m\text{-}[A^2]_k\text{-}[Z^2]_a\text{-}A^1\text{-}R^a \qquad \qquad I'$$

in which m, k, n and the group $R^a$ are as defined for formula I according to claim 1, and $A^1$, $A^2$, $A^3$ each, independently of one another, denote an aromatic, heteroaromatic, alicyclic or heterocyclic group, which may also contain fused rings, and which may also be mono- or polysubstituted by a group L, $Z^2$ in each case, independently of one another, denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, $Z^3$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, n1 denotes 1, 2, 3 or 4, L in each case, independently of one another, denotes H, F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, $R^0$ in each case, independently of one another, denotes alkyl having 1 to 12 C atoms, $R^{00}$ in each case, independently of one another, denotes H or alkyl having 1 to 12 C atoms, and $R^1$, independently of one another, denotes H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another and in which, in addition, one or more H atoms may be replaced by F or Cl.

8. A LC medium according to claim 7, which comprises one or more polymerizable compounds selected from the following formulae:

in which $R^1$, $R^a$, $Z^2$, $Z^3$, L and n independently are as defined in claim 7, and r1, r2, r3 independently denote 0, 1, 2, 3 or 4.

9. A LC medium according to claim 1, which comprises one or more compounds of the formula I selected from the following formulae:

-continued

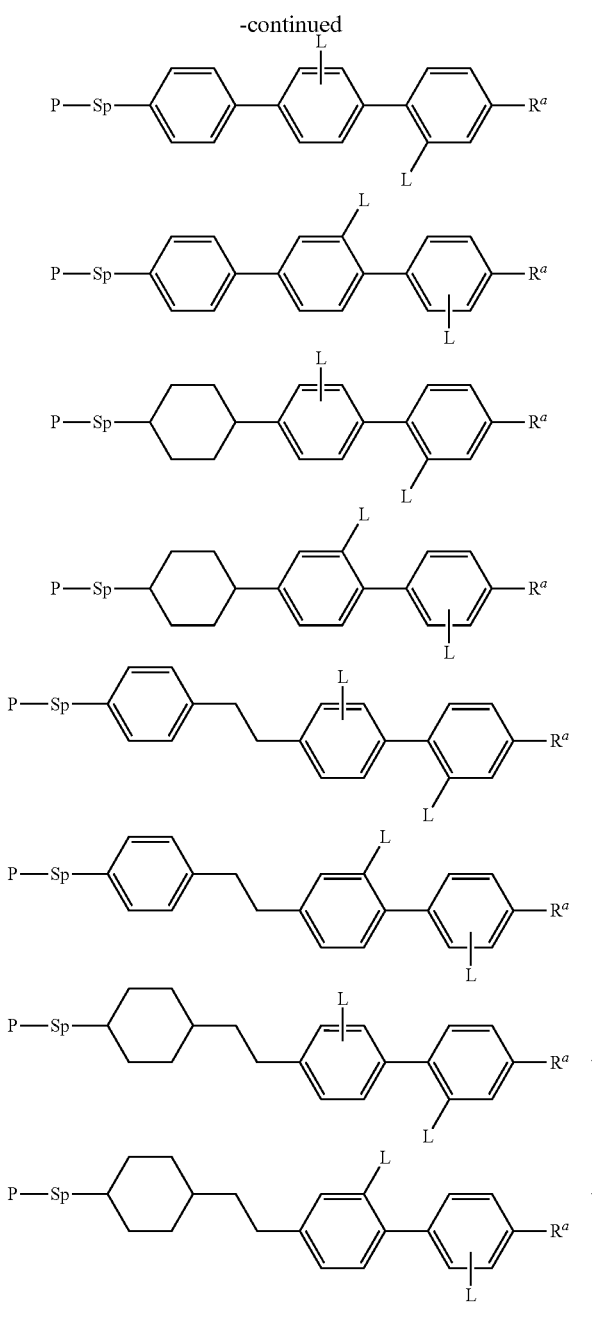

in which L, Sp, P and $R^a$ independently are as defined in claim 1.

10. A LC medium according to claim 1, wherein the group $R^a$ in formula I or the sub-formulae contains one, two or three OH groups.

11. A LC medium according to claim 1, wherein the group $R^a$ denotes a group selected from

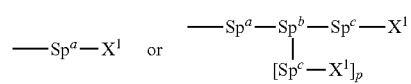

in which $Sp^a$, $Sp^b$, $Sp^c$, p and $X^1$ have the meaning as in claim 1.

12. A LC medium according to claim 1, wherein the group $R^a$ denotes a group selected from the part-formulae

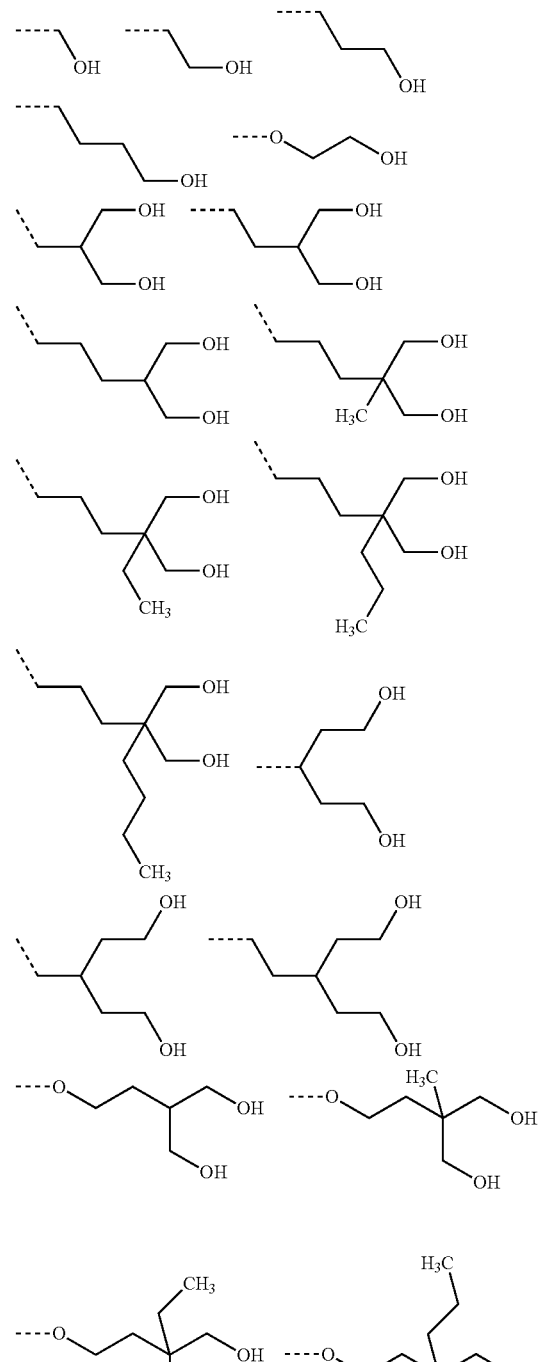

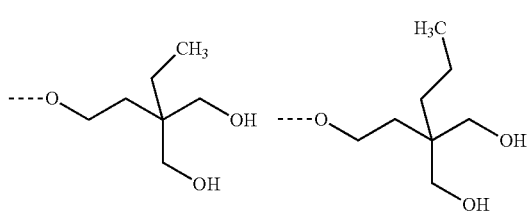

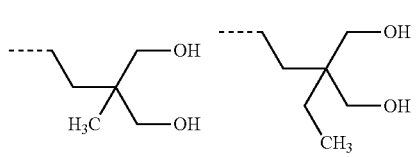

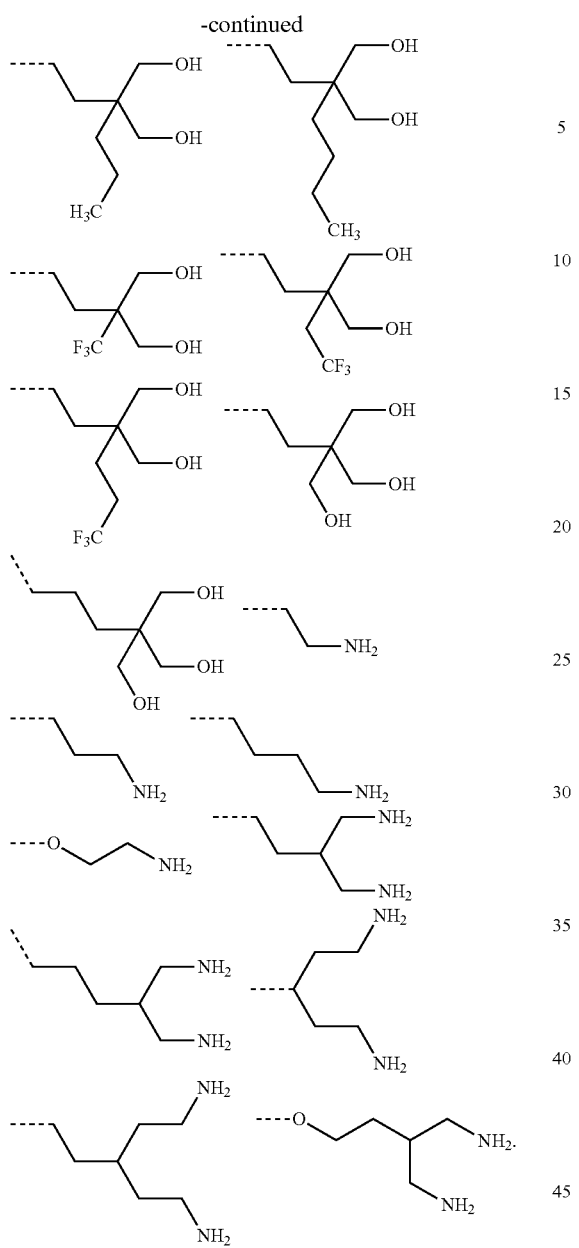

13. A LC medium according to claim 1, wherein for the compound of the formula I, n=0.

14. A LC medium according to claim 1, wherein for the compound of the formula I, the group P is selected from vinyloxy, acrylate, methacrylate, fluoroacrylate, chloroacrylate, oxetane and epoxide.

15. A LC medium according to claim 1, which in it comprises the compounds of the formula I in a concentration of less than 10% by weight.

16. A LC medium according to claim 1, which comprises one or more polymerizable compounds of the formula M or a (co)polymer comprising compounds of the formula M:

$$P^1\text{-}Sp^1\text{-}A^2\text{-}(Z^1\text{-}A^1)_n\text{-}Sp^2\text{-}P^2 \qquad M$$

in which the individual radicals have the following meanings:

$P^1$, $P^2$ each independently denote a polymerizable group,
$Sp^1$, $Sp^2$ each independently denote a spacer group, $A^1$, $A^2$ each, independently of one another, denote a radical selected from the following groups:

a) the group consisting of trans-1,4-cyclohexylene, 1,4-cyclohexenylene and 4,4'-bicyclohexylene, in which, in addition, one or more non-adjacent $CH_2$ groups may be replaced by —O— and/or —S— and in which, in addition, one or more H atoms may be replaced by a group L, or selected from

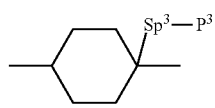

b) the group consisting of 1,4-phenylene and 1,3-phenylene, in which, in addition, one or two CH groups may be replaced by N and in which, in addition, one or more H atoms may be replaced by a group L or -$Sp^3$-P, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by a group L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro-[3.3]heptane-2,6-diyl,

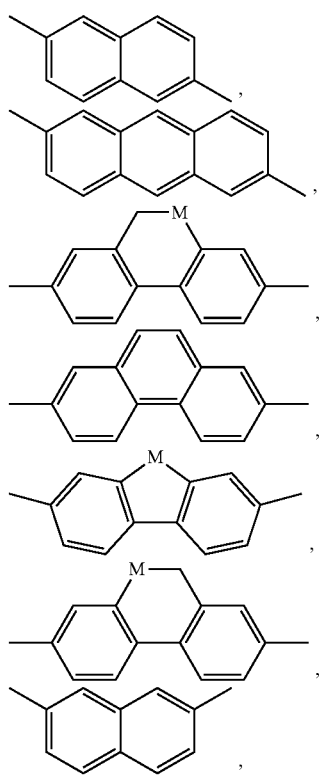

-continued

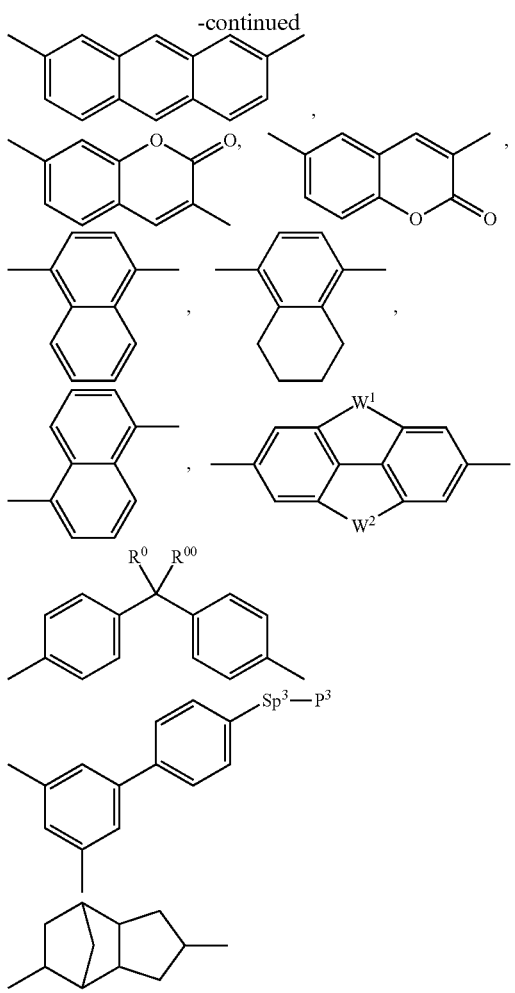

where, in addition, one or more H atoms in these radicals may be replaced by a group L or -Sp$^3$-P, and/or one or more double bonds may be replaced by single bonds, and/or one or more CH groups may be replaced by N, P$^3$ denotes a polymerizable group,
Sp$^3$ denotes a spacer group,
n denotes 0, 1, 2 or 3,
Z$^1$ in each case, independently of one another, denotes —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^c$R$^d$)—, —CH$_2$CF$_2$—, —CF$_2$CF$_2$— or a single bond,
L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms,
R$^0$, R$^{00}$ each, independently of one another, denote H, F or straight-chain or branched alkyl having 1 to 12 C atoms, in which, in addition, one or more H atoms may be replaced by F,
M denotes —O—, —S—, —CH$_2$—, —CHY$^1$— or —CY$^1$Y$^2$—,
Y$^1$ and Y$^2$ each, independently of one another, have one of the meanings indicated above for R$^0$ or denote Cl or CN, W$^1$, W$^2$ each, independently of one another, denote —CH$_2$CH$_2$—, —CH═CH—, —CH$_2$—O—, —O—CH$_2$—, —C(R$^c$R$^d$)— or —O—, and
R$^c$ and R$^d$ each, independently of one another, denote H or alkyl having 1 to 6 C atoms, preferably H, methyl or ethyl,
where one or more of the groups P$^1$-Sp$^1$-, -Sp$^2$-P$^2$ and -Sp$^3$-P$^3$ may denote a radical R$^{aa}$, with the proviso that at least one of the groups P$^1$-Sp$^1$-, -Sp$^2$-P$^2$ and -Sp$^3$-P$^3$ present does not denote R$^{aa}$,
R$^{aa}$ denotes H, F, Cl, CN or straight-chain or branched alkyl having 1 to 25 C atoms, in which, in addition, one or more non-adjacent CH$_2$ groups may each be replaced, independently of one another, by C(R$^0$)═C(R$^{00}$)—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P$^1$-Sp$^1$-, where the groups —OH, —NH$_2$, —SH, —NHR, —C(O)OH and —CHO are not present in R$^{aa}$.

17. A LC medium according to claim 1, wherein the polymerizable or polymerized component comprises 0.01 to 5% by weight of one or more compounds of the formula M P$^1$-Sp$^1$-A$^2$-(Z$^1$-A$^1$)$_n$-Sp$^2$-P$^2$  M in which the individual radicals have the following meanings:
P$^1$, P$^2$ each independently denote a polymerizable group,
Sp$^1$, Sp$^2$ each independently denote a spacer group,
A$^1$, A$^2$ each, independently of one another, denote a radical selected from the following groups:
a) the group consisting of trans-1,4-cyclohexylene, 1,4-cyclohexenylene and 4,4'-bicyclohexylene, in which, in addition, one or more non-adjacent CH$_2$ groups may be replaced by —O— and/or —S— and in which, in addition, one or more H atoms may be replaced by a group L, or selected from

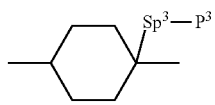

b) the group consisting of 1,4-phenylene and 1,3-phenylene, in which, in addition, one or two CH groups may be replaced by N and in which, in addition, one or more H atoms may be replaced by a group L or -Sp$^3$-P,
c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by a group L,
d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro-[3.3]heptane-2,6-diyl,

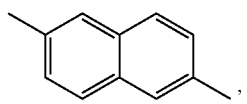

-continued

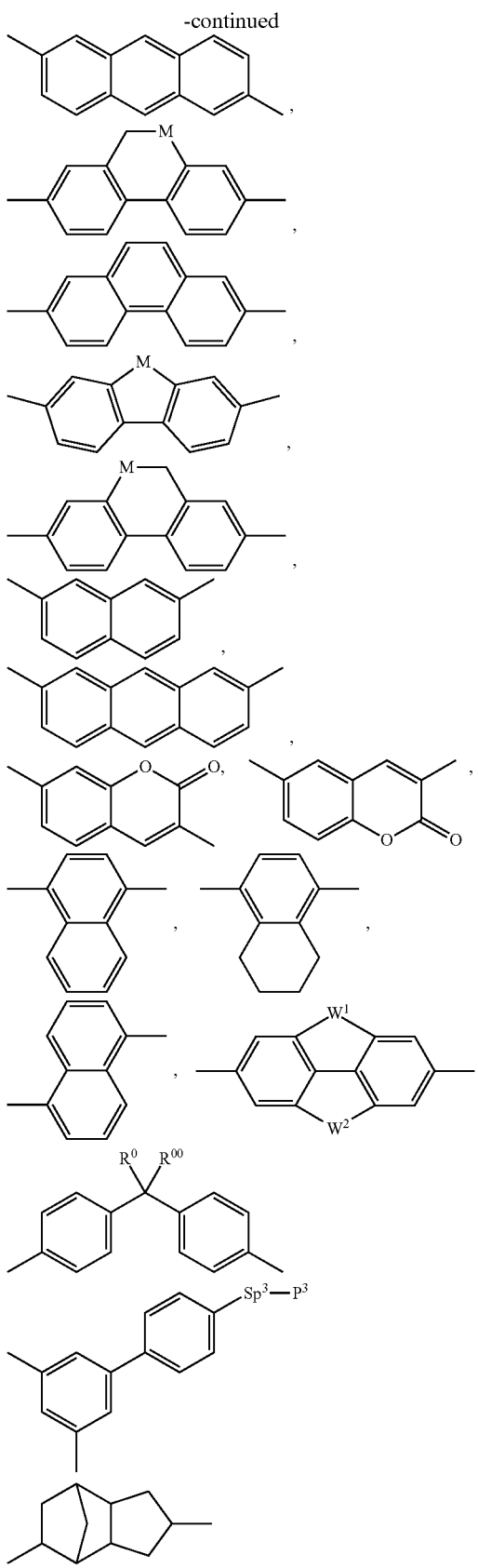

where, in addition, one or more H atoms in these radicals may be replaced by a group L or -Sp³-P, and/or one or more double bonds may be replaced by single bonds, and/or one or more CH groups may be replaced by N, P³ denotes a polymerizable group,
Sp³ denotes a spacer group,
n denotes 0, 1, 2 or 3,
Z¹ in each case, independently of one another, denotes —CO—O—, —O—CO—, —CH₂O—, —OCH₂—, —CF₂O—, —OCF₂—, or —(CH₂)$_n$—, where n is 2, 3 or 4, —O—, —CO—, —C(R$^c$R$^d$)—, —CH₂CF₂—, —CF₂CF₂— or a single bond,
L on each occurrence, identically or differently, denotes F, Cl, CN, SCN, SF₅ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms,
R⁰, R⁰⁰ each, independently of one another, denote H, F or straight-chain or branched alkyl having 1 to 12 C atoms, in which, in addition, one or more H atoms may be replaced by F,
M denotes —O—, —S—, —CH₂—, —CHY¹— or —CY¹Y²—,
Y¹ and Y² each, independently of one another, ha one of the meanings indicated above for R⁰ or denote Cl or CN,
W¹, W² each, independently of one another, denote —CH₂CH₂—, —CH═CH—, —CH₂—O—, —O—CH₂—, —C(R$^c$R$^d$)— or —O—, and
R$^c$ and R$^d$ each, independently of one another, denote H or alkyl having 1 to 6 C atoms, preferably H, methyl or ethyl,
where one or more of the groups P¹-Sp¹-, -Sp²-P² and -Sp³-P³ may denote a radical R$^{aa}$, with the proviso that at least one of the groups P¹-Sp¹-, -Sp²-P² and -Sp³-P³ present does not denote R$^{aa}$,
R$^{aa}$ denotes H, F, Cl, CN or straight-chain or branched alkyl having 1 to 25 C atoms, in which, in addition, one or more non-adjacent CH₂ groups may each be replaced, independently of one another, by C(R⁰)═C(R⁰⁰)—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P¹-Sp¹-, where the groups —OH, —NH₂, —SH, —NHR, —C(O)OH and —CHO are not present in R$^{aa}$,
and/or 0.01 to 10% by weight of one or more non-polymerizable compounds of the formula I'

$$R^1\text{-}[A^3\text{-}Z^3]_m\text{-}[A^2]_k\text{-}[Z^2]_n\text{-}A^1\text{-}R^a \qquad I'$$

in which m, k, n and the group R$^a$ are as defined for formula I according to claim 1, and
A¹, A², A³ each, independently of one another, denote an aromatic, heteroaromatic, alicyclic or heterocyclic group, which may also contain fused rings, and which may also be mono- or polysubstituted by a group L,
Z² in each case, independently of one another, denotes —O—, —S—, —CO—, —CO—O—, —OCO—, —O—CO—O—, —OCH₂—, —CH₂O—, —SCH₂—, —CH₂S—, —CF₂O—, —OCF₂—, —CF₂S—, —SCF₂—, —(CH₂)$_{n1}$—, —CF₂CH₂—, —CH₂CF₂—, —(CF₂)$_{n1}$—, —CH═CH—, —CF═CF—, —C≡C—, —CH═CH—COO—, —OCO—CH═CH—, —(CR⁰R⁰⁰)$_{n1}$—,
Z³ in each case, independently of one another, denotes a single bond, —O—, —S—, —CO—, —CO—O—, —OCO—, —O—CO—O—, —OCH₂—, —CH₂O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, n1 denotes 1, 2, 3 or 4, L in each case, independently of one another, denotes H, F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, R$^0$ in each case, independently of one another, denotes alkyl having 1 to 12 C atoms, R$^{00}$ in each case, independently of one another, denotes H or alkyl having 1 to 12 C atoms, and R$^1$, independently of one another, denotes H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another and in which, in addition, one or more H atoms may be replaced by F or Cl.

18. A LC medium according to claim 1, wherein the polymerizable or polymerized component comprises one or more compounds selected from the compounds of the following formulae:

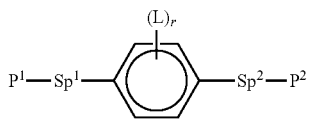
M1

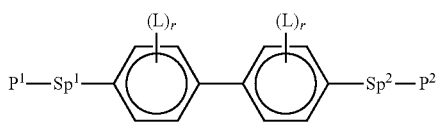
M2

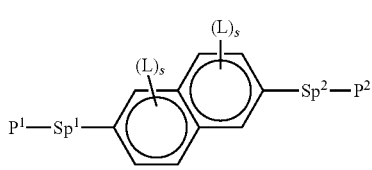
M3

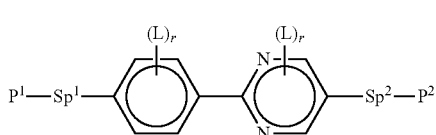
M4

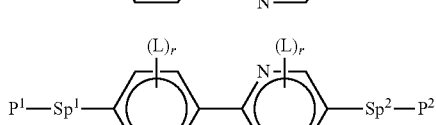
M5

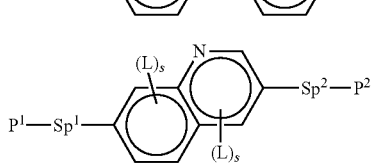
M6

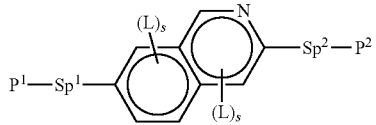
M7

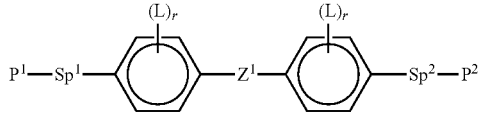
M8

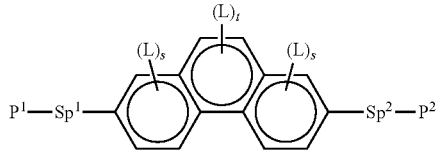
M9

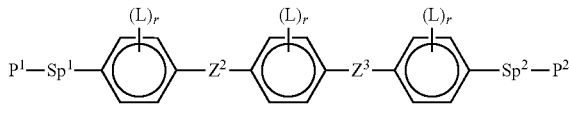
M10

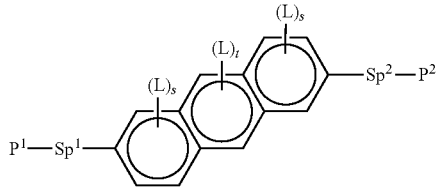
M11

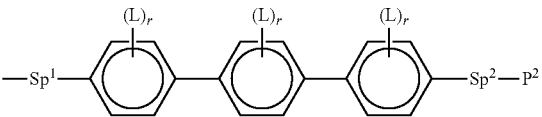
M12

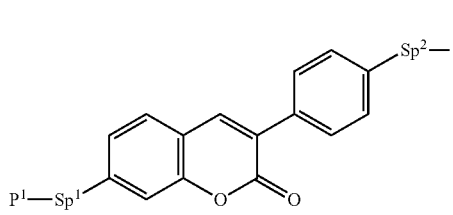
M13

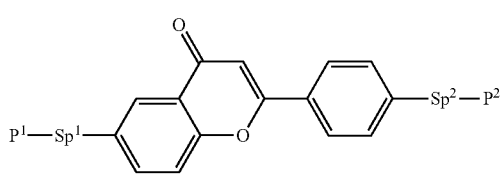
M14

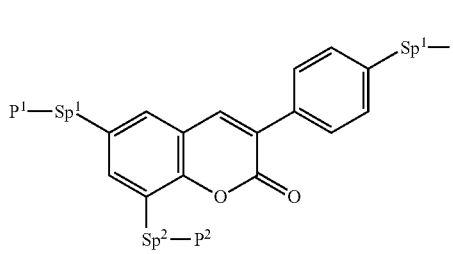
M15

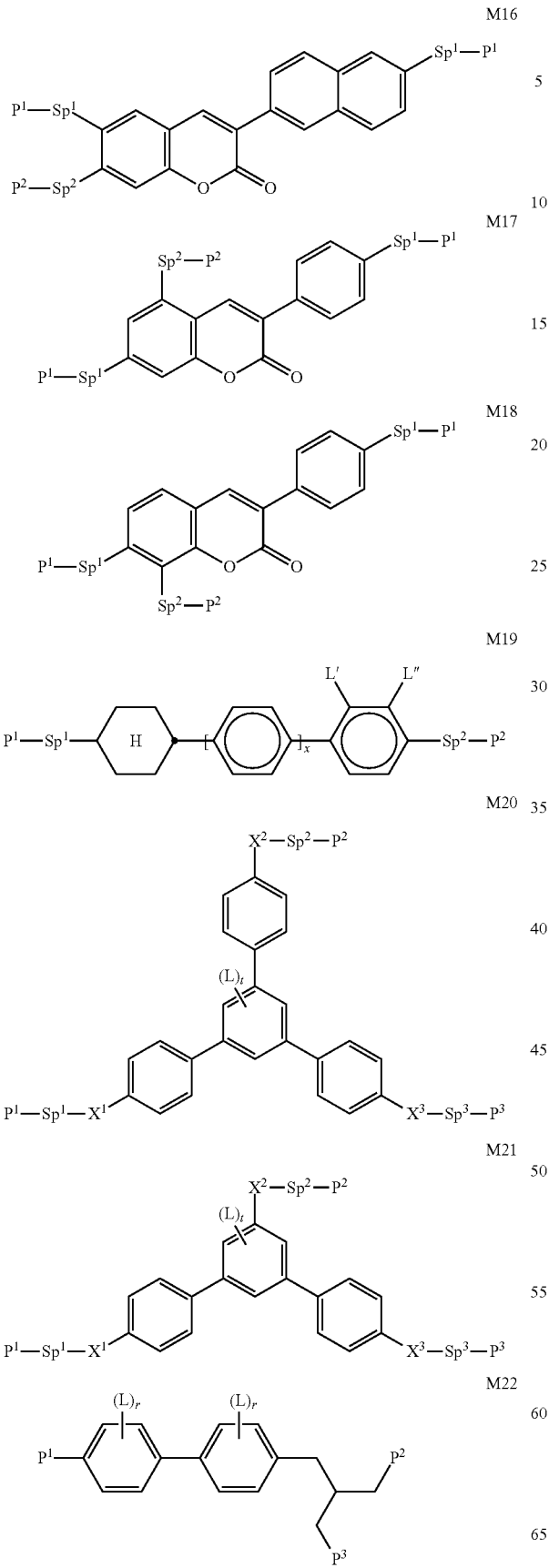

-continued

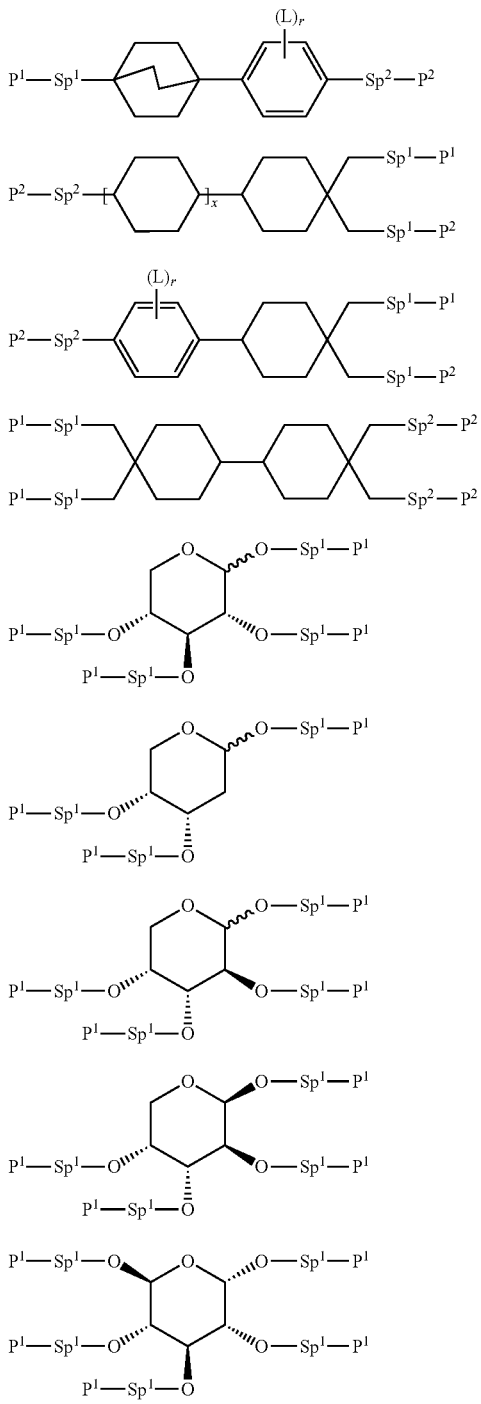

in which the individual radicals have the following meanings:

$P^1$, $P^2$ and $P^3$ each, independently of one another, denote a polymerizable group, $Sp^1$, $Sp^2$ and $Sp^3$ each, independently of one another, denote a single bond or a spacer group, where, in addition, one or more of the radicals $P^1$-$Sp^1$-, $P^2$-$Sp^2$- and $P^3$-$Sp^3$- may denote a radical $R^{aa}$, with the proviso that at least one of the radicals $P^1$-$Sp^1$-, $P^2$-$Sp^2$- and $P^3$-$Sp^3$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)$=$C(R^{00})$—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, where —OH, —$NH_2$, —SH, —NHR, —C(O)OH and —CHO are not present in the group $R^{aa}$, $R^0$, $R^{00}$ each, independently of one another and on each occurrence identically or differently, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, O-CO- or a single bond, $Z^1$ denotes —O—, —CO—, —C($R^y R^z$)— or —$CF_2 CF_2$—, $Z^2$ and $Z^3$ each, independently of one another, denote —CO—O—, —O—CO—, —$CH_2$O—, —O$CH_2$—, —$CF_2$O—, —O$CF_2$— or —$(CH_2)_n$—, where n is 2, 3 or 4, L on each occurrence, identically or differently, denotes F, Cl, CN, SCN, $SF_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L' and L" each, independently of one another, denote H, F or Cl, r denotes 0, 1, 2, 3 or 4, s denotes 0, 1, 2 or 3, t denotes 0, 1 or 2, and x denotes 0 or 1.

19. A LC display comprising an LC cell having two substrates and at least two electrodes, where at least one substrate is transparent to light and at least one substrate has one or two electrodes, and having a layer of an LC medium according to claim 1 located between the substrates, where the compound of the formula I is suitable for effecting homeotropic alignment of the LC medium with respect to the substrate surfaces.

20. A LC display according to claim 19, wherein the substrates have no alignment layers for homeotropic alignment.

21. A LC display according to claim 19, wherein the substrates have alignment layers on one or both sides.

22. A LC display according to claim 19, which is a VA display containing an LC medium having negative dielectric anisotropy and electrodes arranged on opposite substrates.

23. A LC display according to claim 19, which is a VA-IPS display containing an LC medium having positive dielectric anisotropy and interdigital electrodes arranged on at least one substrate.

24. A Process for the preparation of an LC medium, wherein one or more compounds of the formula I according to claim 1 are mixed with a low-molecular-weight liquid-crystalline component, and one or more polymerizable compounds and/or any desired additives are optionally added.

25. A compound of the formula I

$$P\text{-}Sp\text{-}[A^3\text{-}Z^3]_m\text{-}[A^2]_k\text{-}[Z^2]_n\text{-}A^1\text{-}R^a \qquad (I)$$

in which $A^1$, $A^2$, $A^3$ each, independently of one another, denote an aromatic, heteroaromatic, alicyclic or heterocyclic group, which may also contain fused rings, and which may also be mono- or polysubstituted by a group L, L in each case, independently of one another, denotes H, F, Cl, Br, I, —CN, —$NO_2$, —NCO, —NCS, —OCN, —SCN, —C(=O)N($R^0$)$_2$, —C(=O)$R^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, P denotes a polymerizable group, Sp denotes a spacer group or a single bond, $Z^2$ in each case, independently of one another, denotes —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, —$(CR^0R^{00})_{n1}$—, $Z^3$ in each case, independently of one another, denotes a single bond, —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—$CF_2CH_2$—, —$CH_2CF_2$—, —$(CF_2)_{n1}$—, —CH=CH—, —CF=CF—, —C≡C—, —CH=CH—COO—, —OCO—CH=CH—, —$(CR^0R^{00})_{n1}$—, n1 denotes 1, 2, 3 or 4, n denotes 0 or 1, m denotes 0, 1, 2, 3, 4, 5 or 6, k denotes 0 or 1, $R^0$ in each case, independently of one another, denotes alkyl having 1 to 12 C atoms, $R^{00}$ in each case, independently of one another, denotes H or alkyl having 1 to 12 C atoms, $R^a$ denotes an anchor group of the formula

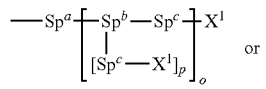

or

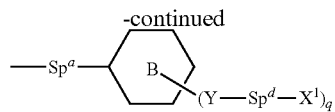

p denotes 1 or 2, q denotes 2 or 3,

B denotes a substituted or unsubstituted ring system or condensed ring system,

Y, independently of one another, denotes —O—, —S—, —C(O)—, —C(O)O—, —OC(O)—, —$NR^{11}$— or a single bond, o denotes 0 or 1, $X^1$, independently of one another, denotes H, alkyl, fluoroalkyl, OH, $NH_2$, $NHR^{11}$, $NR^{11}_2$, $OR^{11}$, C(O)OH, —CHO, where at least one group $X^1$ denotes a radical selected from —OH, —$NH_2$, $NHR^{11}$, C(O)OH and —CHO, $R^{11}$ denotes alkyl having 1 to 12 C atoms, $Sp^a$, $Sp^c$, $Sp^d$ each, independently of one another, denote a spacer group or a single bond, and $Sp^b$ denotes a tri- or tetravalent group.

26. A compound according to claim 25, wherein m=1 or 2, and k=1.

27. A compound according to claim 25, wherein $A^1$ and $A^2$ independently denote 1,4-phenylene or cyclohexane-1,4-diyl, each of which may independently be mono- or polysubstituted by a group L.

28. A method for effecting homeotropic alignment with respect to a surface delimiting the LC medium, which comprises including compound of formula I according to claim 25 as an additive in said LC medium where the compounds of formula I are optionally polymerized after the homeotropic alignment has been effected.

29. A Process for the production of an LC display comprising an LC cell having two substrates and at least two electrodes, where at least one substrate is transparent to light and at least one substrate has one or two electrodes, comprising the process steps of:

filling of the cell with an LC medium according to claim 1, where homeotropic alignment of the LC medium with respect to the substrate surfaces is established, and polymerization of the polymerizable component(s), optionally with application of a voltage to the cell or under the action of an electric field, in one or more process steps.

* * * * *